US007921151B2

(12) United States Patent
Aguilar, Jr. et al.

(10) Patent No.: US 7,921,151 B2
(45) **Date of Patent: *Apr. 5, 2011**

(54) MANAGING A PLURALITY OF PROCESSORS AS DEVICES

(75) Inventors: Maximino Aguilar, Jr., Austin, TX (US); Michael Norman Day, Round Rock, TX (US); Mark Richard Nutter, Austin, TX (US); James Michael Stafford, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/176,375

(22) Filed: Jul. 19, 2008

(65) Prior Publication Data

US 2008/0301695 A1 Dec. 4, 2008

Related U.S. Application Data

(63) Continuation of application No. 10/670,823, filed on Sep. 25, 2003, now Pat. No. 7,523,157.

(51) Int. Cl.
*G06F 11/00* (2006.01)

(52) U.S. Cl. ........ 709/202; 709/225; 370/401; 370/380; 711/114; 711/158; 711/148

(58) Field of Classification Search .................. 709/202, 709/225, 216
See application file for complete search history.

(56) References Cited

U.S. PATENT DOCUMENTS 4,394,727 A 7/1983 Hoffman et al. .............. 718/103
4,787,057 A 11/1988 Hammond .................... 708/607
4,862,354 A 8/1989 Fiacconi et al. .............. 709/216
4,945,479 A 7/1990 Rusterholz et al. ............... 712/3
5,179,702 A 1/1993 Spix et al. ..................... 718/102
5,185,861 A 2/1993 Valencia ....................... 711/120
5,307,495 A 4/1994 Seino et al. ................... 718/106
5,359,721 A 10/1994 Kempf et al. ................. 719/331
5,394,547 A 2/1995 Correnti et al. ............... 717/175
5,428,781 A 6/1995 Duault et al. ................. 718/102
5,448,732 A 9/1995 Matsumoto .................. 718/104

(Continued)

FOREIGN PATENT DOCUMENTS

JP 05-242057 9/1993

(Continued)

OTHER PUBLICATIONS

Microsoft Computer Dictionary, Fifth Edition, Microsoft, 2002, pp. 49, 197, and 196.

(Continued)

*Primary Examiner* — Jude J Jean Gilles
(74) *Attorney, Agent, or Firm* — VanLeeuwen & VanLeeuwen; Matthew B. Talpis

(57) ABSTRACT

A computer system's multiple processors are managed as devices. The operating system accesses the multiple processors using processor device modules loaded into the operating system to facilitate a communication between an application requesting access to a processor and the processor. A device-like access is determined for accessing each one of the processors similar to device-like access for other devices in the system such as disk drives, printers, etc. An application seeking access to a processor issues device-oriented instructions for processing data, and in addition, the application provides the processor with the data to be processed. The processor processes the data according to the instructions provided by the application.

12 Claims, 49 Drawing Sheets

U.S. PATENT DOCUMENTS

| | | | | |
|---|---|---|---|---|
| 5,490,278 | A | 2/1996 | Mochizuki | 708/446 |
| 5,548,798 | A | 8/1996 | King | 710/68 |
| 5,560,030 | A | 9/1996 | Guttag et al. | 712/16 |
| 5,630,128 | A | 5/1997 | Farrell et al. | 718/103 |
| 5,649,184 | A | 7/1997 | Hayashi et al. | 707/8 |
| 5,689,722 | A | 11/1997 | Swarztrauber | 712/12 |
| 5,692,193 | A | 11/1997 | Jagannathan et al. | 718/106 |
| 5,754,817 | A | 5/1998 | Wells et al. | 711/203 |
| 5,790,855 | A | 8/1998 | Faustini | 717/100 |
| 5,812,843 | A * | 9/1998 | Yamazaki et al. | 718/100 |
| 5,835,775 | A | 11/1998 | Washington et al. | 717/153 |
| 5,842,020 | A | 11/1998 | Faustini | 717/111 |
| 5,887,186 | A | 3/1999 | Nakanishi | 712/28 |
| 5,913,065 | A | 6/1999 | Faustini | 717/107 |
| 5,956,509 | A | 9/1999 | Kevner | 719/330 |
| 5,978,831 | A | 11/1999 | Ahamed et al. | 718/105 |
| 6,026,485 | A | 2/2000 | O'Connor et al. | 712/226 |
| 6,044,218 | A | 3/2000 | Faustini | 717/107 |
| 6,049,668 | A | 4/2000 | Smith et al. | 717/138 |
| 6,105,111 | A | 8/2000 | Hammarlund et al. | 711/136 |
| 6,128,724 | A | 10/2000 | Lee et al. | 712/32 |
| 6,195,676 | B1 | 2/2001 | Spix et al. | 718/107 |
| 6,199,179 | B1 * | 3/2001 | Kauffman et al. | 714/26 |
| 6,292,822 | B1 | 9/2001 | Hardwick | 718/105 |
| 6,292,935 | B1 | 9/2001 | Lueh et al. | 717/148 |
| 6,381,659 | B2 | 4/2002 | Proch et al. | 710/57 |
| 6,381,693 | B2 | 4/2002 | Fish et al. | 713/1 |
| 6,446,218 | B1 | 9/2002 | D'Souza | 714/4 |
| 6,463,521 | B1 | 10/2002 | Long | 712/213 |
| 6,473,897 | B1 | 10/2002 | Ansari et al. | 717/136 |
| 6,480,818 | B1 | 11/2002 | Alverson et al. | 703/26 |
| 6,496,870 | B1 | 12/2002 | Faustini | 719/316 |
| 6,513,057 | B1 | 1/2003 | McCrory | 718/102 |
| 6,526,491 | B2 | 2/2003 | Suzuoki et al. | 711/164 |
| 6,532,531 | B1 | 3/2003 | O'Connor et al. | 712/202 |
| 6,542,926 | B2 | 4/2003 | Zalewski et al. | 709/213 |
| 6,557,164 | B1 | 4/2003 | Faustini | 717/107 |
| 6,559,854 | B2 | 5/2003 | Oka et al. | 345/619 |
| 6,567,502 | B2 | 5/2003 | Zellner et al. | 379/45 |
| 6,578,068 | B1 | 6/2003 | Bowman-Amuah | 709/203 |
| 6,601,233 | B1 | 7/2003 | Underwood | 717/102 |
| 6,622,219 | B2 | 9/2003 | Tramblay et al. | 711/147 |
| 6,665,700 | B1 | 12/2003 | Takayama et al. | 718/104 |
| 6,684,390 | B1 | 1/2004 | Goff | 717/148 |
| 6,704,926 | B1 | 3/2004 | Blandy et al. | 717/148 |
| 6,718,535 | B1 | 4/2004 | Underwood | 717/101 |
| 6,728,961 | B1 | 4/2004 | Velasco | 718/105 |
| 6,789,252 | B1 | 9/2004 | Burke et al. | 717/100 |
| 6,820,258 | B1 | 11/2004 | Fink et al. | 717/158 |
| 6,862,608 | B2 | 3/2005 | Buhlman et al. | 709/213 |
| 6,892,298 | B2 | 5/2005 | West | 713/2 |
| 6,895,479 | B2 | 5/2005 | Reimer et al. | 711/152 |
| 6,950,848 | B1 | 9/2005 | Yousefi'zadeh | 709/203 |
| 6,966,015 | B2 | 11/2005 | Steinberg et al. | 714/47 |
| 6,966,057 | B2 | 11/2005 | Lueh | 717/158 |
| 6,981,072 | B2 | 12/2005 | Day et al. | 710/22 |
| 6,981,074 | B2 | 12/2005 | Oner et al. | 710/32 |
| 6,990,653 | B1 | 1/2006 | Burd et al. | 717/108 |
| 7,043,579 | B2 | 5/2006 | Dhong et al. | 710/107 |
| 7,047,534 | B2 | 5/2006 | Sadovsky et al. | 719/322 |
| 7,062,768 | B2 | 6/2006 | Kubo et al. | 718/105 |
| 7,080,242 | B2 | 7/2006 | Morris | 713/1 |
| 7,093,258 | B1 | 8/2006 | Miller et al. | 718/105 |
| 7,103,664 | B1 | 9/2006 | Novaes et al. | 709/226 |
| 7,124,170 | B1 | 10/2006 | Sibert | 709/216 |
| 7,127,709 | B2 | 10/2006 | Demsey et al. | 717/148 |
| 7,133,978 | B1 | 11/2006 | James-Roxby et al. | 711/152 |
| 7,134,007 | B2 | 11/2006 | Zimmer et al. | 713/1 |
| 7,137,115 | B2 | 11/2006 | Sakamoto et al. | 718/102 |
| 7,143,419 | B2 | 11/2006 | Fischer et al. | 719/328 |
| 7,146,613 | B2 | 12/2006 | Chauvel et al. | 718/1 |
| 7,165,108 | B2 | 1/2007 | Matena et al. | 709/226 |
| 7,167,916 | B2 | 1/2007 | Willen et al. | 709/226 |
| 7,174,544 | B2 | 2/2007 | Zee | 717/148 |
| 7,210,148 | B2 | 4/2007 | Arnold et al. | 719/330 |
| 7,320,123 | B2 | 1/2008 | Govindaragapuram et al. | 717/124 |
| 7,321,958 | B2 | 1/2008 | Hofstee et al. | 711/153 |
| 7,523,157 | B2 * | 4/2009 | Aguilar et al. | 709/202 |
| 2001/0002130 | A1 | 5/2001 | Suzuoki | 345/420 |
| 2002/0046229 | A1 | 4/2002 | Yutaka et al. | 709/102 |
| 2002/0060690 | A1 | 5/2002 | Tanaka et al. | 345/619 |
| 2002/0095523 | A1 | 7/2002 | Shimakawa et al. | 709/316 |
| 2002/0120886 | A1 | 8/2002 | Nguyen et al. | 714/39 |
| 2002/0135582 | A1 | 9/2002 | Suzuoki et al. | 345/502 |
| 2002/0138637 | A1 | 9/2002 | Suzuoki et al. | 709/230 |
| 2002/0138701 | A1 | 9/2002 | Suzuoki et al. | 711/154 |
| 2002/0138707 | A1 | 9/2002 | Suzuoki et al. | 711/163 |
| 2002/0156993 | A1 | 10/2002 | Suzuoki et al. | 712/30 |
| 2003/0009651 | A1 | 1/2003 | Najam et al. | 712/34 |
| 2003/0018691 | A1 | 1/2003 | Bono | 709/106 |
| 2003/0045612 | A1 | 3/2003 | Misura et al. | 523/456 |
| 2003/0055984 | A1 | 3/2003 | Shimakawa et al. | 709/316 |
| 2003/0071840 | A1 | 4/2003 | Huang et al. | 345/736 |
| 2003/0074650 | A1 | 4/2003 | Akgul et al. | 717/129 |
| 2003/0188045 | A1 | 10/2003 | Jacobson | 710/1 |
| 2004/0123188 | A1 | 6/2004 | Srinivasan et al. | 714/44 |
| 2004/0181785 | A1 | 9/2004 | Zwirner et al. | 717/140 |
| 2004/0236914 | A1 | 11/2004 | Day et al. | 711/152 |
| 2004/0260685 | A1 | 12/2004 | Pfleiger et al. | 707/3 |
| 2005/0028148 | A1 | 2/2005 | Civlin | 717/145 |
| 2005/0081187 | A1 | 4/2005 | Odinak et al. | 717/101 |
| 2005/0081202 | A1 | 4/2005 | Brokenshire et al. | 718/100 |
| 2006/0047754 | A1 | 3/2006 | Wenkata Subramanian et al. | 709/206 |

FOREIGN PATENT DOCUMENTS

| | | |
|---|---|---|
| JP | 06-044110 | 2/1994 |
| JP | 08-095757 | 4/1996 |
| JP | 08-147171 | 6/1996 |
| JP | 10-269165 | 10/1998 |
| JP | 2002-342165 | 11/2002 |
| JP | 2002-366534 | 12/2002 |
| JP | 2003-140912 | 5/2003 |

OTHER PUBLICATIONS

Richard M. Stallman, Using and Porting the GNU Compiler Collection for GCC 3.1, Jun. 22, 2001, Published by the Free Software Foundation, pp. 1-18, 75, and 269-275.

Oram et al., "Managing Projects with make," O'Reilly & Associates, Inc., ISBN 0-937175-90-0, Oct. 1995, pp. 78-80.

IBM Dictionary of Computing, George McDaniel, 1994, p. 692.

Per Bothner, "Compiling Java with GCJ," Linux Journal, Jan. 2003, http://www.linuxjournal.com/article/4860, pp. 1-7.

Kent, "The Co-Design of Virtual Machine Using Reconfigurable Hardware," Submission 2003, University of Victoria, pp. 1-185.

Du Bois, et al., "Distributed Execution of Functional Programs Using JVM," EUROCAST 2001, pp. 570-582.

Antoniu et al., "The Hyperion System: Compiling multithread Java bytecode for Distributed Execution," Parellel Computing 27, 2001, pp. 1279-1297.

Sirer et al., "Design and Implementation of a Distributed Virtual Machine for Networked Computers," University of Washington, ACM, 1999, pp. 202-216.

Notice of Allowance for co-pending U.S. Appl. No. 12/042,254, mailed Sep. 11, 2009, 18 pages.

Notice of Allowance for U.S. Appl. No. 12/145,709, mailed Nov. 16, 2009, 33 pages.

* cited by examiner

Key Control Table

3302

3304 3306 3308

| ID | SPU Key | Key Mask |
|---|---|---|
| o | SPU Key | Key Mask |
| 1 | SPU Key | Key Mask |
| 2 | SPU Key | Key Mask |
| | ⋮ | |
| 7 | SPU Key | Key Mask |

*Figure 33*

| Device Configuration File | |
|---|---|
| **Device Access Path** | **Device** |
| /dev/spu1 | SPU 1 |
| /dev/spu2 | SPU 2 |
| ... | ... |
| /dev/spuN | SPU N |
| ... | ... |
| /dev/floppy | Floppy Disk Drive |
| /dev/disk | Hard Disk Drive |
| ... | ... |

| Application Code |
|---|
| Instructions |
| write(/dev/spu2, …) |
| ... |
| Instructions |
| ioctl(/dev/spu2…) |
| ... |

MANAGING A PLURALITY OF PROCESSORS AS DEVICES

RELATED APPLICATIONS

This application is a continuation application of co-pending U.S. Non-Provisional patent application Ser. No. 10/670,823, entitled "Managing a Plurality of Processors as Devices," filed on Sep. 25, 2003.

BACKGROUND OF THE INVENTION

1. Technical Field

The present invention relates in general to a system and method for managing a plurality of processors as devices. In particular, the present invention relates to a system and a method for applications to directly access a plurality of processors using device-oriented instructions.

2. Description of the Related Art

In most multiprocessor systems, access to the processors is facilitated through the operating system, which is executing on one or more of the processors (typically the main processor). Applications typically are unaware of a computer system's processor configuration. When an application requests the execution of a process, the operating system determines which of the multiple processors is to execute the process. In addition, the operating system determines when and if to swap a process executing on a particular processor for another. A programmer typically does not have direct control of a computer system's processor resources.

There are many instances when a programmer would like to have direct access to each of the available processors. In gaming applications, for example, programmers are always searching for the most direct control over a computer system's resources and in particular a computer system's multiple processors.

What is needed, therefore, is a system and method that could provide a programmer with such direct access to the multiple processors of a computer system. The system and method should provide a programmer with access to the multiple processors similar to the access a programmer has to other devices connected to the computer system such as printers, disk drives, and the like.

SUMMARY

It has been discovered that the aforementioned challenges can be addressed by a method and a system for managing a computer system's multiple processors as devices. Applications, through the operating system, access the multiple processors of a computer system using processor device modules similar to the way applications access other devices connected to the computer system such as disk drives, printers, etc.

An operating system is executing on at least one first processor of the computer system. A device module corresponding to one or more secondary processors is loaded into the operating system. The device module facilitates a communication between an application seeking access to one or more of the secondary processors and the secondary processors. The device module extends the operating system such that the operating system can execute the device-oriented instructions. The operating system is configured to create an instructions block for the secondary processors to use in processing the application's task.

Device-like access is set up for one or more of the secondary processors. The device-like access may be used by an application to access one or more of the secondary processors. Similar access, for example, may be used by an application to access other devices connected to the computer system, such as disk drives, printers, etc. Information about the set up device-like access for the secondary processors is stored in a device configuration file.

An application seeking access to the one or more secondary processors is loaded by the operating system. The application code includes device-oriented instructions adapted to control one or more of the secondary processors. The loaded device module determines for which secondary processor the application's instructions are intended. The determination may be performed using information from the device configuration file. The application may also provide the one or more secondary processors with data to be processed. The one or more secondary processors process the data according to the instructions provided by the application and notify the operating system of the end of the processing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 33 illustrates the structure of a key control table for a hardware sandbox in accordance with the present invention;

FIG. 45A is a table illustrating a device configuration file that contains device access paths and corresponding devices;

FIG. 45B is a table illustrating example application code for accessing a system's multiple processors;

DETAILED DESCRIPTION

The following is intended to provide a detailed description of an example of the invention and should not be taken to be limiting of the invention itself. Rather, any number of variations may fall within the scope of the invention defined in the claims following the description.

Figure 1:
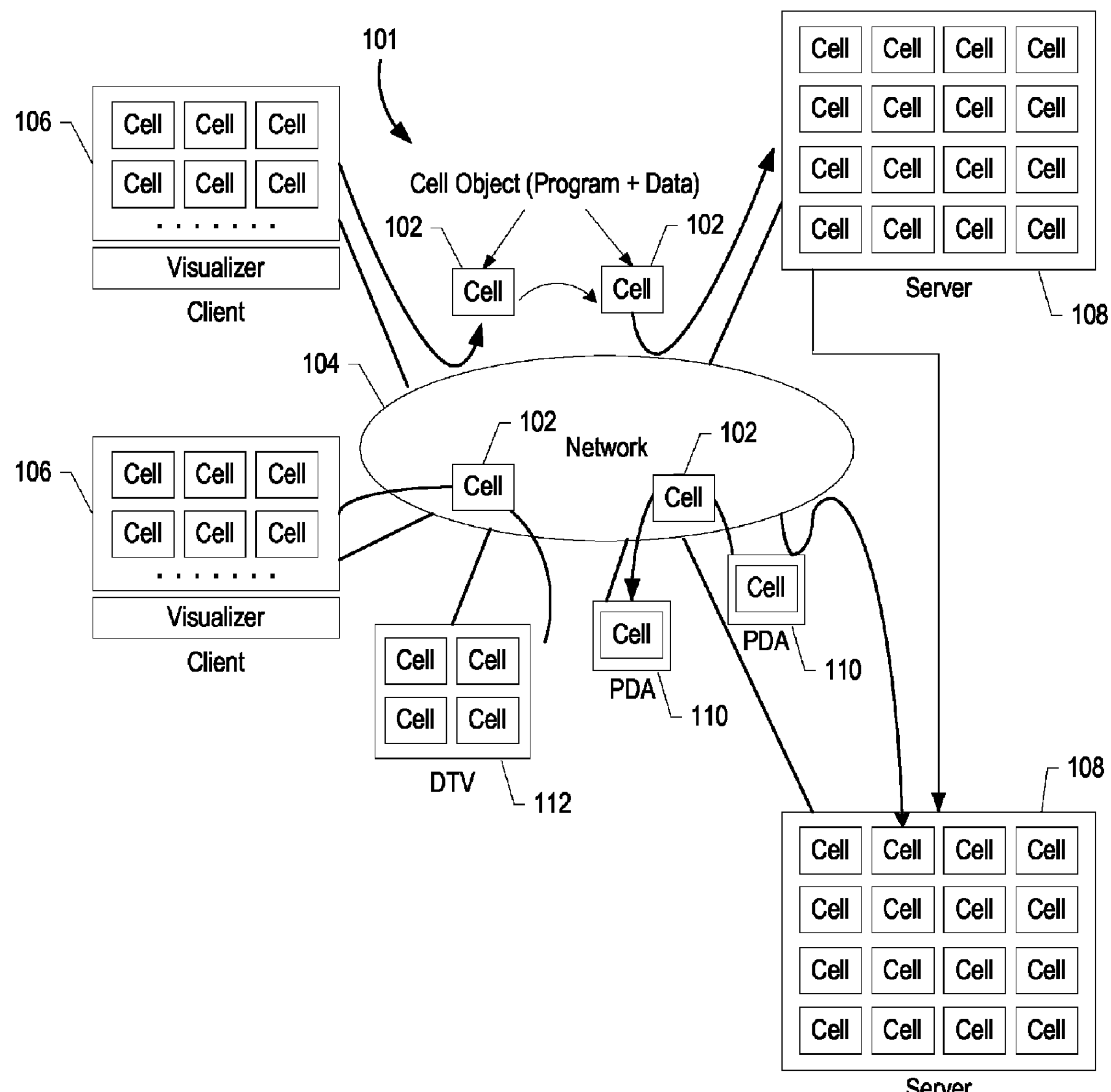
FIG. 1 illustrates—the overall architecture of a computer network in accordance with the present invention.

The overall architecture for a computer system 101 in accordance with the present invention is shown in FIG. 1.

As illustrated in this figure, system 101 includes network 104 to which is connected a plurality of computers and computing devices. Network 104 can be a LAN, a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same ISA and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than today's networks.

Figure 2:
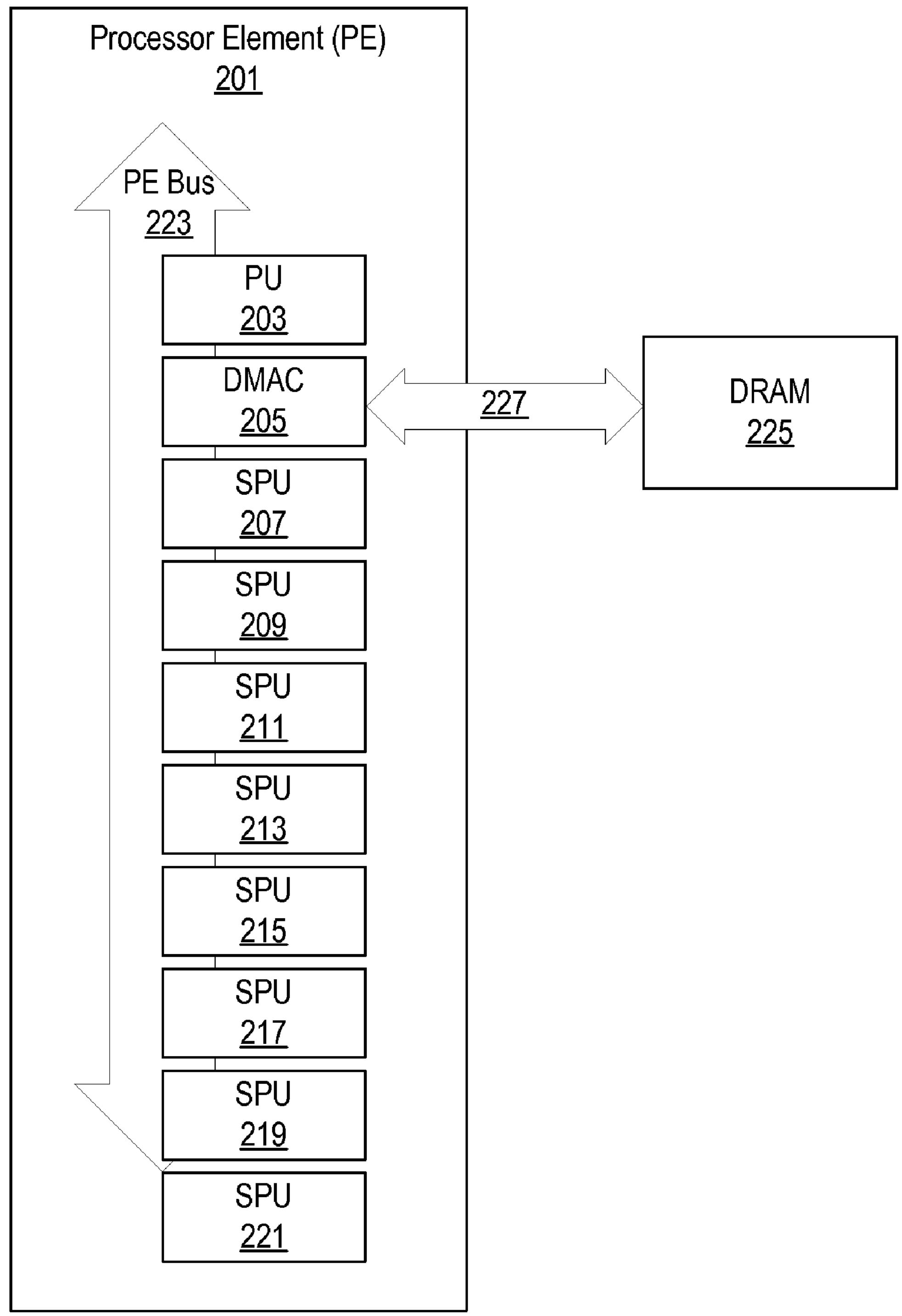
FIG. 2 is a diagram illustrating the structure of a processing unit (PU) in accordance with the present invention.

The basic processing module for all members of network 104 is the processing unit (PU). FIG. 2 illustrates the structure of a PU. As shown in this figure, PE 201 comprises a processing unit (PU) 203, a direct memory access controller (DMAC) 205 and a plurality of synergistic processing units (SPUs), namely, SPU 207, SPU 209, SPU 211, SPU 213, SPU 215, SPU 217, SPU 219 and SPU 221. A local PE bus 223 transmits data and applications among the SPUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the SPUs and PU of PE 201. As further discussed below, DMAC 205 designates for each SPU an exclusive area in DRAM 225 into which only the SPU can write data and from which only the SPU can read data. This exclusive area is designated a "sandbox."

PU 203 can be, e.g., a standard processor capable of standalone processing of data and applications. In operation, PU 203 schedules and orchestrates the processing of data and applications by the SPUs. The SPUs preferably are single instruction, multiple data (SIMD) processors. Under the control of PU 203, the SPUs perform the processing of these data and applications in a parallel and independent manner. DMAC 205 controls accesses by PU 203 and the SPUs to the data and applications stored in the shared DRAM 225. Although PE 201 preferably includes eight SPUs, a greater or lesser number of SPUs can be employed in a PU depending upon the processing power required. Also, a number of PUs, such as PE 201, may be joined or packaged together to provide enhanced processing power.

Figure 3:
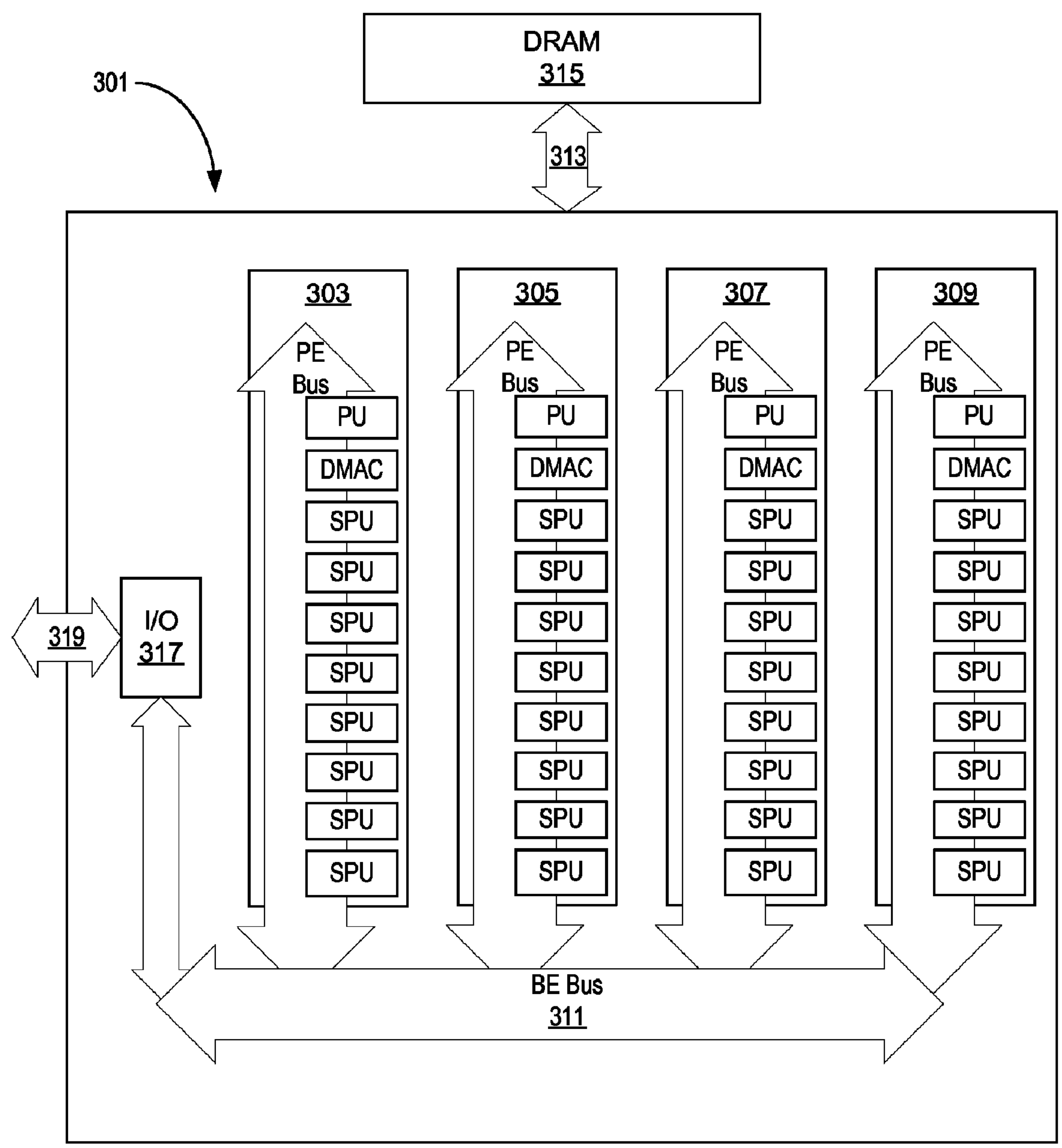
FIG. 3 is a diagram illustrating the structure of a broadband engine (BE) in accordance with the present invention.

For example, as shown in FIG. 3, four PUs may be packaged or joined together, e.g., within one or more chip packages, to form a single processor for a member of network 104. This configuration is designated a broadband engine (BE). As shown in FIG. 3, BE 301 contains four PUs, namely, PE 303, PE 305, PE 307 and PE 309. Communications among these PUs are over BE bus 311. Broad bandwidth memory connection 313 provides communication between shared DRAM 315 and these PUs. In lieu of BE bus 311, communications among the PUs of BE 301 can occur through DRAM 315 and this memory connection.

Input/output (I/O) interface 317 and external bus 319 provide communications between broadband engine 301 and the other members of network 104. Each PU of BE 301 performs processing of data and applications in a parallel and independent manner analogous to the parallel and independent processing of applications and data performed by the SPUs of a PU.

Figure 4:
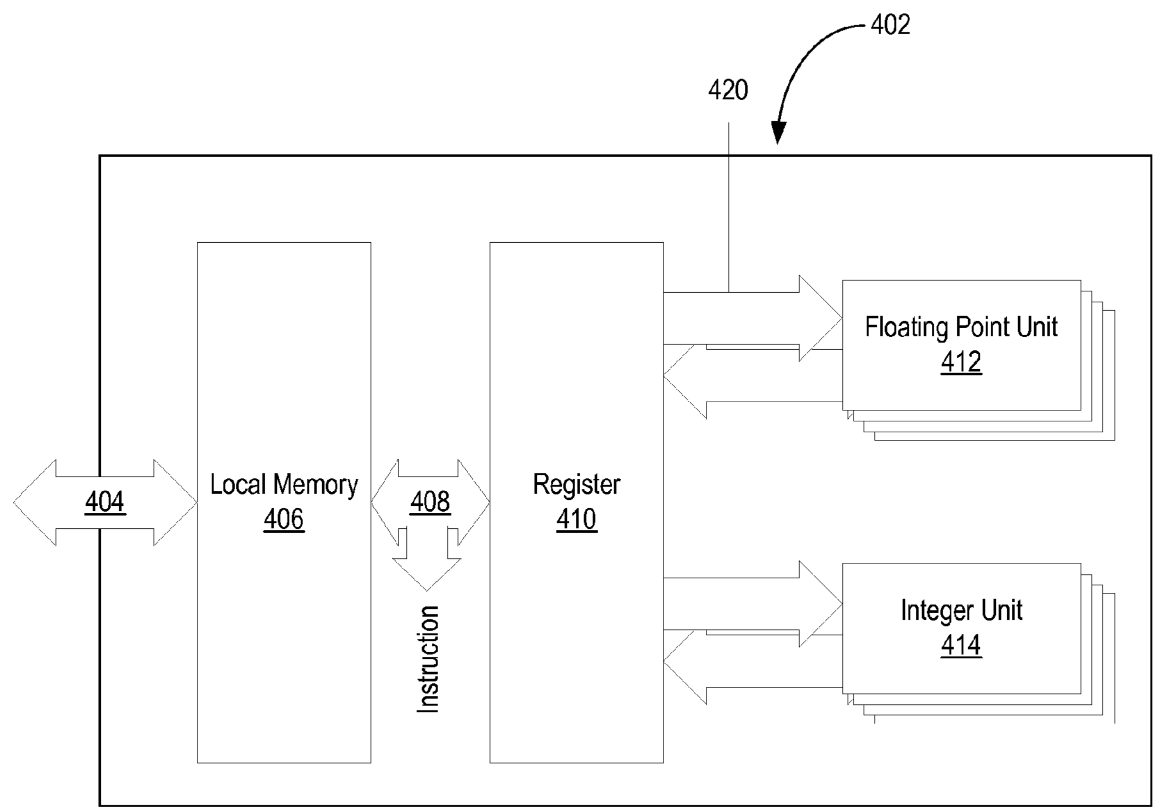
FIG. 4 is a diagram illustrating the structure of an synergistic processing unit (SPU) in accordance with the present invention.

FIG. 4 illustrates the structure of an SPU. SPU 402 includes local memory 406, registers 410, four floating point units 412 and four integer units 414. Again, however, depending upon the processing power required, a greater or lesser number of floating points units 412 and integer units 414 can be employed. In a preferred embodiment, local memory 406 contains 128 kilobytes of storage, and the capacity of registers 410 is 128.times.128 bits. Floating point units 412 preferably operate at a speed of 32 billion floating point operations per second (32 GFLOPS), and integer units 414 preferably operate at a speed of 32 billion operations per second (32 GOPS).

Local memory 406 is not a cache memory. Local memory 406 is preferably constructed as an SRAM. Cache coherency support for an SPU is unnecessary. A PU may require cache coherency support for direct memory accesses initiated by the PU. Cache coherency support is not required, however, for direct memory accesses initiated by an SPU or for accesses from and to external devices.

SPU 402 further includes bus 404 for transmitting applications and data to and from the SPU. In a preferred embodiment, this bus is 1,024 bits wide. SPU 402 further includes internal busses 408, 420 and 418. In a preferred embodiment, bus 408 has a width of 256 bits and provides communications between local memory 406 and registers 410. Busses 420 and 418 provide communications between, respectively, registers 410 and floating point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
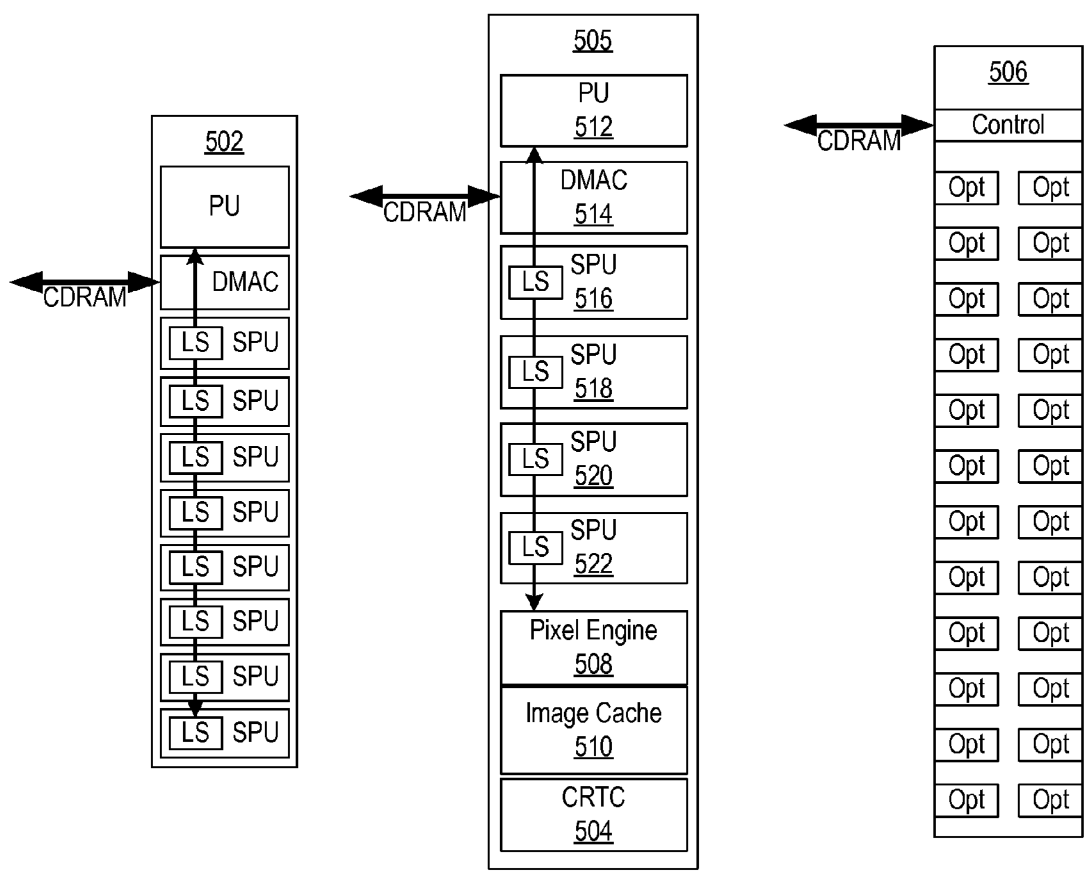
FIG. 5 is a diagram illustrating the structure of a processing unit, visualizer (VS) and an optical interface in accordance with the present invention.
Figure 6:
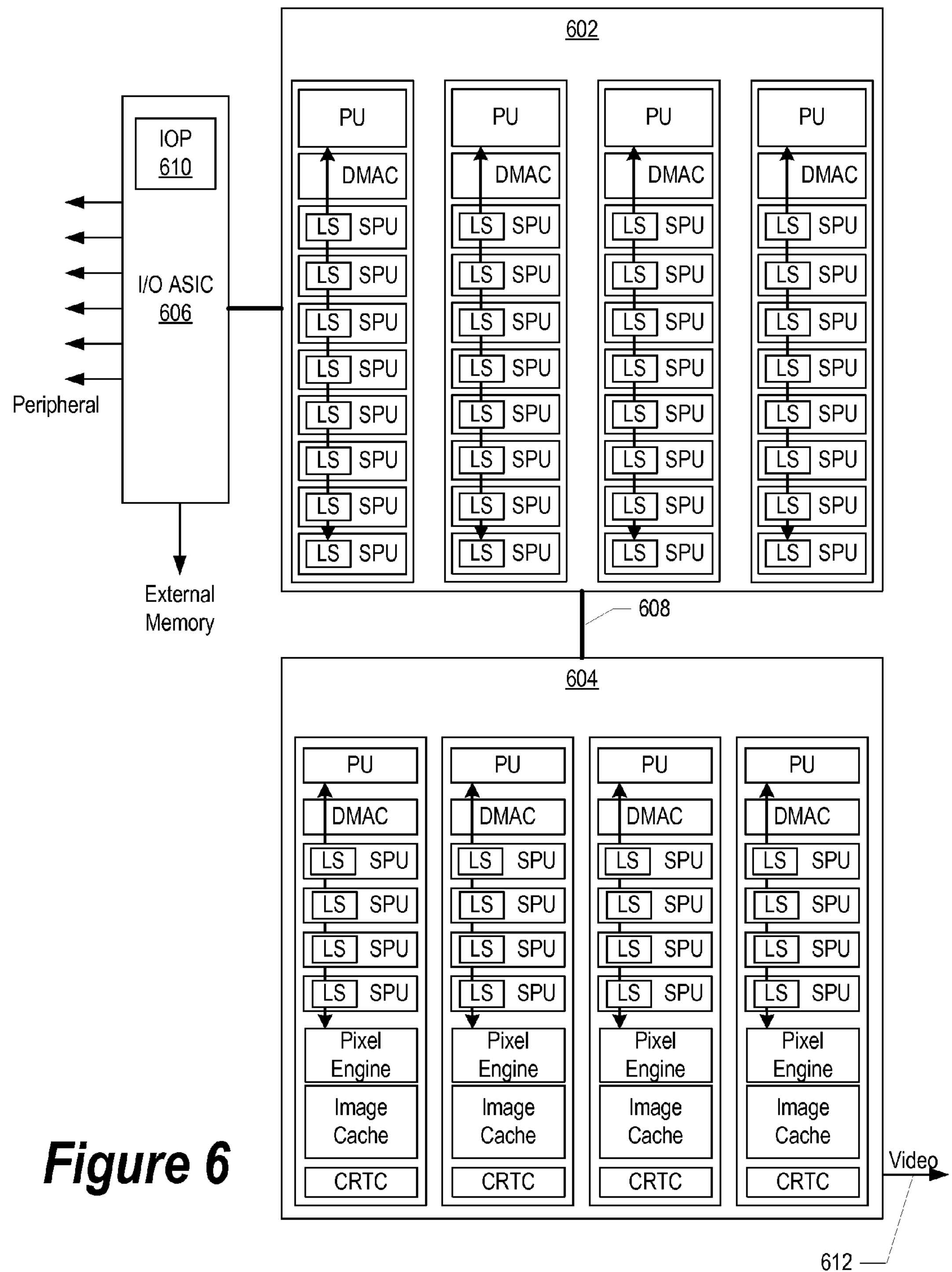
FIG. 6 is a diagram illustrating one combination of processing units in accordance with the present invention.

FIGS. 5-10 further illustrate the modular structure of the processors of the members of network 104. For example, as shown in FIG. 5, a processor may comprise a single PU 502. As discussed above, this PU typically comprises a PU, DMAC and eight SPUs. Each SPU includes local storage (LS). On the other hand, a processor may comprise the structure of visualizer (VS) 505. As shown in FIG. 5, VS 505 comprises PU 512, DMAC 514 and four SPUs, namely, SPU 516, SPU 518, SPU 520 and SPU 522. The space within the chip package normally occupied by the other four SPUs of a PU is occupied in this case by pixel engine 508, image cache 510 and cathode ray tube controller (CRTC) 504. Depending upon the speed of communications required for PU 502 or VS 505, optical interface 506 also may be included on the chip package.

Using this standardized, modular structure, numerous other variations of processors can be constructed easily and efficiently. For example, the processor shown in FIG. 6 comprises two chip packages, namely, chip package 602 comprising a BE and chip package 604 comprising four VSs. Input/output (I/O) 606 provides an interface between the BE of chip package 602 and network 104. Bus 608 provides communications between chip package 602 and chip package 604. Input output processor (IOP) 610 controls the flow of data into and out of I/O 606. I/O 606 may be fabricated as an application specific integrated circuit (ASIC). The output from the VSs is video signal 612.

Figure 7:
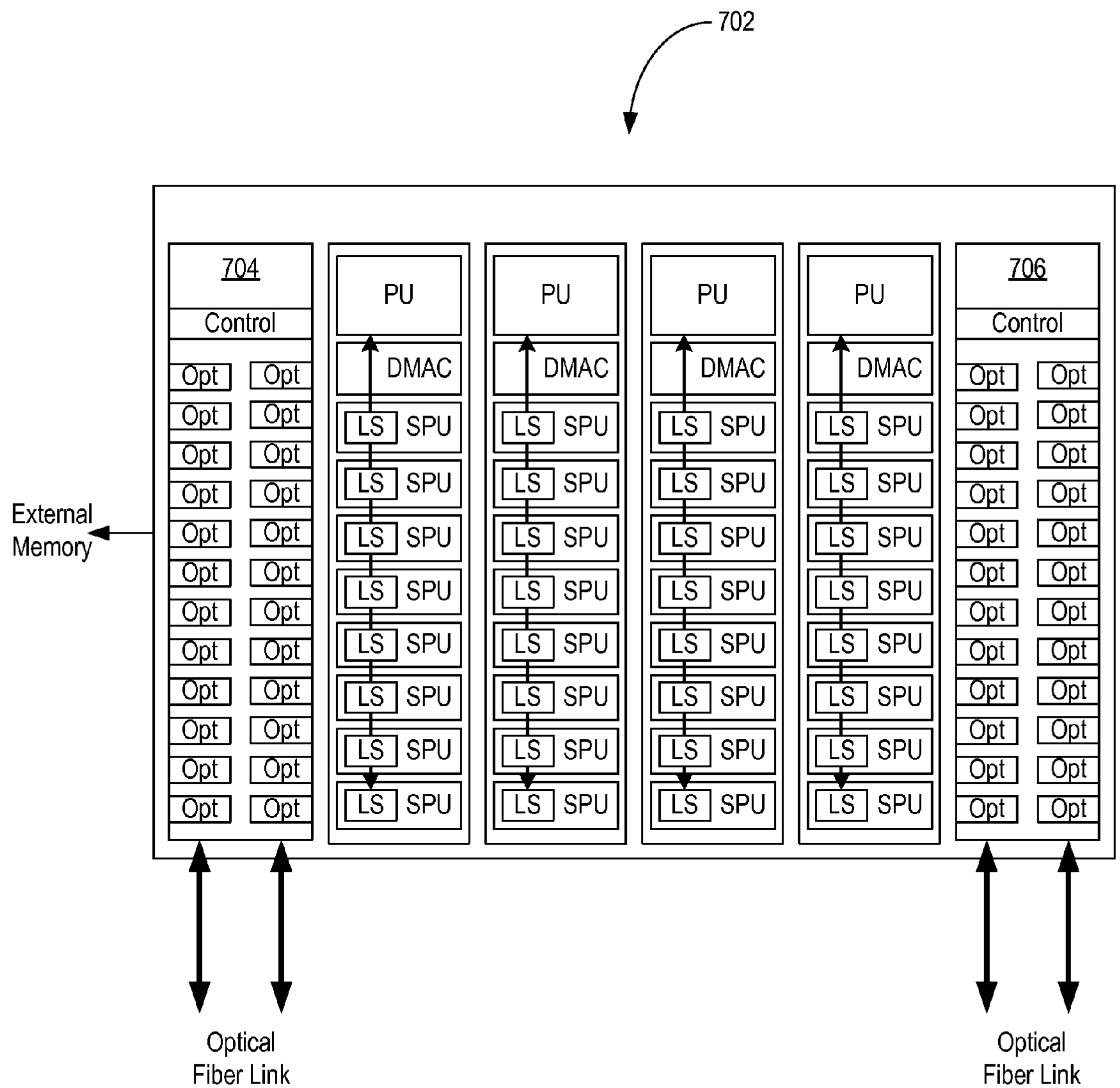
FIG. 7 illustrates another combination of processing units in accordance with the present invention.

FIG. 7 illustrates a chip package for a BE 702 with two optical interfaces 704 and 706 for providing ultra high speed communications to the other members of network 104 (or other chip packages locally connected). BE 702 can function as, e.g., a server on network 104.

Figure 8:
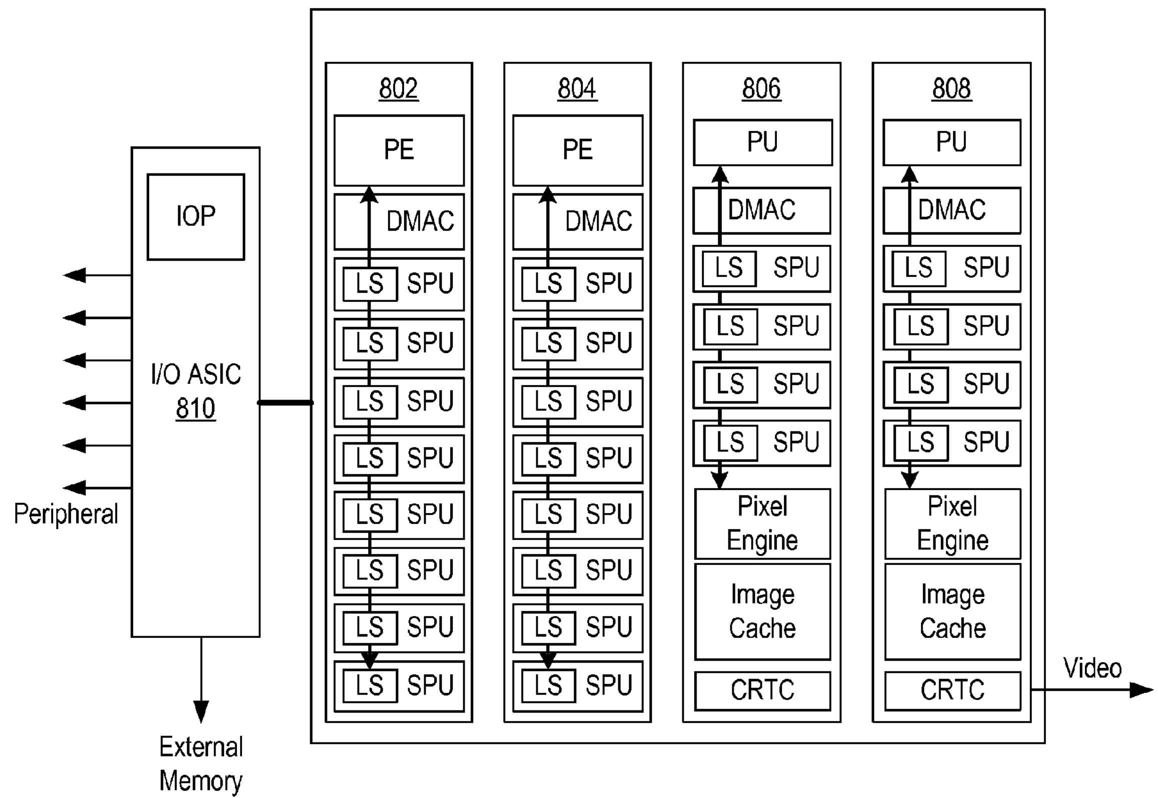
FIG. 8 illustrates yet another combination of processing units in accordance with the present invention.

The chip package of FIG. 8 comprises two PEs 802 and 804 and two VSs 806 and 808. An I/O 810 provides an interface between the chip package and network 104. The output from the chip package is a video signal. This configuration may function as, e.g., a graphics work station.

Figure 9:
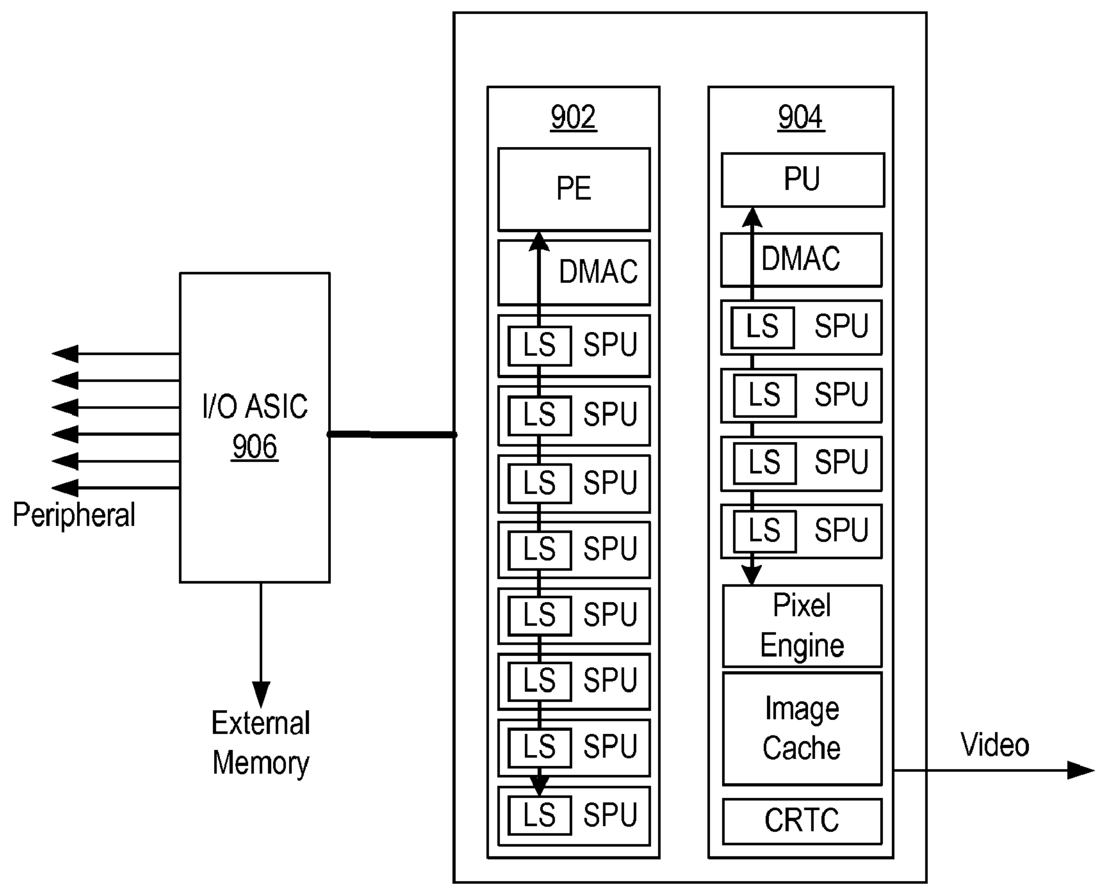
FIG. 9 illustrates yet another combination of processing units in accordance with the present invention.

FIG. 9 illustrates yet another configuration. This configuration contains one-half of the processing power of the configuration illustrated in FIG. 8. Instead of two PUs, one PE 902 is provided, and instead of two VSs, one VS 904 is provided. I/O 906 has one-half the bandwidth of the I/O illustrated in FIG. 8. Such a processor also may function, however, as a graphics work station.

Figure 10:
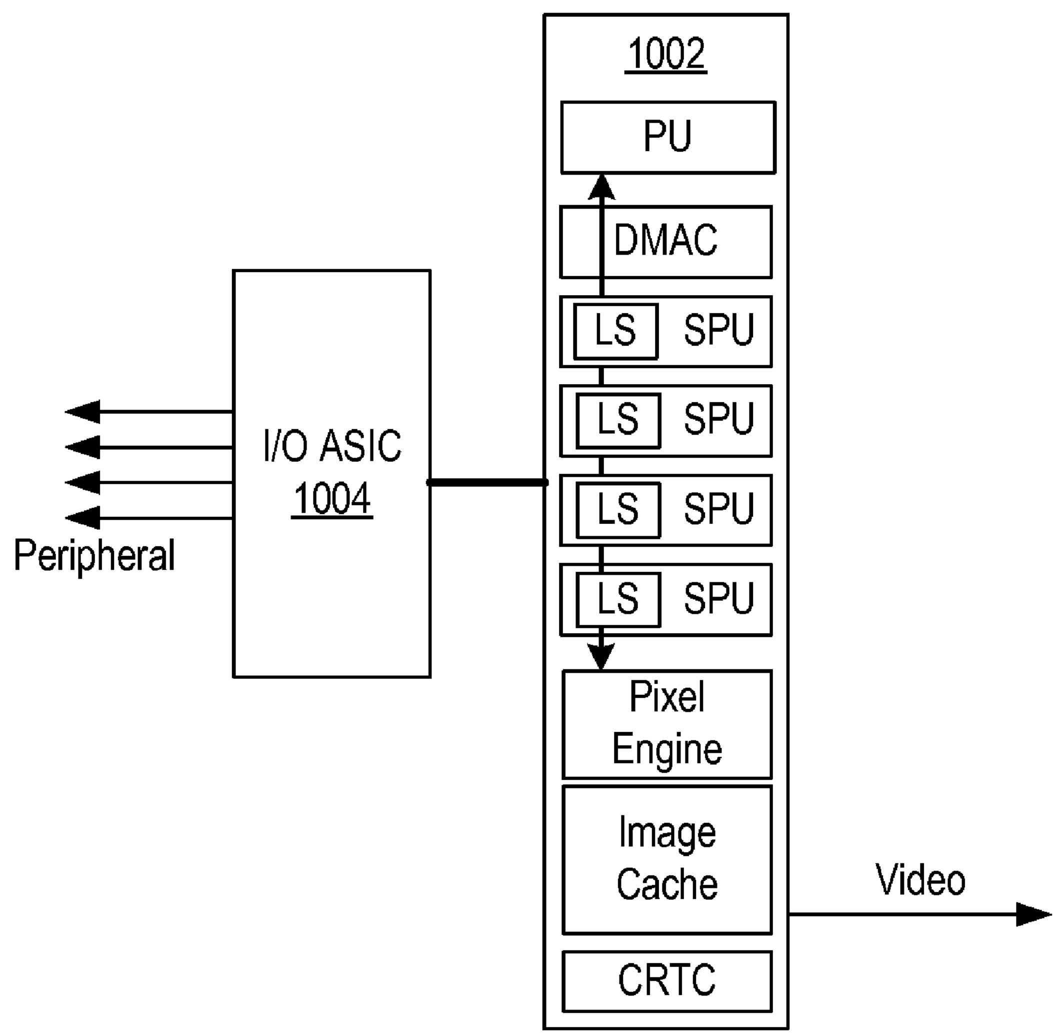
FIG. 10 illustrates yet another combination of processing units in accordance with the present invention.

A final configuration is shown in FIG. 10. This processor consists of only a single VS 1002 and an I/O 1004. This configuration may function as, e.g., a PDA.

Figure 11A:
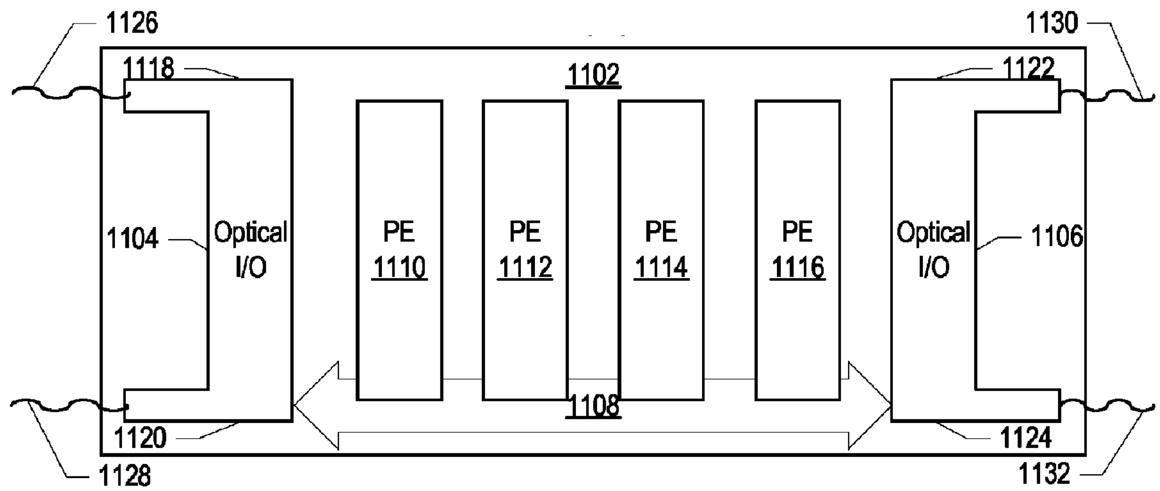
FIG. 11A illustrates the integration of optical interfaces within a chip package in accordance with the present invention.

FIG. 11A illustrates the integration of optical interfaces into a chip package of a processor of network 104. These optical interfaces convert optical signals to electrical signals and electrical signals to optical signals and can be constructed from a variety of materials including, e.g., gallium arsinide, aluminum gallium arsinide, germanium and other elements or compounds. As shown in this figure, optical interfaces 1104 and 1106 are fabricated on the chip package of BE 1102. BE bus 1108 provides communication among the PUs of BE 1102, namely, PE 1110, PE 1112, PE 1114, PE 1116, and these optical interfaces. Optical interface 1104 includes two ports, namely, port 1118 and port 1120, and optical interface 1106 also includes two ports, namely, port 1122 and port 1124. Ports 1118, 1120, 1122 and 1124 are connected to, respectively, optical wave guides 1126, 1128, 1130 and 1132. Optical signals are transmitted to and from BE 1102 through these optical wave guides via the ports of optical interfaces 1104 and 1106.

Figure 11B:
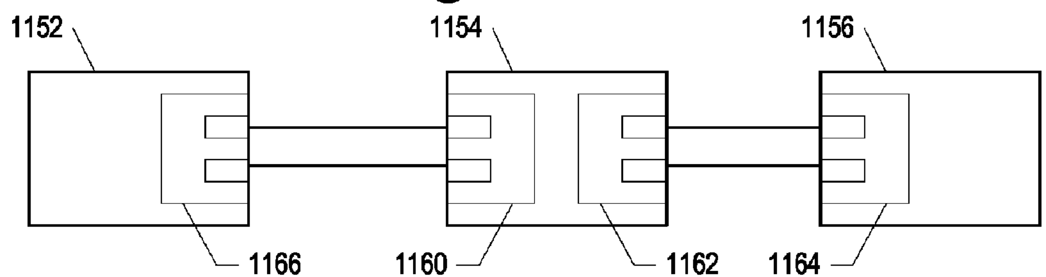
FIG. 11B is a diagram of one configuration of processors using the optical interfaces of FIG. 11A.

A plurality of BEs can be connected together in various configurations using such optical wave guides and the four optical ports of each BE. For example, as shown in FIG. 11B, two or more BEs, e.g., BE 1152, BE 1154 and BE 1156, can be connected serially through such optical ports. In this example, optical interface 1166 of BE 1152 is connected through its optical ports to the optical ports of optical interface 1160 of BE 1154. In a similar manner, the optical ports of optical interface 1162 on BE 1154 are connected to the optical ports of optical interface 1164 of BE 1156.

Figure 11C:
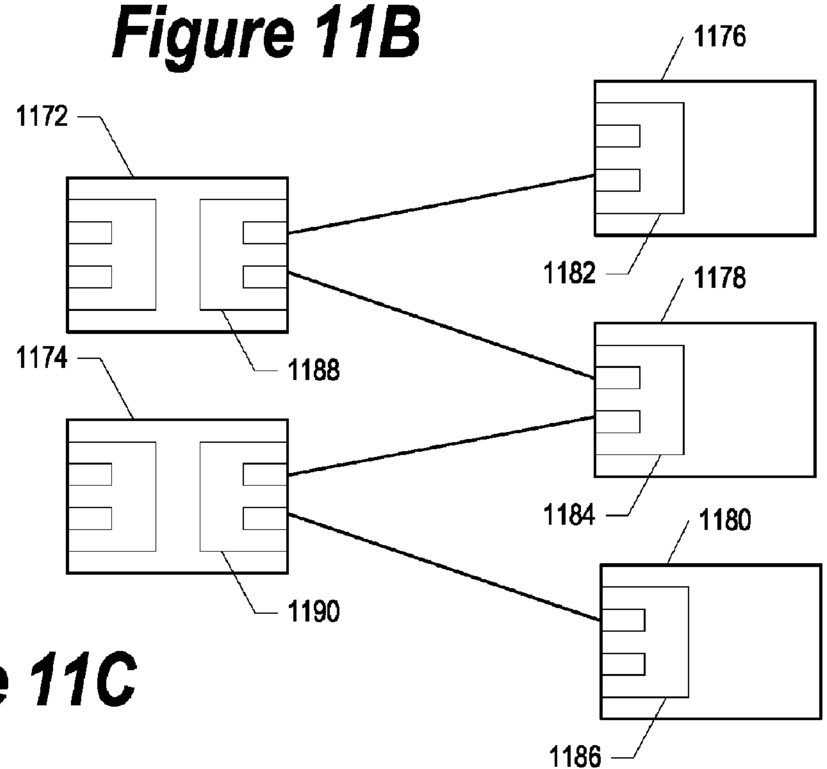
FIG. 11C is a diagram of another configuration of processors using the optical interfaces of FIG. 11A.

A matrix configuration is illustrated in FIG. 11C. In this configuration, the optical interface of each BE is connected to two other BEs. As shown in this figure, one of the optical ports of optical interface 1188 of BE 1172 is connected to an optical port of optical interface 1182 of BE 1176. The other optical port of optical interface 1188 is connected to an optical port of optical interface 1184 of BE 1178. In a similar manner, one optical port of optical interface 1190 of BE 1174 is connected to the other optical port of optical interface 1184 of BE 1178. The other optical port of optical interface 1190 is connected to an optical port of optical interface 1186 of BE 1180. This matrix configuration can be extended in a similar manner to other BEs.

Using either a serial configuration or a matrix configuration, a processor for network 104 can be constructed of any desired size and power. Of course, additional ports can be added to the optical interfaces of the BEs, or to processors having a greater or lesser number of PUs than a BE, to form other configurations.

Figure 12A:
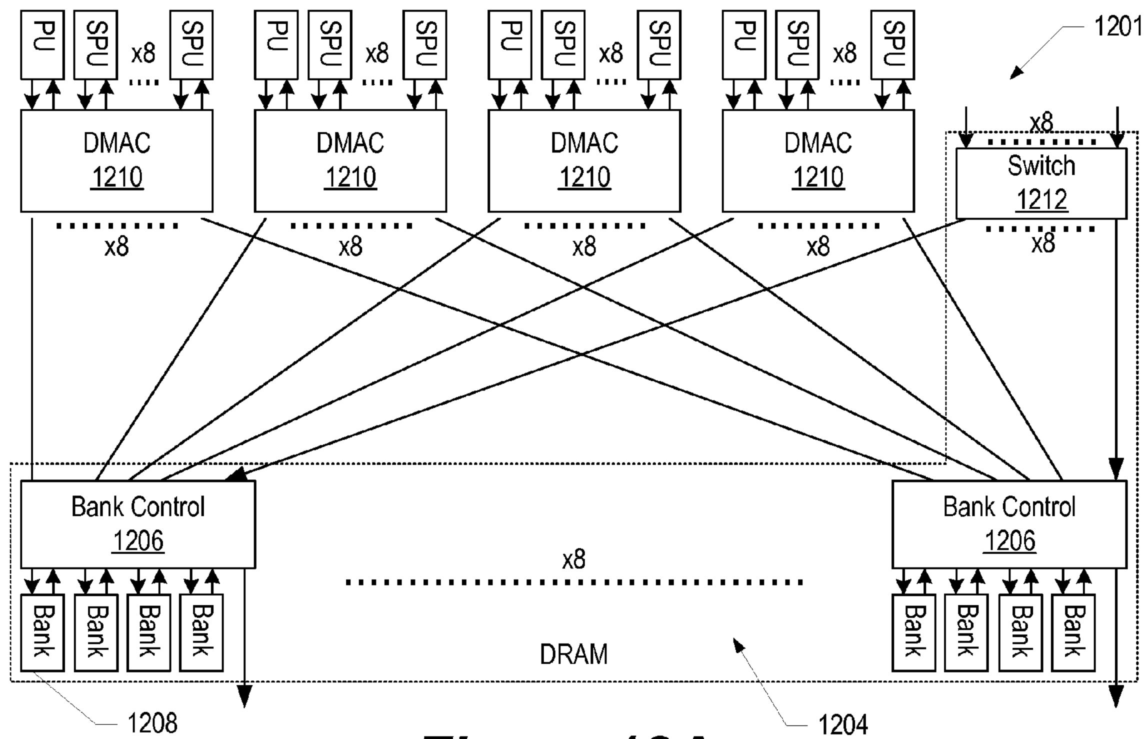
FIG. 12A illustrates the structure of a memory system in accordance with the present invention.

FIG. 12A illustrates the control system and structure for the DRAM of a BE. A similar control system and structure is employed in processors having other sizes and containing more or less PUs. As shown in this figure, a cross-bar switch connects each DMAC 1210 of the four PUs comprising BE 1201 to eight bank controls 1206. Each bank control 1206 controls eight banks 1208 (only four are shown in the figure) of DRAM 1204. DRAM 1204, therefore, comprises a total of sixty-four banks. In a preferred embodiment, DRAM 1204 has a capacity of 64 megabytes, and each bank has a capacity of 1 megabyte. The smallest addressable unit within each bank, in this preferred embodiment, is a block of 1024 bits.

BE 1201 also includes switch unit 1212. Switch unit 1212 enables other SPUs on BEs closely coupled to BE 1201 to access DRAM 1204. A second BE, therefore, can be closely coupled to a first BE, and each SPU of each BE can address twice the number of memory locations normally accessible to an SPU. The direct reading or writing of data from or to the DRAM of a first BE from or to the DRAM of a second BE can occur through a switch unit such as switch unit 1212.

Figure 12B:
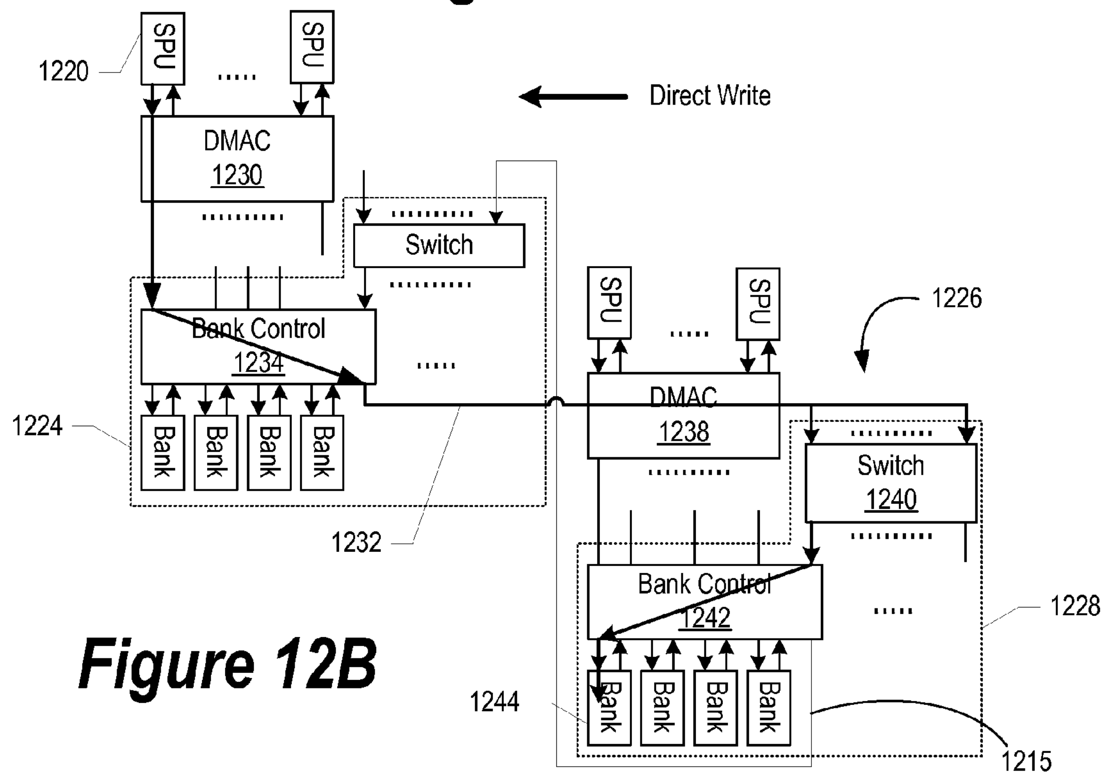
FIG. 12B illustrates the writing of data from a first broadband engine to a second broadband engine in accordance with the present invention.

For example, as shown in FIG. 12B, to accomplish such writing, the SPU of a first BE, e.g., SPU 1220 of BE 1222, issues a write command to a memory location of a DRAM of a second BE, e.g., DRAM 1228 of BE 1226 (rather than, as in the usual case, to DRAM 1224 of BE 1222). DMAC 1230 of BE 1222 sends the write command through cross-bar switch 1221 to bank control 1234, and bank control 1234 transmits the command to an external port 1232 connected to bank control 1234. DMAC 1238 of BE 1226 receives the write command and transfers this command to switch unit 1240 of BE 1226. Switch unit 1240 identifies the DRAM address contained in the write command and sends the data for storage in this address through bank control 1242 of BE 1226 to bank 1244 of DRAM 1228. Switch unit 1240, therefore, enables both DRAM 1224 and DRAM 1228 to function as a single memory space for the SPUs of BE 1226.

Figure 13:
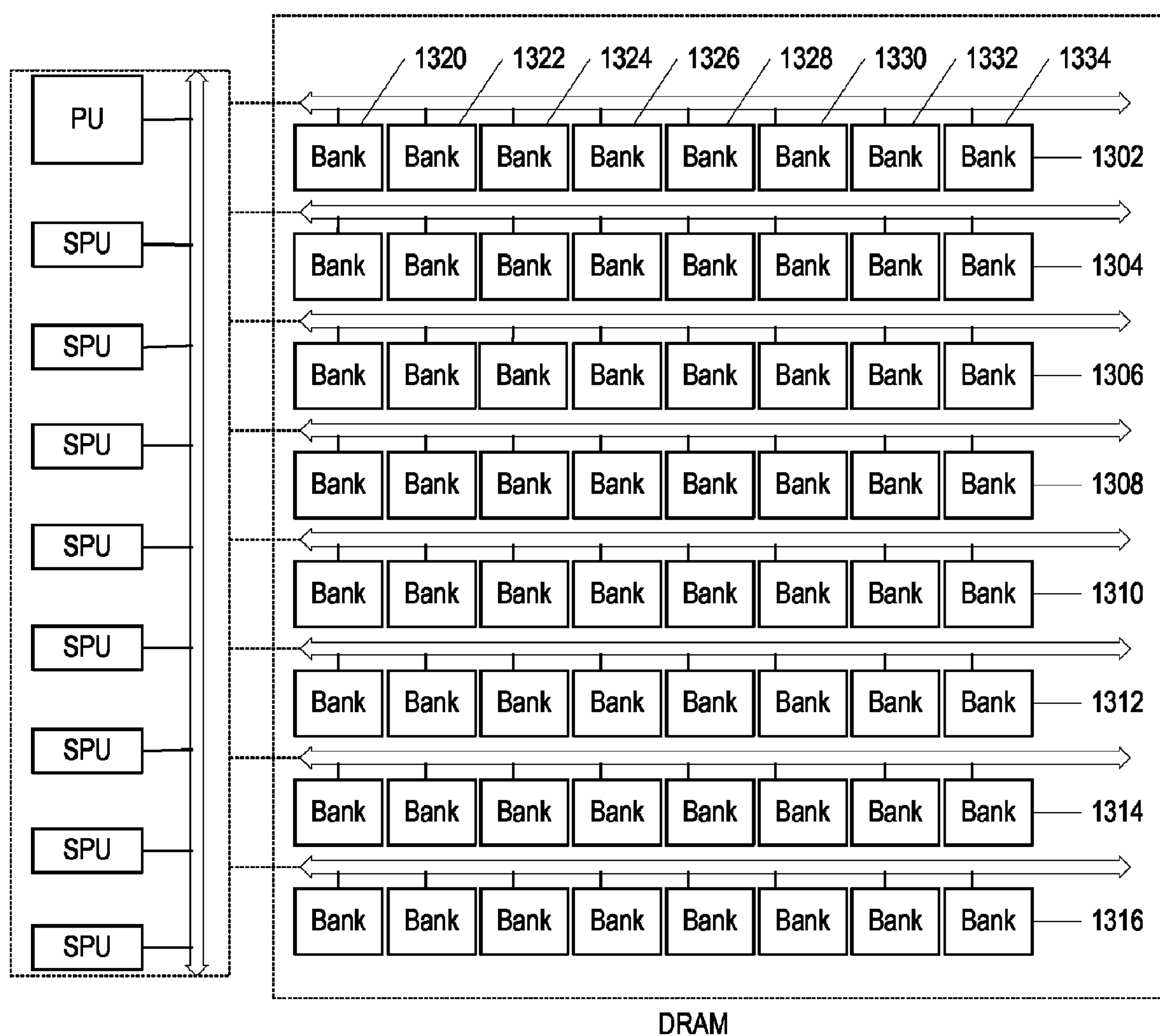
FIG. 13 is a diagram of the structure of a shared memory for a processing unit in accordance with the present invention.

FIG. 13 shows the configuration of the sixty-four banks of a DRAM. These banks are arranged into eight rows, namely, rows 1302, 1304, 1306, 1308, 1310, 1312, 1314 and 1316 and eight columns, namely, columns 1320, 1322, 1324, 1326, 1328, 1330, 1332 and 1334. Each row is controlled by a bank controller. Each bank controller, therefore, controls eight megabytes of memory.

Figure 14A:
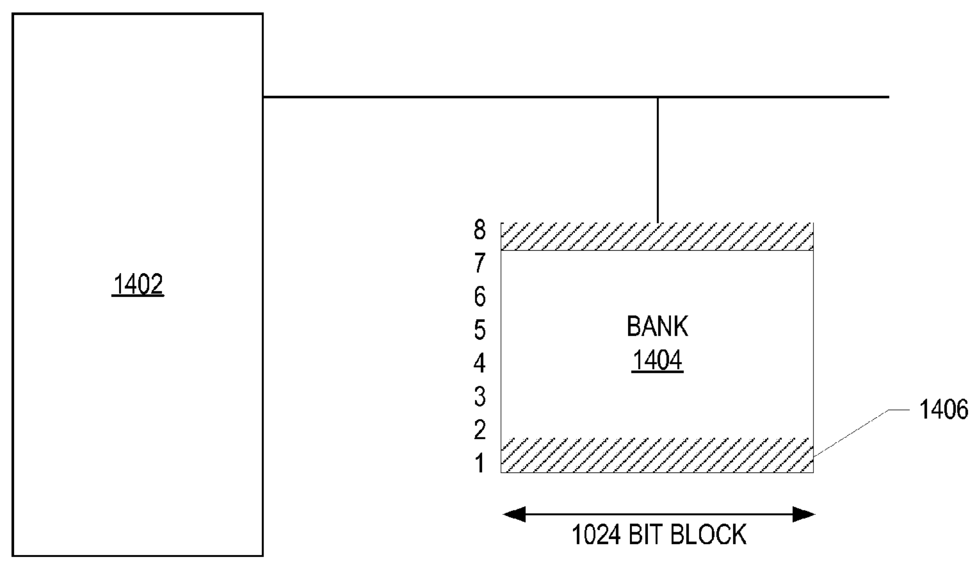
FIG. 14A illustrates one structure for a bank of the memory shown in FIG. 13.
Figure 14B:
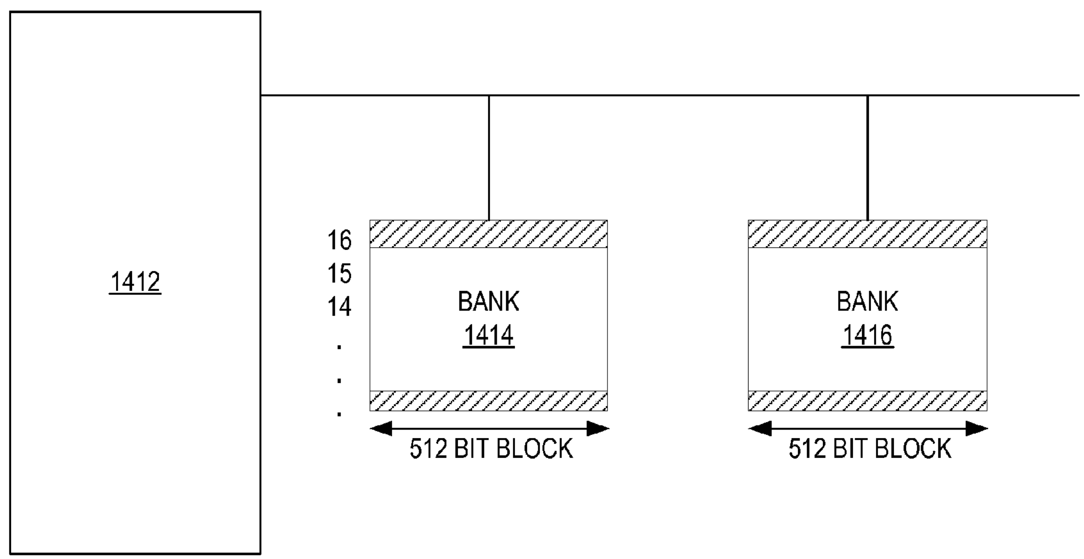
FIG. 14B illustrates another structure for a bank of the memory shown in FIG. 13.

FIGS. 14A and 14B illustrate different configurations for storing and accessing the smallest addressable memory unit of a DRAM, e.g., a block of 1024 bits. In FIG. 14A, DMAC 1402 stores in a single bank 1404 eight 1024 bit blocks 1406. In FIG. 14B, on the other hand, while DMAC 1412 reads and writes blocks of data containing 1024 bits, these blocks are interleaved between two banks, namely, bank 1414 and bank 1416. Each of these banks, therefore, contains sixteen blocks of data, and each block of data contains 512 bits. This interleaving can facilitate faster accessing of the DRAM and is useful in the processing of certain applications.

Figure 15:
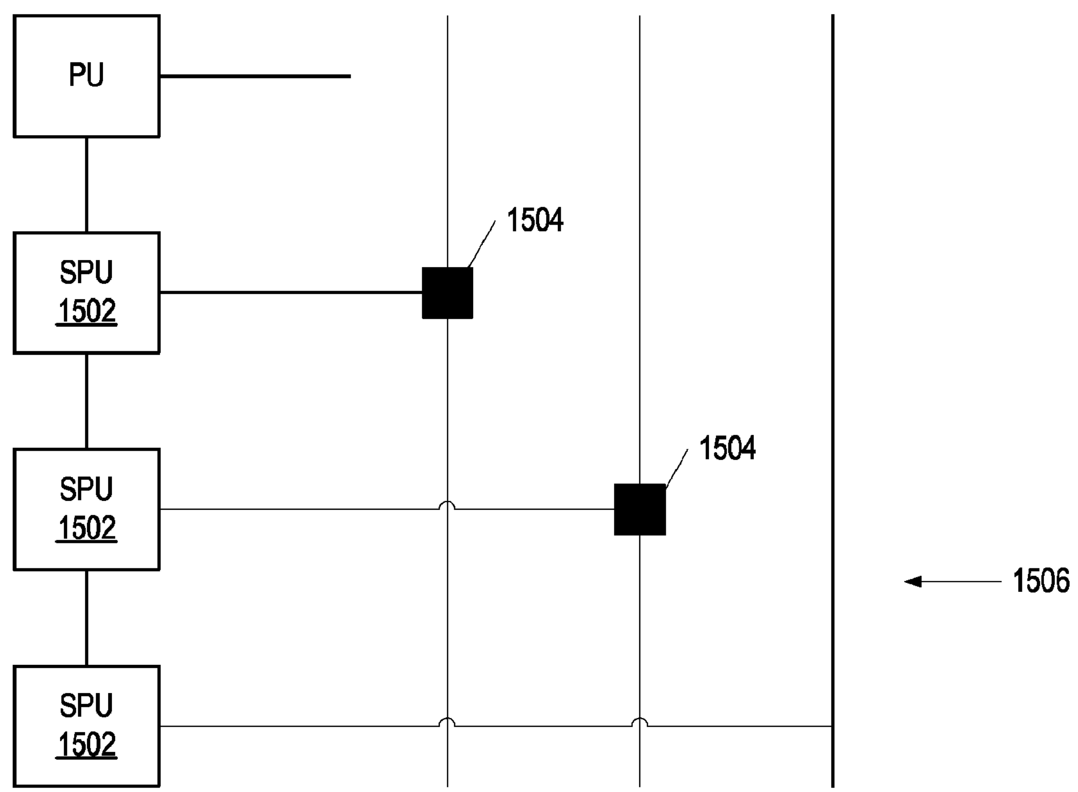
FIG. 15 illustrates a structure for a direct memory access controller in accordance with the present invention.

FIG. 15 illustrates the architecture for a DMAC 1504 within a PE. As illustrated in this figure, the structural hardware comprising DMAC 1506 is distributed throughout the PE such that each SPU 1502 has direct access to a structural node 1504 of DMAC 1506. Each node executes the logic appropriate for memory accesses by the SPU to which the node has direct access.

Figure 16:
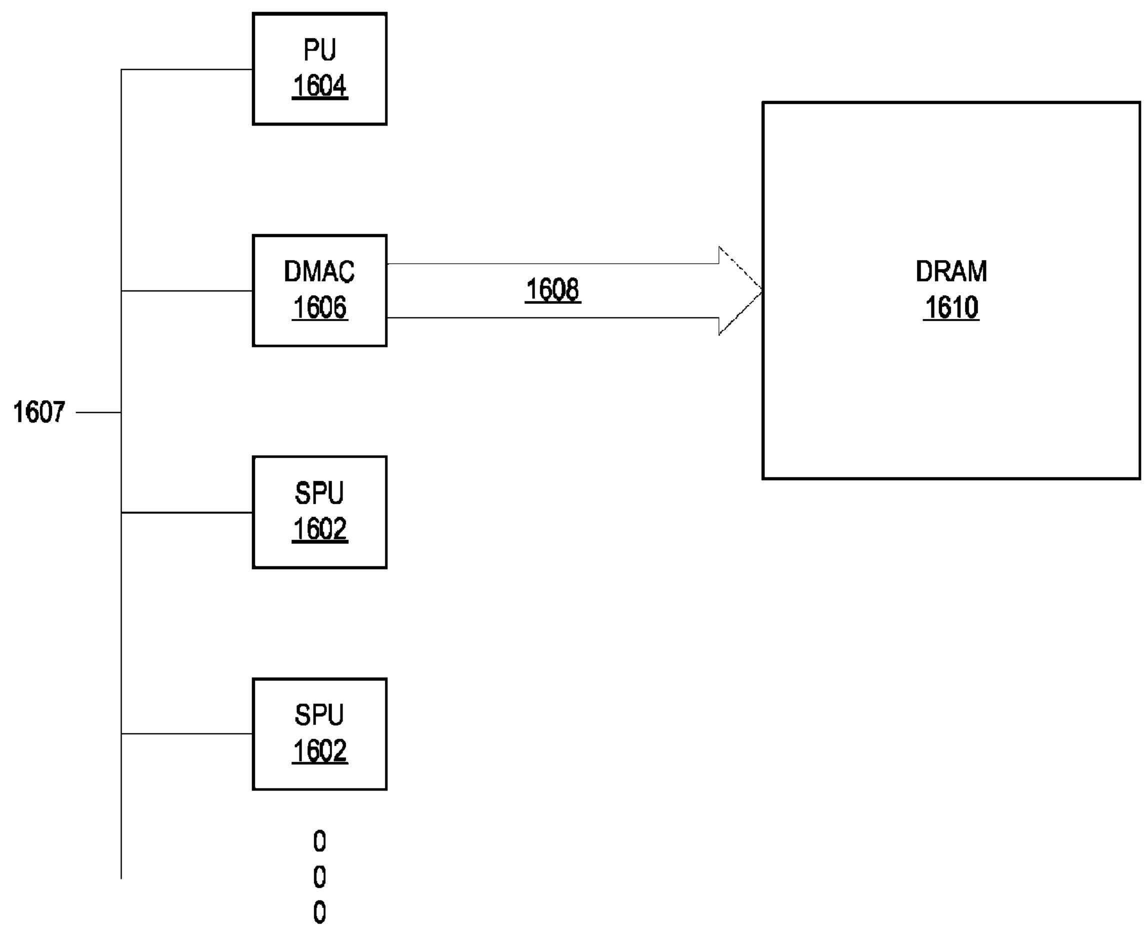
FIG. 16 illustrates an alternative structure for a direct memory access controller in accordance with the present invention.

FIG. 16 shows an alternative embodiment of the DMAC, namely, a non-distributed architecture. In this case, the structural hardware of DMAC 1606 is centralized. SPUs 1602 and PU 1604 communicate with DMAC 1606 via local PE bus 1607. DMAC 1606 is connected through a cross-bar switch to a bus 1608. Bus 1608 is connected to DRAM 1610.

As discussed above, all of the multiple SPUs of a PU can independently access data in the shared DRAM. As a result, a first SPU could be operating upon particular data in its local storage at a time during which a second SPU requests these data. If the data were provided to the second SPU at that time from the shared DRAM, the data could be invalid because of the first SPU's ongoing processing which could change the data's value. If the second processor received the data from the shared DRAM at that time, therefore, the second processor could generate an erroneous result. For example, the data could be a specific value for a global variable. If the first processor changed that value during its processing, the second processor would receive an outdated value. A scheme is necessary, therefore, to synchronize the SPUs' reading and writing of data from and to memory locations within the shared DRAM. This scheme must prevent the reading of data from a memory location upon which another SPU currently is operating in its local storage and, therefore, which are not current, and the writing of data into a memory location storing current data.

To overcome these problems, for each addressable memory location of the DRAM, an additional segment of memory is allocated in the DRAM for storing status information relating to the data stored in the memory location. This status information includes a full/empty (F/E) bit, the identification of an SPU (SPU ID) requesting data from the memory location and the address of the SPU's local storage (LS address) to which the requested data should be read. An addressable memory location of the DRAM can be of any size. In a preferred embodiment, this size is 1024 bits.

The setting of the F/E bit to 1 indicates that the data stored in the associated memory location are current. The setting of the F/E bit to 0, on the other hand, indicates that the data stored in the associated memory location are not current. If an SPU requests the data when this bit is set to 0, the SPU is prevented from immediately reading the data. In this case, an SPU ID identifying the SPU requesting the data, and an LS address identifying the memory location within the local storage of this SPU to which the data are to be read when the data become current, are entered into the additional memory segment.

An additional memory segment also is allocated for each memory location within the local storage of the SPUs. This additional memory segment stores one bit, designated the "busy bit." The busy bit is used to reserve the associated LS memory location for the storage of specific data to be retrieved from the DRAM. If the busy bit is set to 1 for a particular memory location in local storage, the SPU can use this memory location only for the writing of these specific data. On the other hand, if the busy bit is set to 0 for a particular memory location in local storage, the SPU can use this memory location for the writing of any data.

Examples of the manner in which the F/E bit, the SPU ID, the LS address and the busy bit are used to synchronize the reading and writing of data from and to the shared DRAM of a PU are illustrated in FIGS. 17-31.

Figure 17:
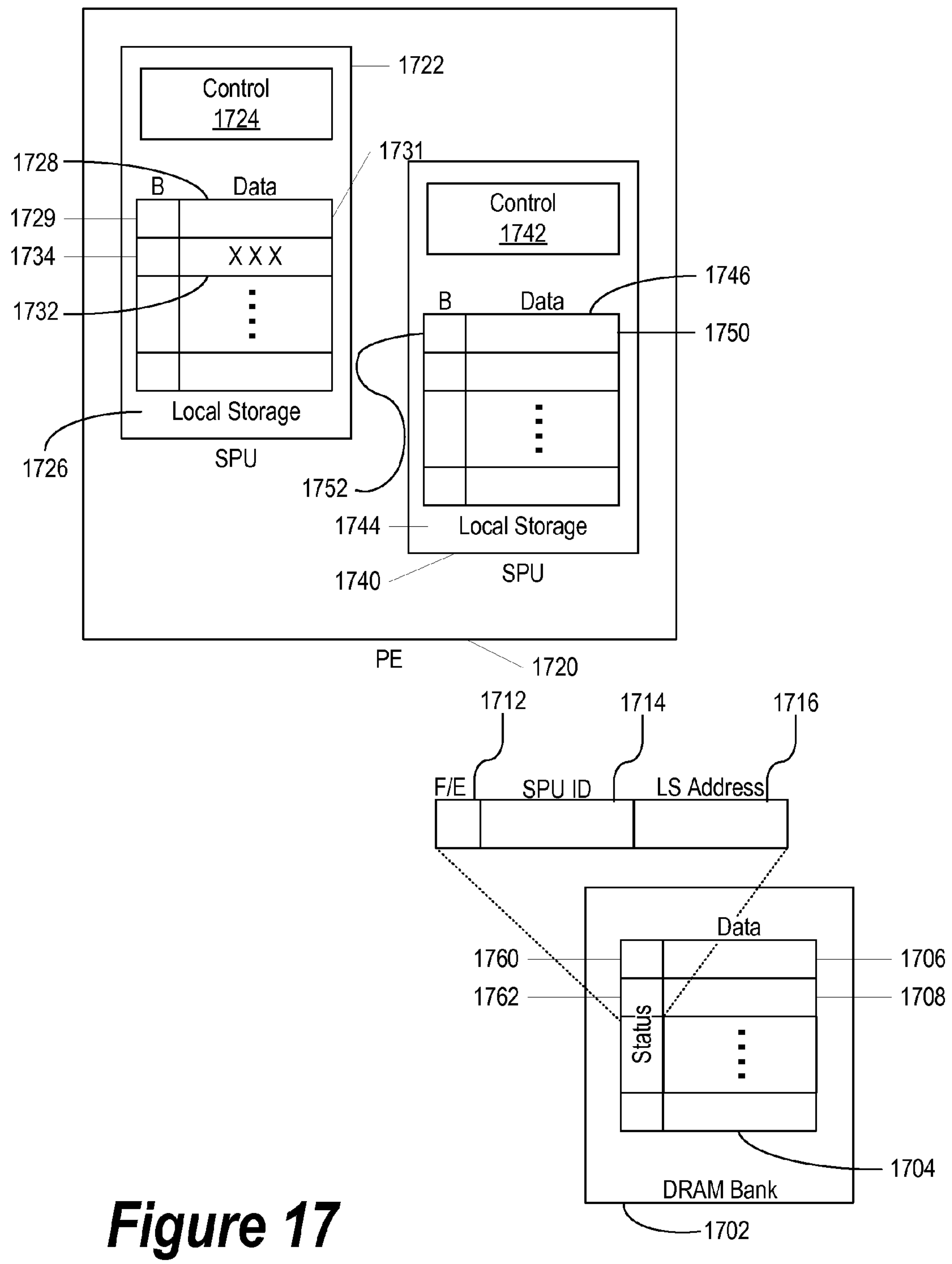
FIGS. 17-31 illustrate the operation of data synchronization in accordance with the present invention.

As shown in FIG. 17, one or more PUs, e.g., PE 1720, interact with DRAM 1702. PE 1720 includes SPU 1722 and SPU 1740. SPU 1722 includes control logic 1724, and SPU 1740 includes control logic 1742. SPU 1722 also includes local storage 1726. This local storage includes a plurality of addressable memory locations 1728. SPU 1740 includes local storage 1744, and this local storage also includes a plurality of addressable memory locations 1746. All of these addressable memory locations preferably are 1024 bits in size.

An additional segment of memory is associated with each LS addressable memory location. For example, memory segments 1729 and 1734 are associated with, respectively, local memory locations 1731 and 1732, and memory segment 1752 is associated with local memory location 1750. A "busy bit," as discussed above, is stored in each of these additional memory segments. Local memory location 1732 is shown with several Xs to indicate that this location contains data.

DRAM 1702 contains a plurality of addressable memory locations 1704, including memory locations 1706 and 1708. These memory locations preferably also are 1024 bits in size. An additional segment of memory also is associated with each of these memory locations. For example, additional memory segment 1760 is associated with memory location 1706, and additional memory segment 1762 is associated with memory location 1708. Status information relating to the data stored in each memory location is stored in the memory segment associated with the memory location. This status information includes, as discussed above, the F/E bit, the SPU ID and the LS address. For example, for memory location 1708, this status information includes F/E bit 1712, SPU ID 1714 and LS address 1716.

Using the status information and the busy bit, the synchronized reading and writing of data from and to the shared DRAM among the SPUs of a PU, or a group of PUs, can be achieved.

Figure 18:
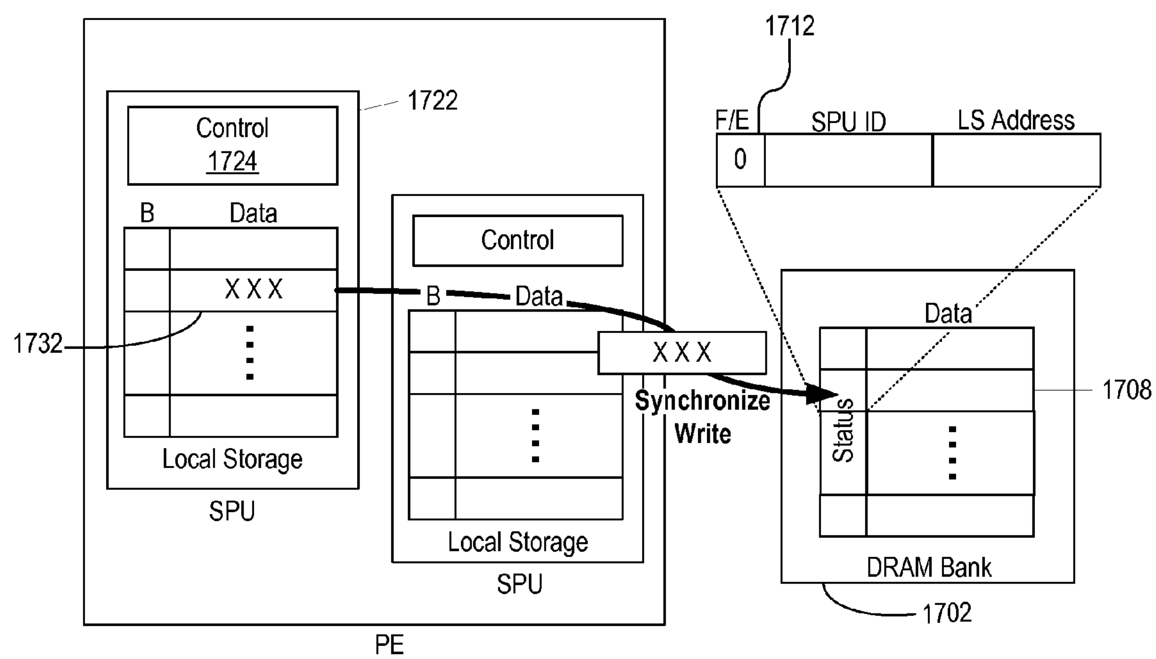

FIG. 18 illustrates the initiation of the synchronized writing of data from LS memory location 1732 of SPU 1722 to memory location 1708 of DRAM 1702. Control 1724 of SPU 1722 initiates the synchronized writing of these data. Since memory location 1708 is empty, F/E bit 1712 is set to 0. As a result, the data in LS location 1732 can be written into memory location 1708. If this bit were set to 1 to indicate that memory location 1708 is full and contains current, valid data, on the other hand, control 1722 would receive an error message and be prohibited from writing data into this memory location.

Figure 19:
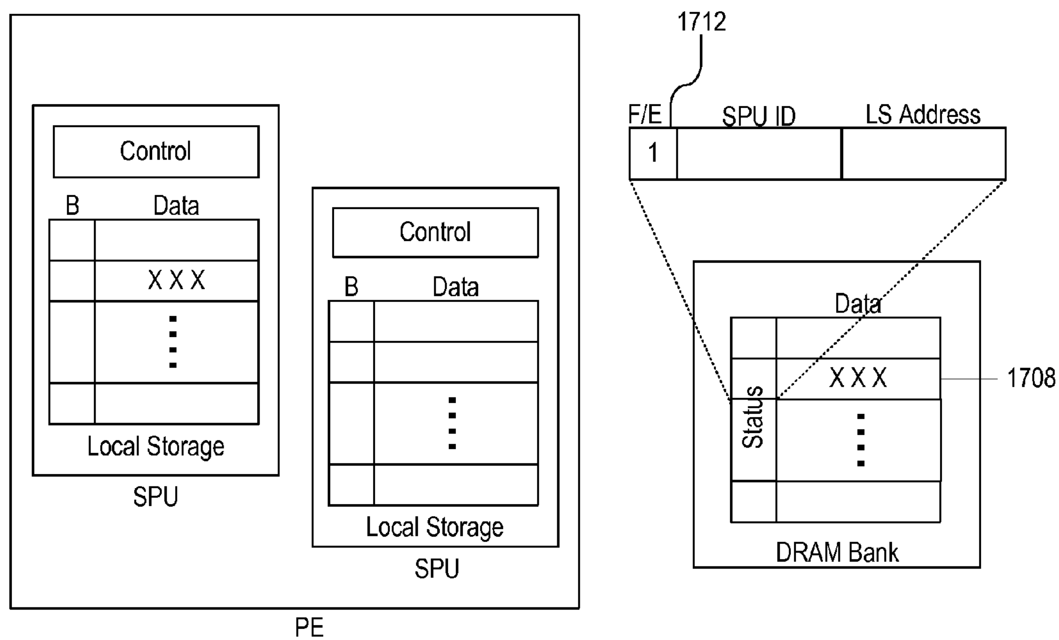

The result of the successful synchronized writing of the data into memory location 1708 is shown in FIG. 19. The written data are stored in memory location 1708, and F/E bit 1712 is set to 1. This setting indicates that memory location 1708 is full and that the data in this memory location are current and valid.

Figure 20:
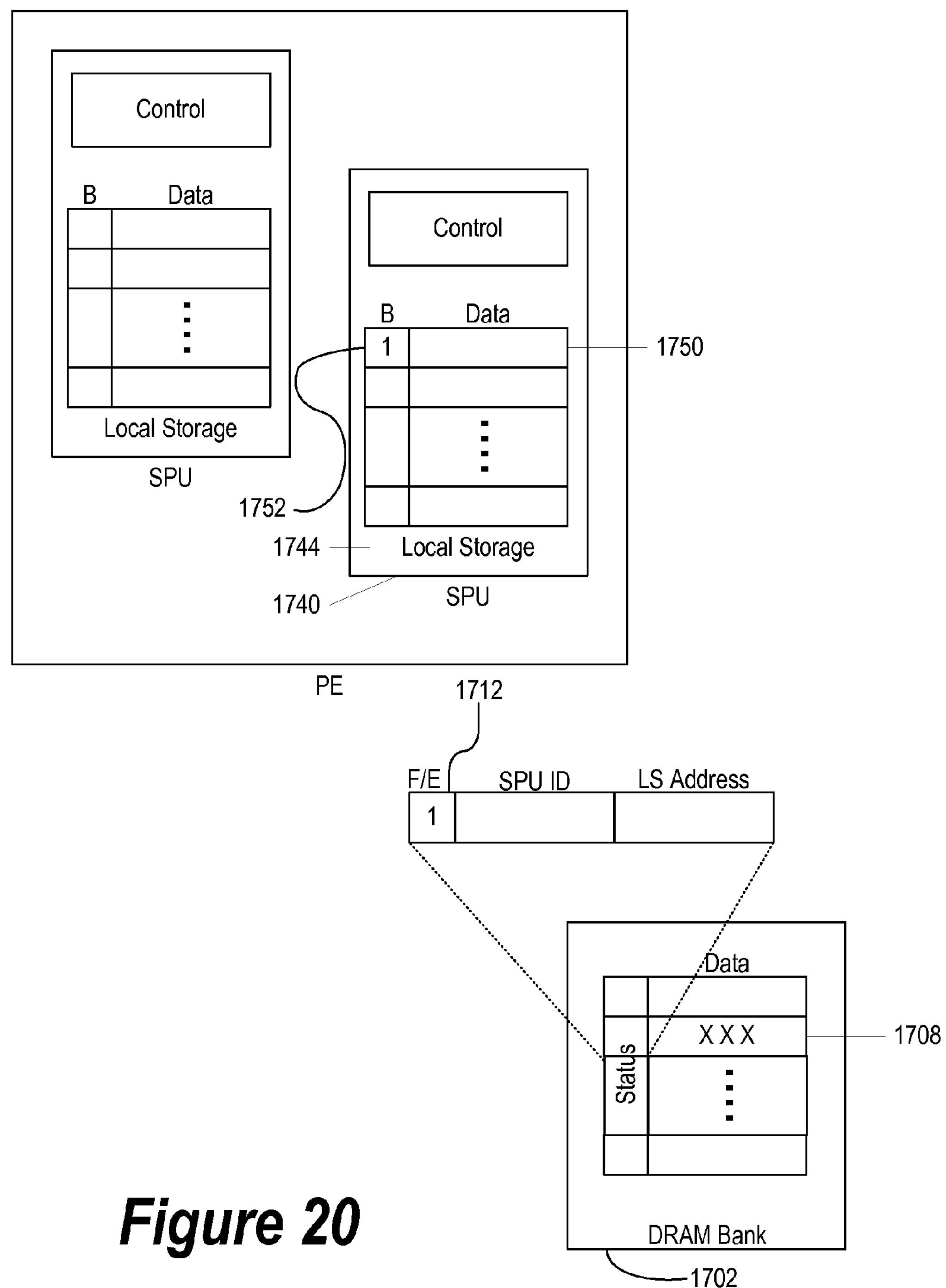

FIG. 20 illustrates the initiation of the synchronized reading of data from memory location 1708 of DRAM 1702 to LS memory location 1750 of local storage 1744. To initiate this reading, the busy bit in memory segment 1752 of LS memory location 1750 is set to 1 to reserve this memory location for these data. The setting of this busy bit to 1 prevents SPU 1740 from storing other data in this memory location.

Figure 21:
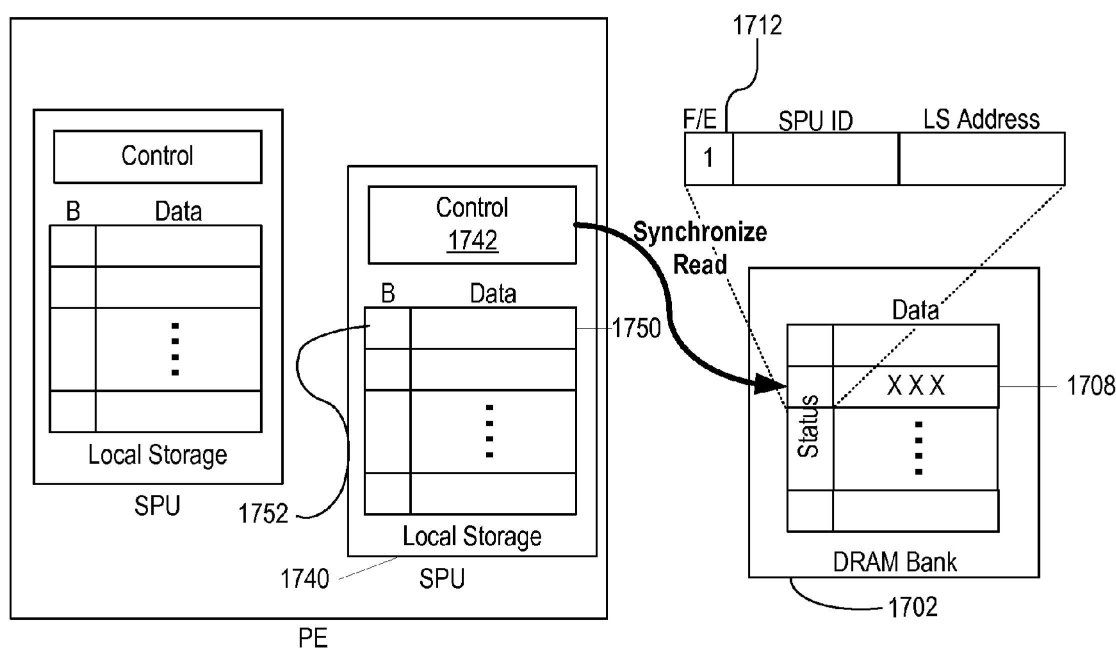
Figure 22:
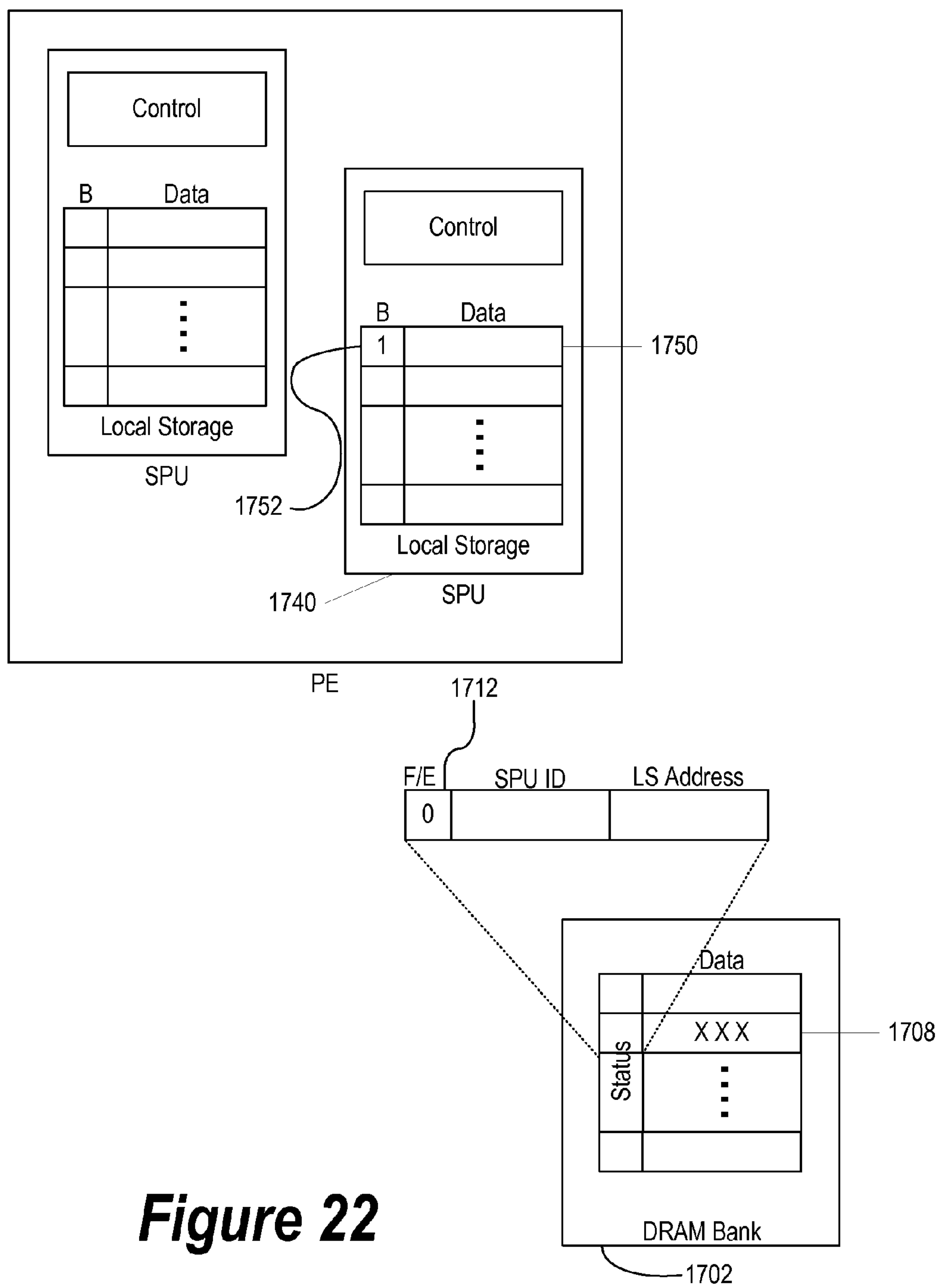

As shown in FIG. 21, control logic 1742 next issues a synchronize read command for memory location 1708 of DRAM 1702. Since F/E bit 1712 associated with this memory location is set to 1, the data stored in memory location 1708 are considered current and valid. As a result, in preparation for transferring the data from memory location 1708 to LS memory location 1750, F/E bit 1712 is set to 0. This setting is shown in FIG. 22. The setting of this bit to 0 indicates that, following the reading of these data, the data in memory location 1708 will be invalid.

Figure 23:
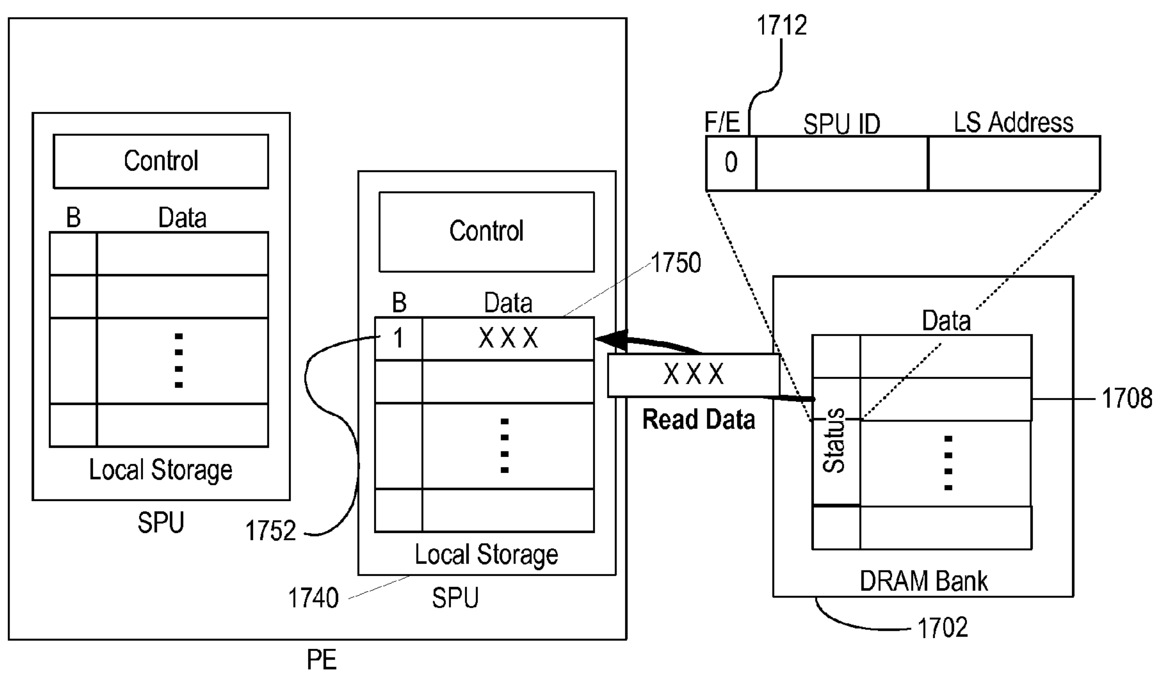
Figure 24:
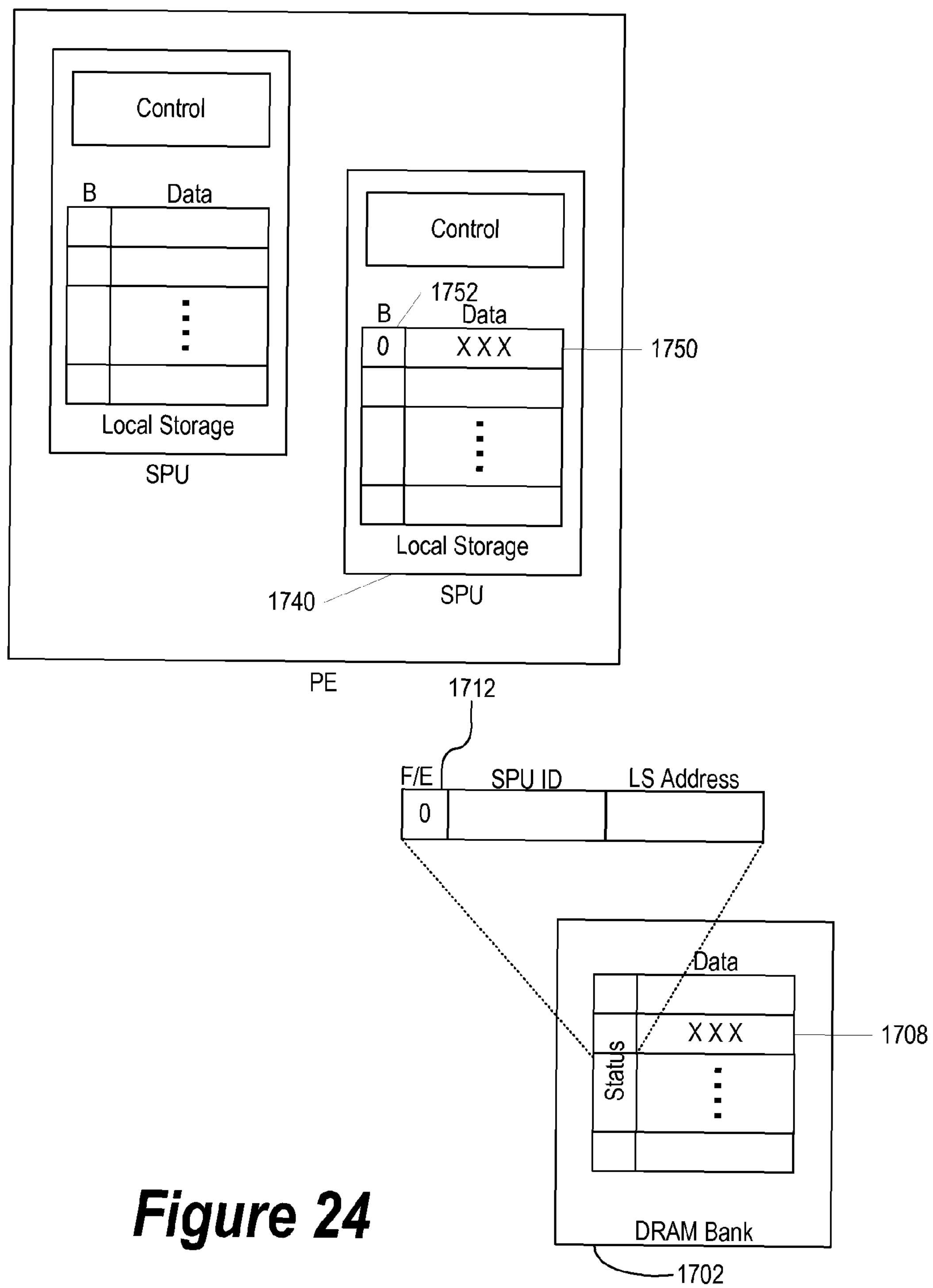

As shown in FIG. 23, the data within memory location 1708 next are read from memory location 1708 to LS memory location 1750. FIG. 24 shows the final state. A copy of the data in memory location 1708 is stored in LS memory location 1750. F/E bit 1712 is set to 0 to indicate that the data in memory location 1708 are invalid. This invalidity is the result of alterations to these data to be made by SPU 1740. The busy bit in memory segment 1752 also is set to 0. This setting indicates that LS memory location 1750 now is available to SPU 1740 for any purpose, i.e., this LS memory location no longer is in a reserved state waiting for the receipt of specific data. LS memory location 1750, therefore, now can be accessed by SPU 1740 for any purpose.

Figure 25:
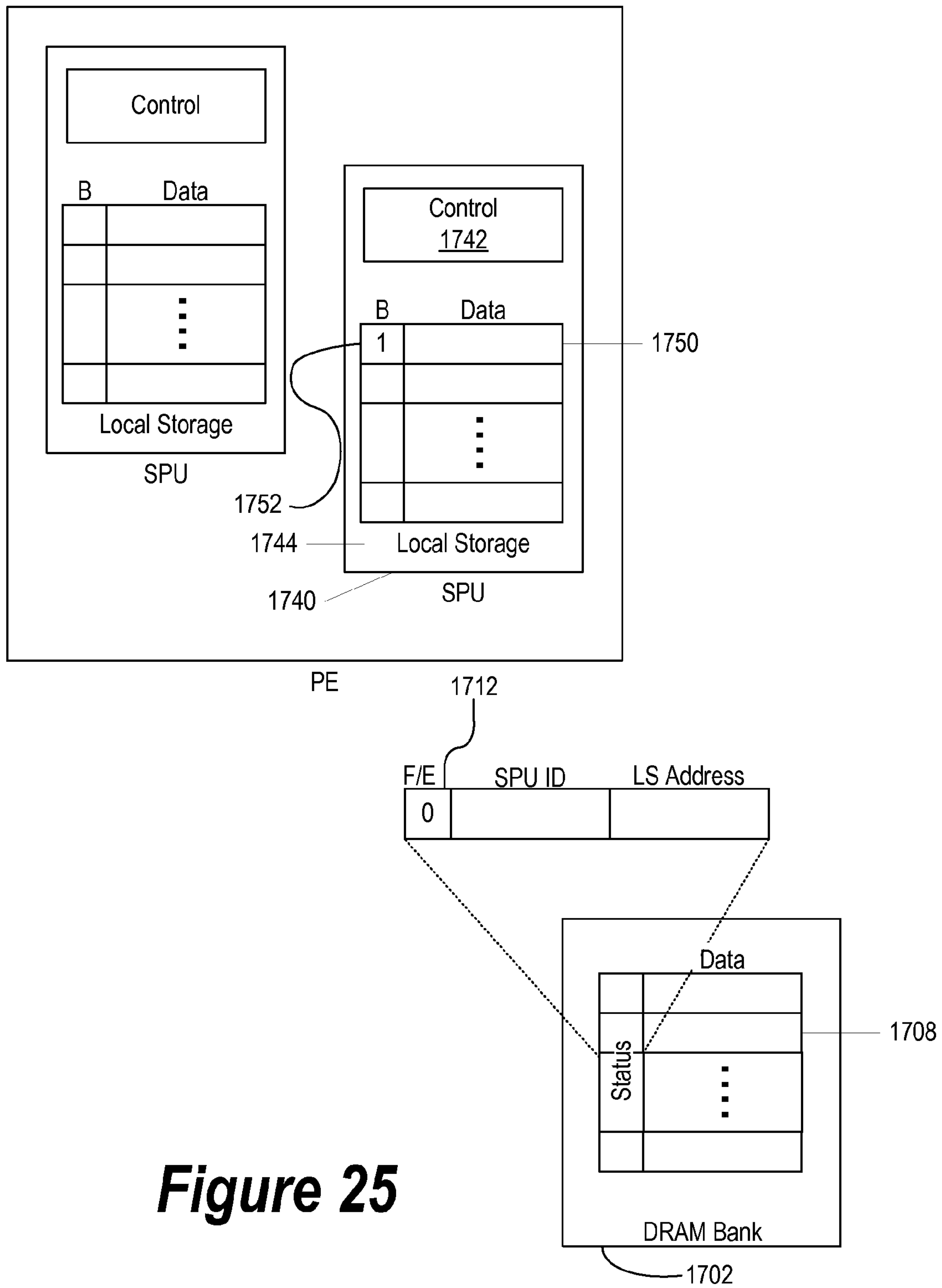
Figure 26:
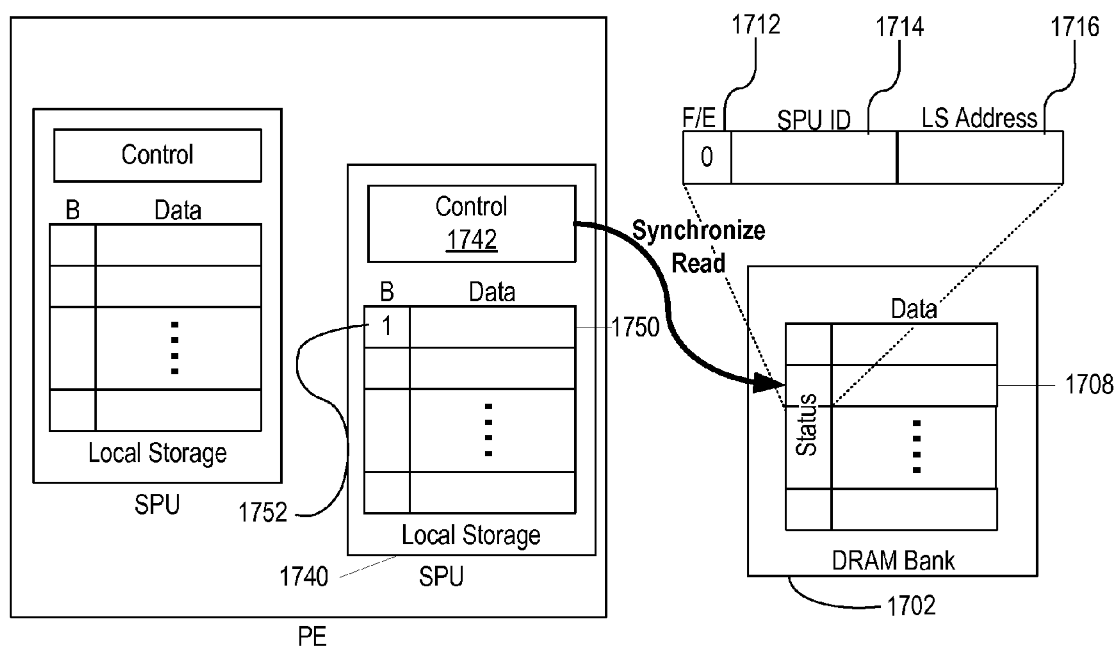

FIGS. 25-31 illustrate the synchronized reading of data from a memory location of DRAM 1702, e.g., memory location 1708, to an LS memory location of an SPU's local storage, e.g., LS memory location 1752 of local storage 1744, when the F/E bit for the memory location of DRAM 1702 is set to 0 to indicate that the data in this memory location are not current or valid. As shown in FIG. 25, to initiate this transfer, the busy bit in memory segment 1752 of LS memory location 1750 is set to 1 to reserve this LS memory location for this transfer of data. As shown in FIG. 26, control logic 1742 next issues a synchronize read command for memory location 1708 of DRAM 1702. Since the F/E bit associated with this memory location, F/E bit 1712, is set to 0, the data stored in memory location 1708 are invalid. As a result, a signal is transmitted to control logic 1742 to block the immediate reading of data from this memory location.

Figure 27:
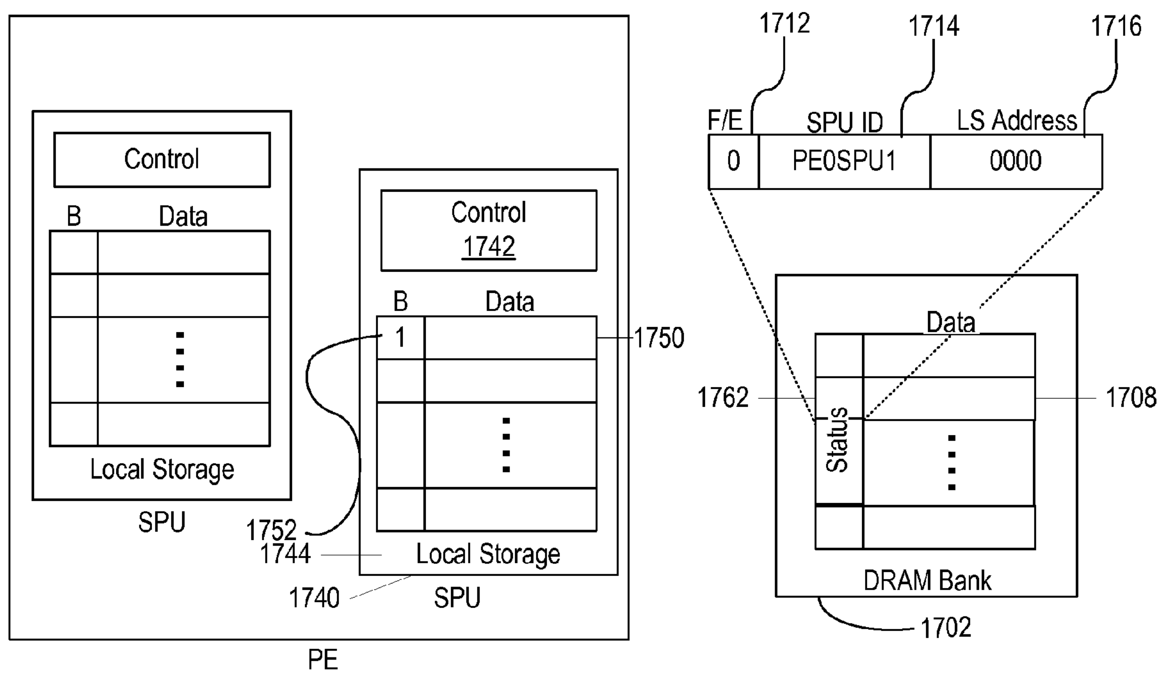

As shown in FIG. 27, the SPU ID 1714 and LS address 1716 for this read command next are written into memory segment 1762. In this case, the SPU ID for SPU 1740 and the LS memory location for LS memory location 1750 are written into memory segment 1762. When the data within memory location 1708 become current, therefore, this SPU ID and LS memory location are used for determining the location to which the current data are to be transmitted.

Figure 28:
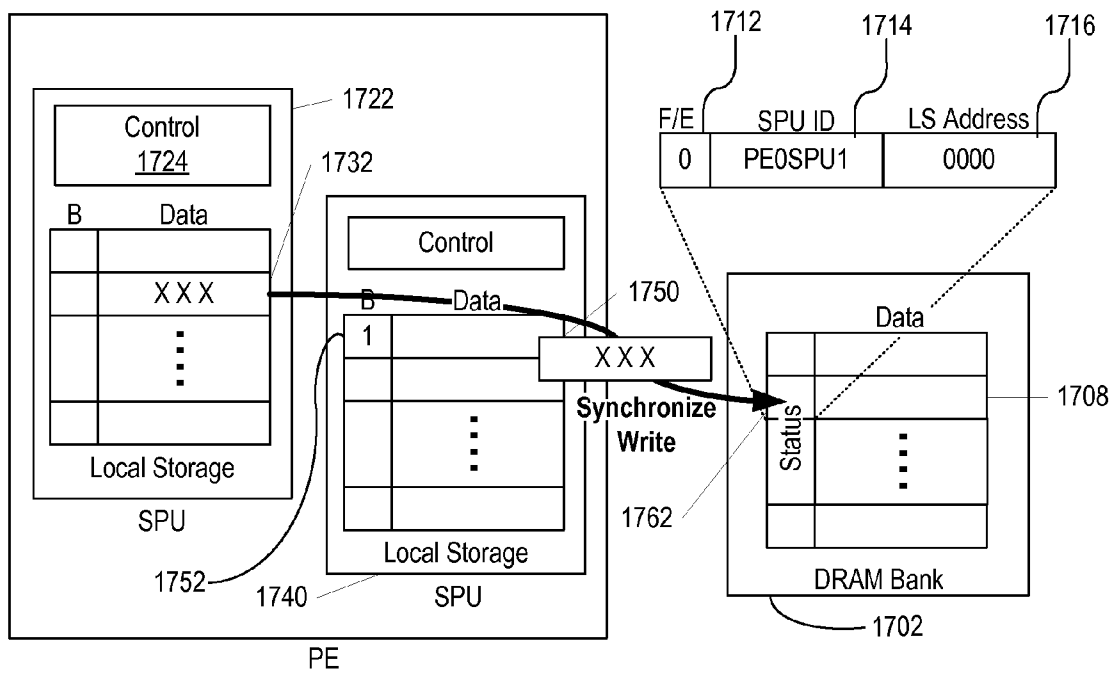

The data in memory location 1708 become valid and current when an SPU writes data into this memory location. The synchronized writing of data into memory location 1708 from, e.g., memory location 1732 of SPU 1722, is illustrated in FIG. 28. This synchronized writing of these data is permitted because F/E bit 1712 for this memory location is set to 0.

Figure 29:
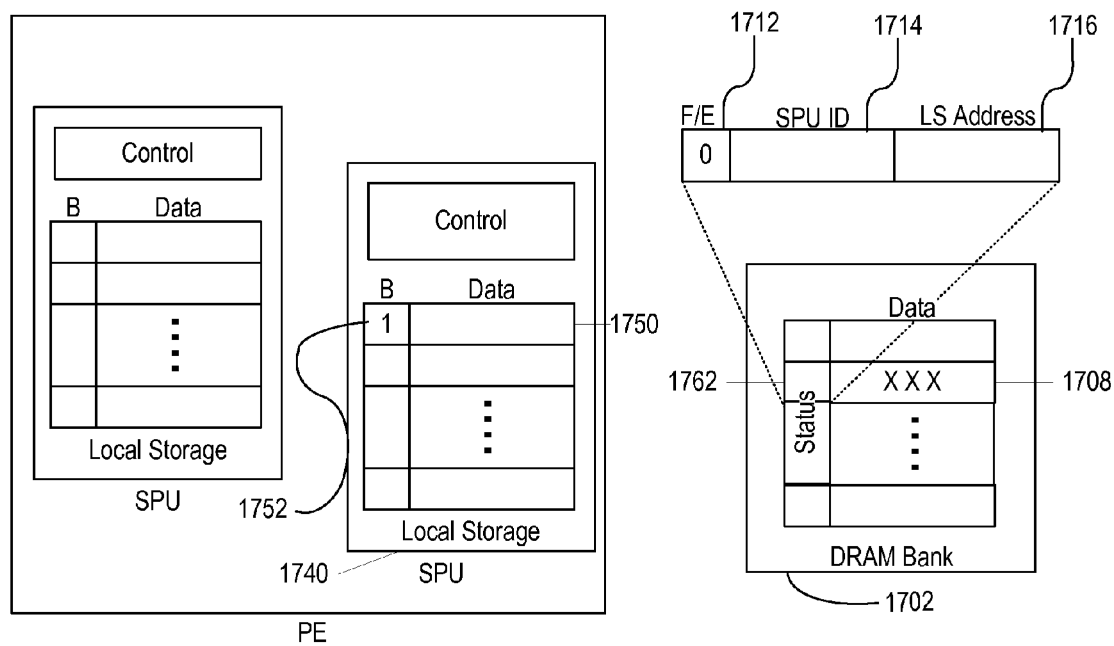
Figure 30:
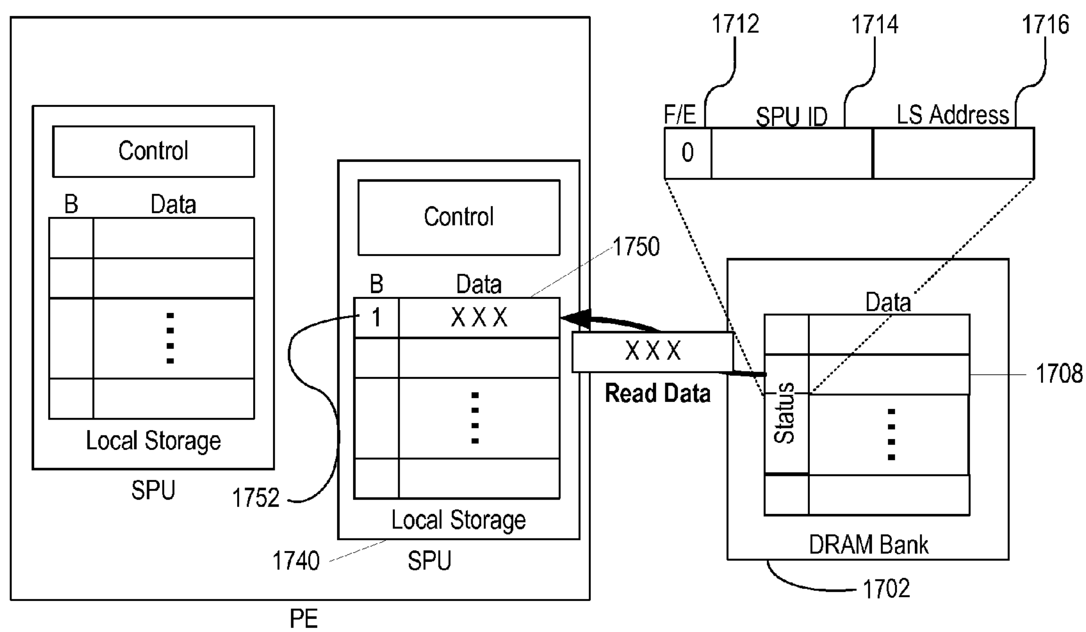
Figure 31:
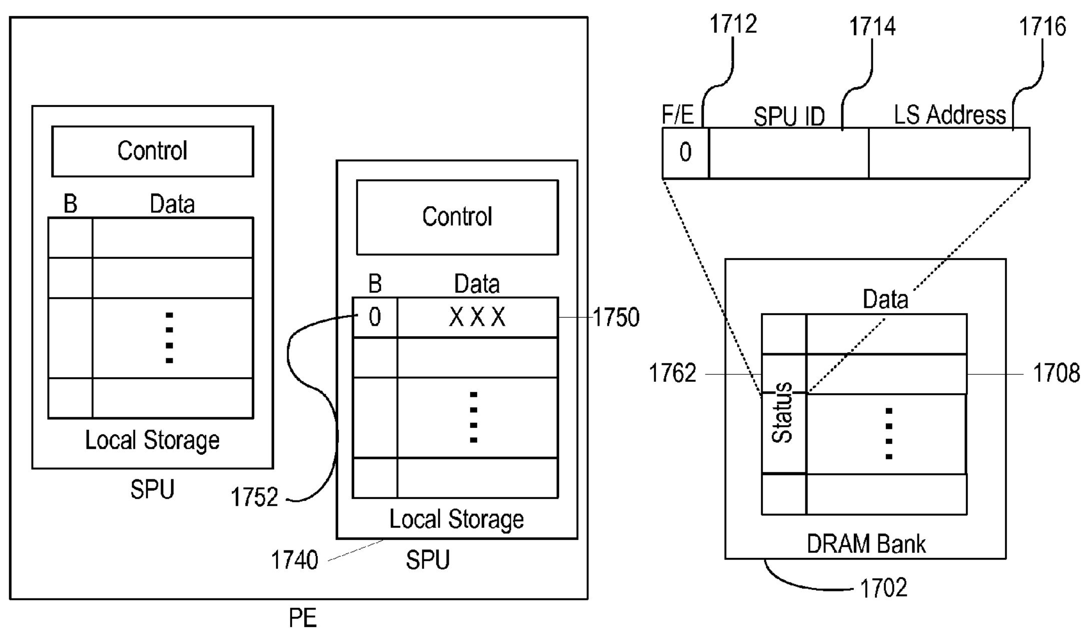

As shown in FIG. 29, following this writing, the data in memory location 1708 become current and valid. SPU ID 1714 and LS address 1716 from memory segment 1762, therefore, immediately are read from memory segment 1762, and this information then is deleted from this segment. F/E bit 1712 also is set to 0 in anticipation of the immediate reading of the data in memory location 1708. As shown in FIG. 30, upon reading SPU ID 1714 and LS address 1716, this information immediately is used for reading the valid data in memory location 1708 to LS memory location 1750 of SPU 1740. The final state is shown in FIG. 31. This figure shows the valid data from memory location 1708 copied to memory location 1750, the busy bit in memory segment 1752 set to 0 and F/E bit 1712 in memory segment 1762 set to 0. The setting of this busy bit to 0 enables LS memory location 1750 now to be accessed by SPU 1740 for any purpose. The setting of this F/E bit to 0 indicates that the data in memory location 1708 no longer are current and valid.

Figure 32:
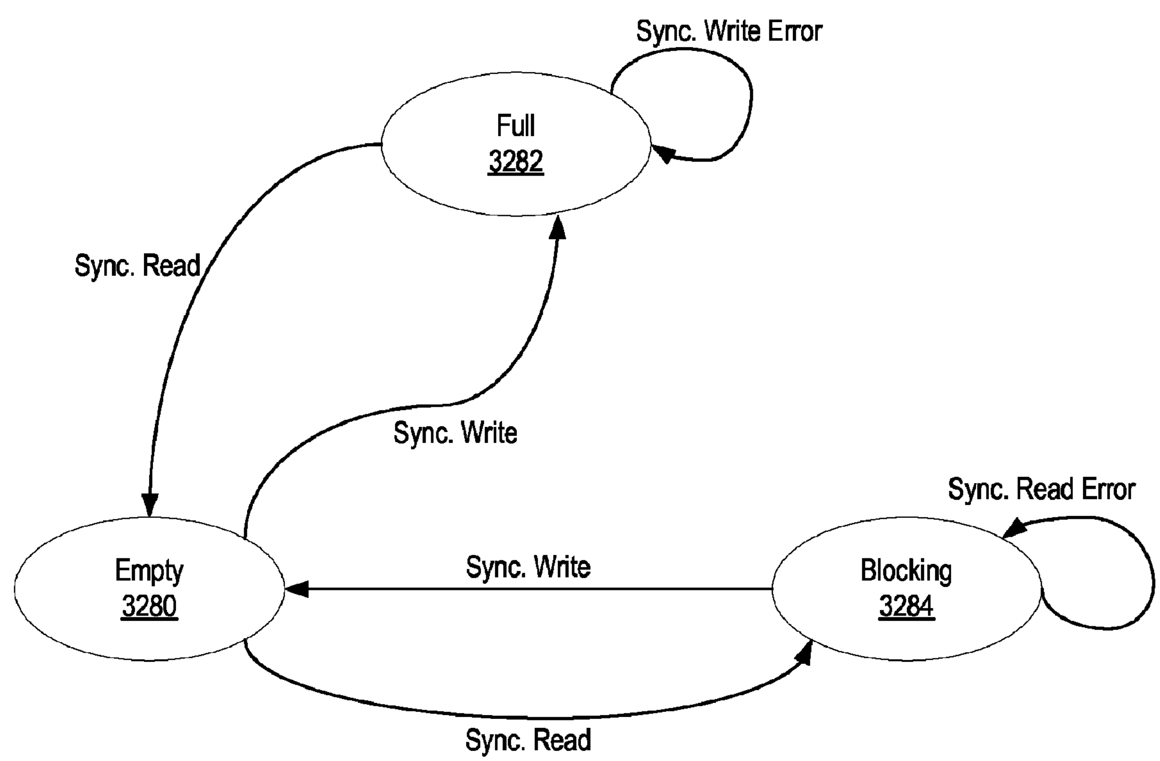
FIG. 32 is a three-state memory diagram illustrating the various states of a memory location in accordance with the data synchronization scheme of the present invention.

FIG. 32 summarizes the operations described above and the various states of a memory location of the DRAM based upon the states of the F/E bit, the SPU ID and the LS address stored in the memory segment corresponding to the memory location. The memory location can have three states. These three states are an empty state 3280 in which the F/E bit is set to 0 and no information is provided for the SPU ID or the LS address, a full state 3282 in which the F/E bit is set to 1 and no information is provided for the SPU ID or LS address and a blocking state 3284 in which the F/E bit is set to 0 and information is provided for the SPU ID and LS address.

As shown in this figure, in empty state 3280, a synchronized writing operation is permitted and results in a transition to full state 3282. A synchronized reading operation, however, results in a transition to the blocking state 3284 because the data in the memory location, when the memory location is in the empty state, are not current.

In full state 3282, a synchronized reading operation is permitted and results in a transition to empty state 3280. On the other hand, a synchronized writing operation in full state 3282 is prohibited to prevent overwriting of valid data. If such a writing operation is attempted in this state, no state change occurs and an error message is transmitted to the SPU's corresponding control logic.

In blocking state 3284, the synchronized writing of data into the memory location is permitted and results in a transition to empty state 3280. On the other hand, a synchronized reading operation in blocking state 3284 is prohibited to prevent a conflict with the earlier synchronized reading operation which resulted in this state. If a synchronized reading operation is attempted in blocking state 3284, no state change occurs and an error message is transmitted to the SPU's corresponding control logic.

The scheme described above for the synchronized reading and writing of data from and to the shared DRAM also can be used for eliminating the computational resources normally dedicated by a processor for reading data from, and writing data to, external devices. This input/output (I/O) function could be performed by a PU. However, using a modification of this synchronization scheme, an SPU running an appropriate program can perform this function. For example, using this scheme, a PU receiving an interrupt request for the transmission of data from an I/O interface initiated by an external device can delegate the handling of this request to this SPU. The SPU then issues a synchronize write command to the I/O interface. This interface in turn signals the external device that data now can be written into the DRAM. The SPU next issues a synchronize read command to the DRAM to set the DRAM's relevant memory space into a blocking state. The SPU also sets to 1 the busy bits for the memory locations of the SPU's local storage needed to receive the data. In the blocking state, the additional memory segments associated with the DRAM's relevant memory space contain the SPU's ID and the address of the relevant memory locations of the SPU's local storage. The external device next issues a synchronize write command to write the data directly to the DRAM's relevant memory space. Since this memory space is in the blocking state, the data are immediately read out of this space into the memory locations of the SPU's local storage identified in the additional memory segments. The busy bits for these memory locations then are set to 0. When the external device completes writing of the data, the SPU issues a signal to the PU that the transmission is complete.

Using this scheme, therefore, data transfers from external devices can be processed with minimal computational load on the PU. The SPU delegated this function, however, should be able to issue an interrupt request to the PU, and the external device should have direct access to the DRAM.

The DRAM of each PU includes a plurality of "sandboxes." A sandbox defines an area of the shared DRAM beyond which a particular SPU, or set of SPUs, cannot read or write data. These sandboxes provide security against the corruption of data being processed by one SPU by data being processed by another SPU. These sandboxes also permit the downloading of software cells from network 104 into a particular sandbox without the possibility of the software cell corrupting data throughout the DRAM. In the present invention, the sandboxes are implemented in the hardware of the DRAMs and DMACs. By implementing these sandboxes in this hardware rather than in software, advantages in speed and security are obtained.

The PU of a PU controls the sandboxes assigned to the SPUs. Since the PU normally operates only trusted programs, such as an operating system, this scheme does not jeopardize security. In accordance with this scheme, the PU builds and maintains a key control table. This key control table is illustrated in FIG. 33. As shown in this figure, each entry in key control table 3302 contains an identification (ID) 3304 for an SPU, an SPU key 3306 for that SPU and a key mask 3308. The use of this key mask is explained below. Key control table 3302 preferably is stored in a relatively fast memory, such as a static random access memory (SRAM), and is associated with the DMAC. The entries in key control table 3302 are controlled by the PU. When an SPU requests the writing of data to, or the reading of data from, a particular storage location of the DRAM, the DMAC evaluates the SPU key 3306 assigned to that SPU in key control table 3302 against a memory access key associated with that storage location.

Figure 34:
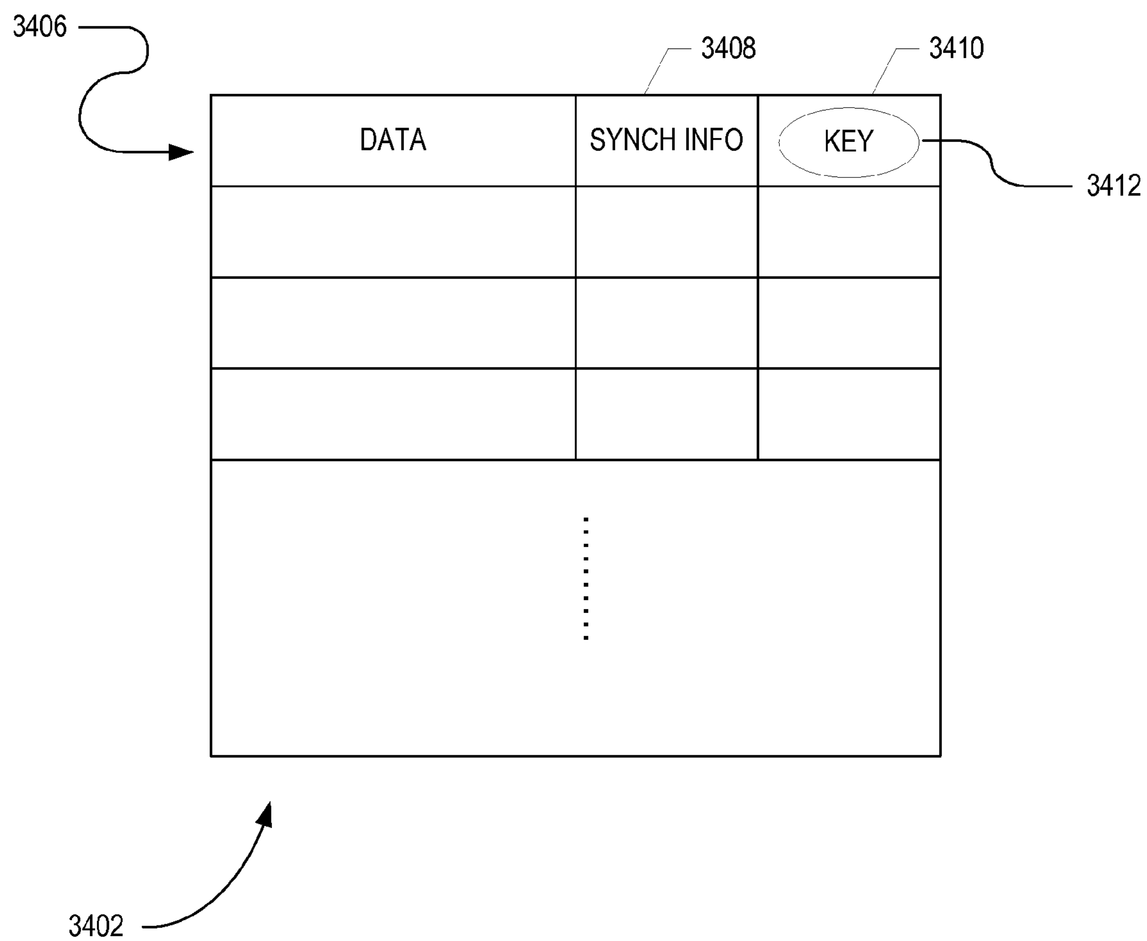
FIG. 34 illustrates a scheme for storing memory access keys for a hardware sandbox in accordance with the present invention.

As shown in FIG. 34, a dedicated memory segment 3410 is assigned to each addressable storage location 3406 of a DRAM 3402. A memory access key 3412 for the storage location is stored in this dedicated memory segment. As discussed above, a further additional dedicated memory segment 3408, also associated with each addressable storage location 3406, stores synchronization information for writing data to, and reading data from, the storage-location.

In operation, an SPU issues a DMA command to the DMAC. This command includes the address of a storage location 3406 of DRAM 3402. Before executing this command, the DMAC looks up the requesting SPU's key 3306 in key control table 3302 using the SPU's ID 3304. The DMAC then compares the SPU key 3306 of the requesting SPU to the memory access key 3412 stored in the dedicated memory segment 3410 associated with the storage location of the DRAM to which the SPU seeks access. If the two keys do not match, the DMA command is not executed. On the other hand, if the two keys match, the DMA command proceeds and the requested memory access is executed.

Figure 35:
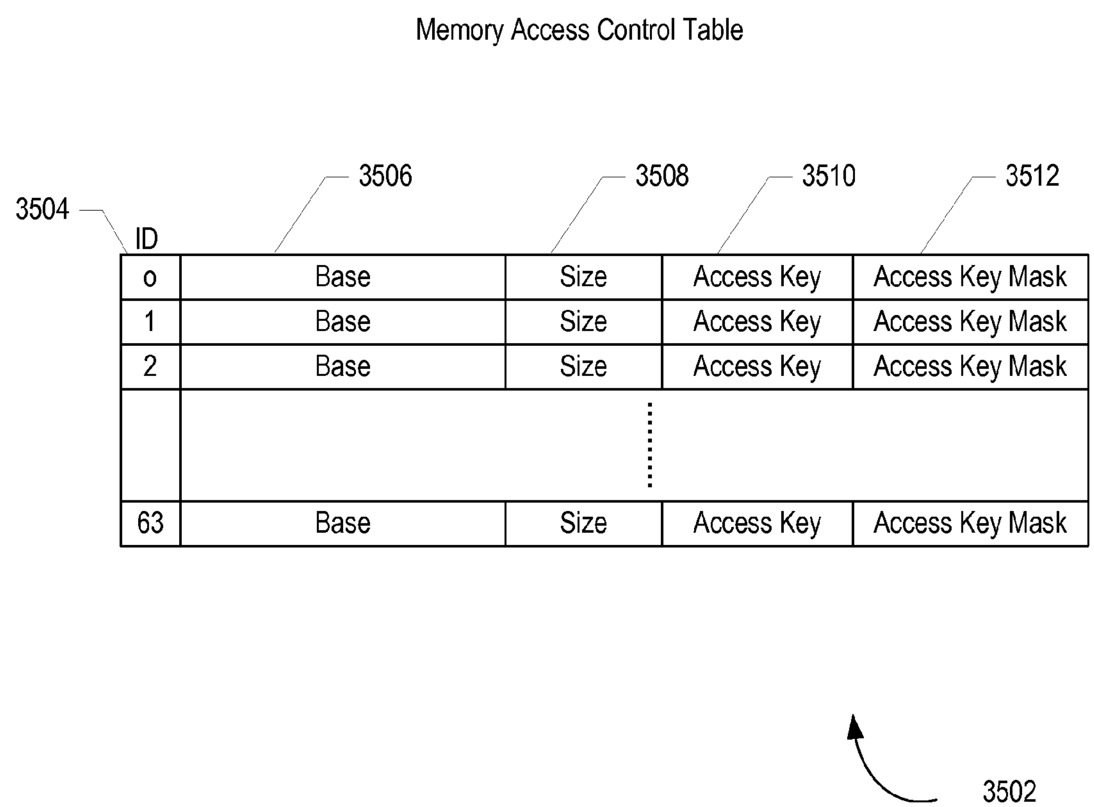
FIG. 35 illustrates the structure of a memory access control table for a hardware sandbox in accordance with the present invention.

An alternative embodiment is illustrated in FIG. 35. In this embodiment, the PU also maintains a memory access control table 3502. Memory access control table 3502 contains an entry for each sandbox within the DRAM. In the particular example of FIG. 35, the DRAM contains 64 sandboxes. Each entry in memory access control table 3502 contains an identification (ID) 3504 for a sandbox, a base memory address 3506, a sandbox size 3508, a memory access key 3510 and an access key mask 3512. Base memory address 3506 provides the address in the DRAM which starts a particular memory sandbox. Sandbox size 3508 provides the size of the sandbox and, therefore, the endpoint of the particular sandbox.

Figure 36:
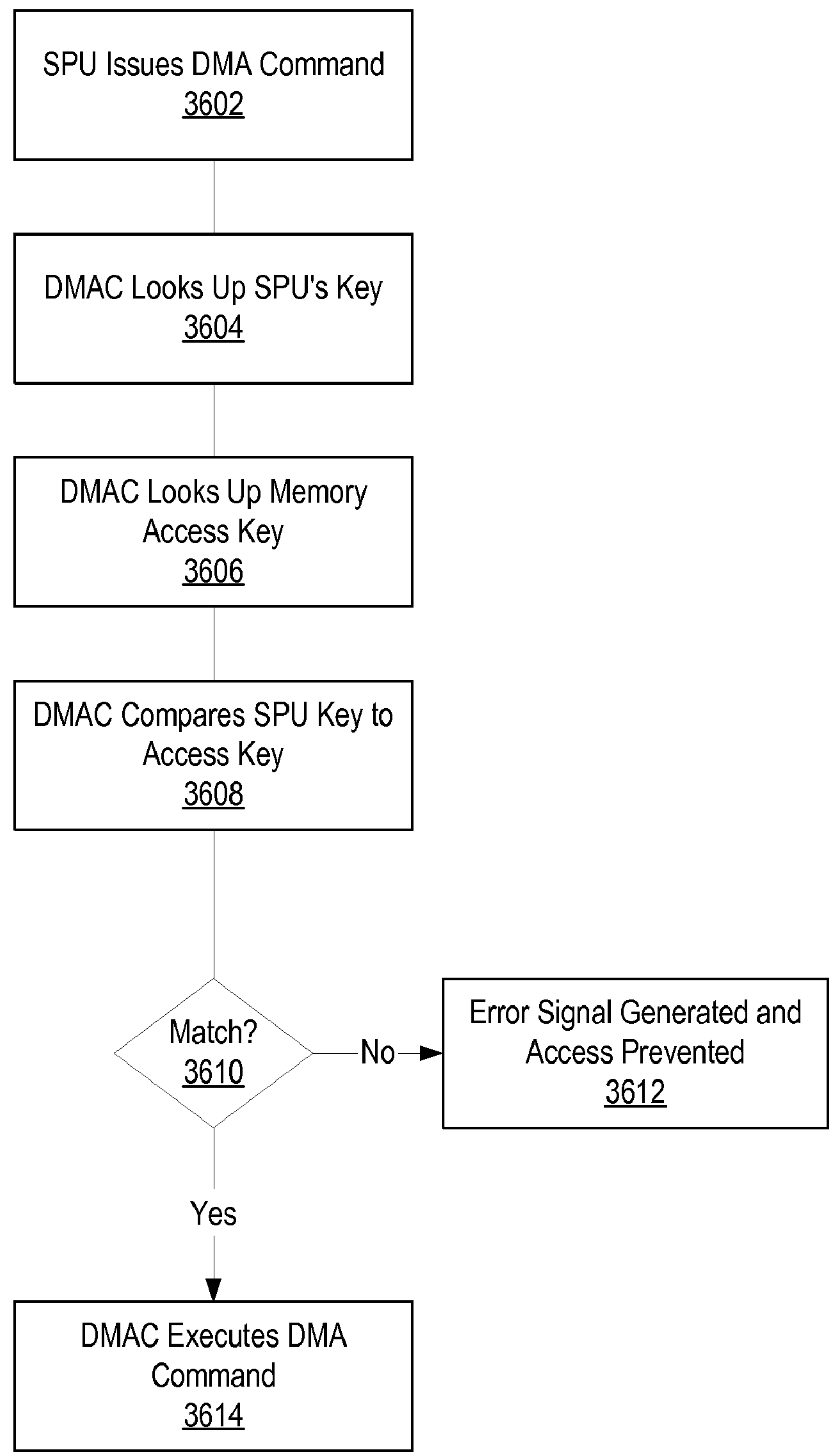
FIG. 36 is a flow diagram of the steps for accessing a memory sandbox using the key control table of FIG. 33 and the memory access control table of FIG. 35.

FIG. 36 is a flow diagram of the steps for executing a DMA command using key control table 3302 and memory access control table 3502. In step 3602, an SPU issues a DMA command to the DMAC for access to a particular memory location or locations within a sandbox. This command includes a sandbox ID 3504 identifying the particular sandbox for which access is requested. In step 3604, the DMAC looks up the requesting SPU's key 3306 in key control table 3302 using the SPU's ID 3304. In step 3606, the DMAC uses the sandbox ID 3504 in the command to look up in memory access control table 3502 the memory access key 3510 associated with that sandbox. In step 3608, the DMAC compares the SPU key 3306 assigned to the requesting SPU to the access key 3510 associated with the sandbox. In step 3610, a determination is made of whether the two keys match. If the two keys do not match, the process moves to step 3612 where the DMA command does not proceed and an error message is sent to either the requesting SPU, the PU or both. On the other hand, if at step 3610 the two keys are found to match, the process proceeds to step 3614 where the DMAC executes the DMA command.

The key masks for the SPU keys and the memory access keys provide greater flexibility to this system. A key mask for a key converts a masked bit into a wildcard. For example, if the key mask 3308 associated with an SPU key 3306 has its last two bits set to "mask," designated by, e.g., setting these bits in key mask 3308 to 1, the SPU key can be either a 1 or a 0 and still match the memory access key. For example, the SPU key might be 1010. This SPU key normally allows access only to a sandbox having an access key of 1010. If the SPU key mask for this SPU key is set to 0001, however, then this SPU key can be used to gain access to sandboxes having an access key of either 1010 or 1011. Similarly, an access key 1010 with a mask set to 0001 can be accessed by an SPU with an SPU key of either 1010 or 1011. Since both the SPU key mask and the memory key mask can be used simultaneously, numerous variations of accessibility by the SPUs to the sandboxes can be established.

The present invention also provides a new programming model for the processors of system 101. This programming model employs software cells 102. These cells can be transmitted to any processor on network 104 for processing. This new programming model also utilizes the unique modular architecture of system 101 and the processors of system 101.

Software cells are processed directly by the SPUs from the SPU's local storage. The SPUs do not directly operate on any data or programs in the DRAM. Data and programs in the DRAM are read into the SPU's local storage before the SPU processes these data and programs. The SPU's local storage, therefore, includes a program counter, stack and other software elements for executing these programs. The PU controls the SPUs by issuing direct memory access (DMA) commands to the DMAC.

Figure 37:
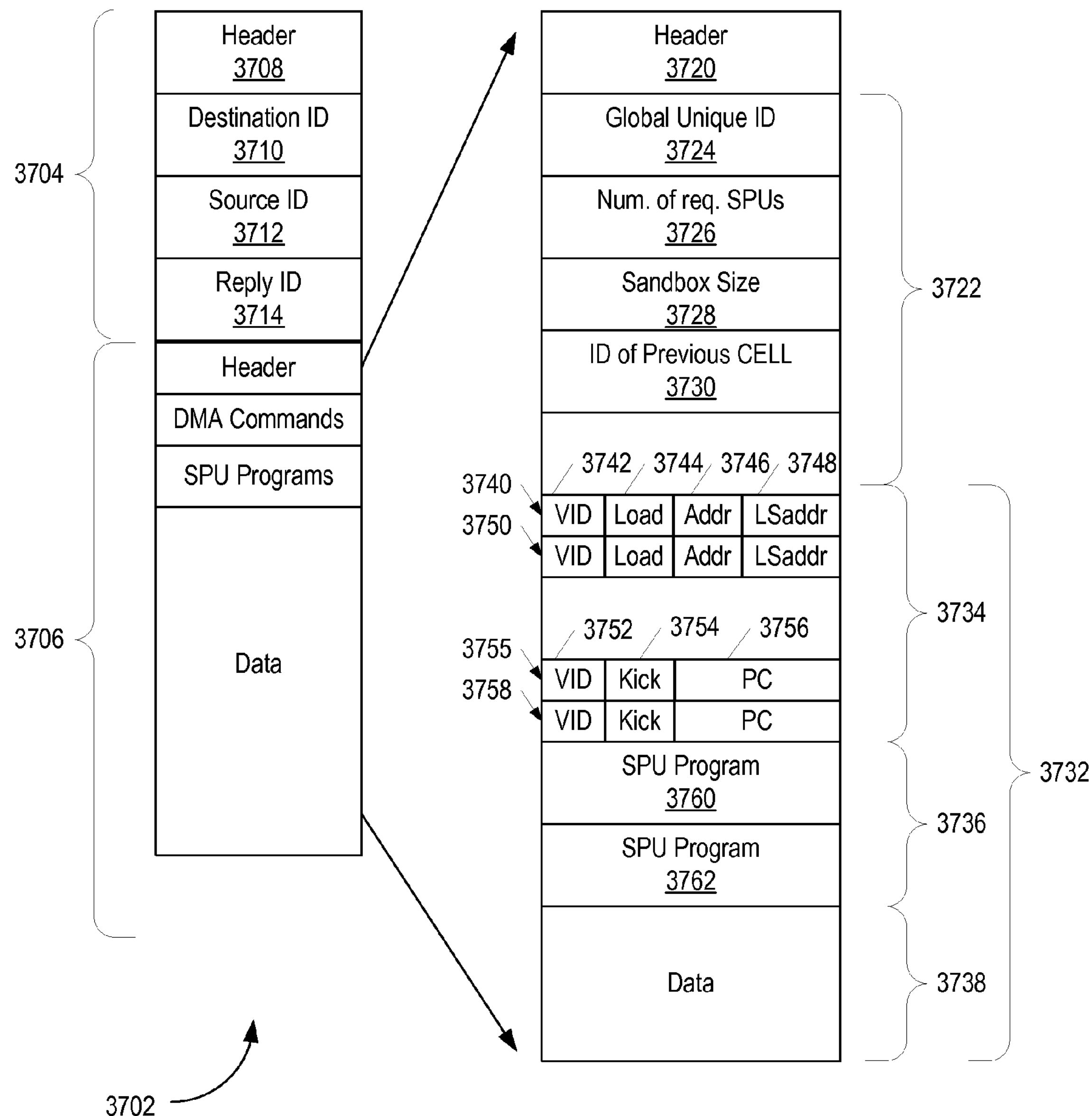
FIG. 37 illustrates the structure of a software cell in accordance with the present invention.

The structure of software cells 102 is illustrated in FIG. 37. As shown in this figure, a software cell, e.g., software cell 3702, contains routing information section and body 3706. The information contained in routing information section 3704 is dependent upon the protocol of network 104. Routing information section 3704 contains header 3708, destination ID 3710, source ID 3712 and reply ID 3714. The destination ID includes a network address. Under the TCP/IP protocol, e.g., the network address is an Internet protocol (IP) address. Destination ID 3710 further includes the identity of the PU and SPU to which the cell should be transmitted for processing. Source ID 3712 contains a network address and identifies the PU and SPU from which the cell originated to enable the destination PU and SPU to obtain additional information regarding the cell if necessary. Reply ID 3714 contains a network address and identifies the PU and SPU to which queries regarding the cell, and the result of processing of the cell, should be directed.

Cell body 3706 contains information independent of the network's protocol. The exploded portion of FIG. 37 shows the details of cell body 3706. Header 3720 of cell body identifies the start of the cell body. Cell interface contains information necessary for the cell's utilization. This information includes global unique ID 3724, required SPUs 3726, sandbox size 3728 and previous cell ID 3730.

Global unique ID 3724 uniquely identifies software cell throughout network 104. Global unique ID 3724 is generated on the basis of source ID 3712, e.g. the unique identification of a PU or SPU within source ID 3712, and the time and date of generation or transmission of software cell 3702. Required SPUs 3726 provides the minimum number of SPUs required to execute the cell. Sandbox size 3728 provides the amount of protected memory in the required SPUs' associated DRAM necessary to execute the cell. Previous cell ID 3730 provides the identity of a previous cell in a group of cells requiring sequential execution, e.g., streaming data.

Implementation section 3732 contains the cell's core information. This information includes DMA command list 3734, programs 3736 and data 3738. Programs 3736 contain the programs to be run by the SPUs (called "spulets"), e.g., SPU programs 3760 and 3762, and data 3738 contain the data to be processed with these programs. DMA command list 3734 contains a series of DMA commands needed to start the programs. These DMA commands include DMA commands 3740, 3750, 3755 and 3758. The PU issues these DMA commands to the DMAC.

DMA command 3740 includes VID 3742. VID 3742 is the virtual ID of an SPU which is mapped to a physical ID when the DMA commands are issued. DMA command 3740 also includes load command 3744 and address 3746. Load command 3744 directs the SPU to read particular information from the DRAM into local storage. Address 3746 provides the virtual address in the DRAM containing this information. The information can be, e.g., programs from programs section 3736, data from data section 3738 or other data. Finally, DMA command 3740 includes local storage address 3748. This address identifies the address in local storage where the information should be loaded. DMA commands 3750 contain similar information. Other DMA commands are also possible.

DMA command list 3734 also includes a series of kick commands, e.g., kick commands 3755 and 3758. Kick commands are commands issued by a PU to an SPU to initiate the processing of a cell. DMA kick command 3755 includes virtual SPU ID 3752, kick command 3754 and program counter 3756. Virtual SPU ID 3752 identifies the SPU to be kicked, kick command 3754 provides the relevant kick command and program counter 3756 provides the address for the program counter for executing the program. DMA kick command 3758 provides similar information for the same SPU or another SPU.

As noted, the PUs treat the SPUs as independent processors, not co-processors. To control processing by the SPUs, therefore, the PU uses commands analogous to remote procedure calls. These commands are designated "SPU Remote Procedure Calls" (SRPCs). A PU implements an SRPC by issuing a series of DMA commands to the DMAC. The DMAC loads the SPU program and its associated stack frame into the local storage of an SPU. The PU then issues an initial kick to the SPU to execute the SPU Program.

Figure 38:
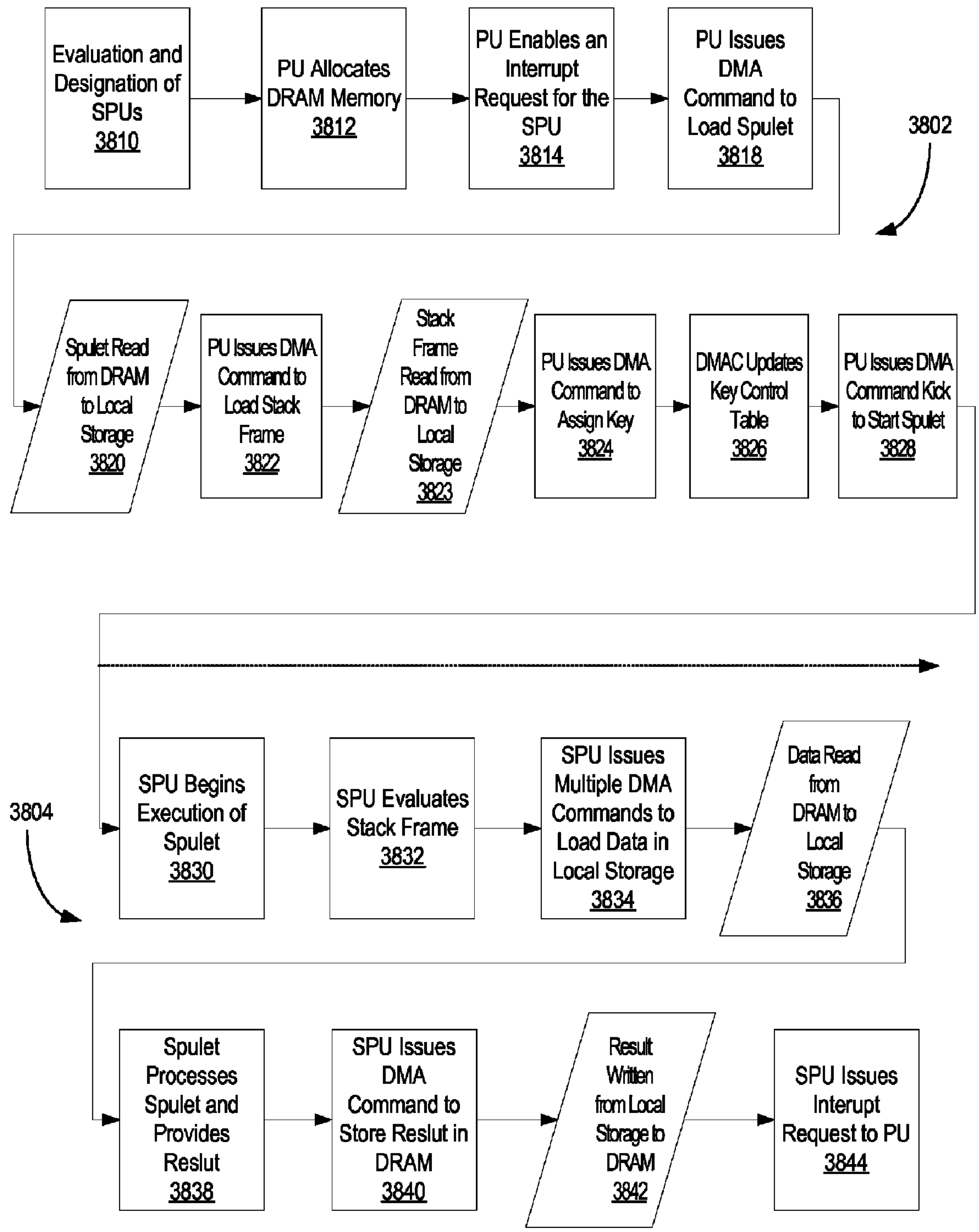
FIG. 38 is a flow diagram of the steps for issuing remote procedure calls to SPUs in accordance with the present invention.

FIG. 38 illustrates the steps of an SRPC for executing an spulet. The steps performed by the PU in initiating processing of the spulet by a designated SPU are shown in the first portion 3802 of FIG. 38, and the steps performed by the designated SPU in processing the spulet are shown in the second portion 3804 of FIG. 38.

In step 3810, the PU evaluates the spulet and then designates an SPU for processing the spulet. In step 3812, the PU allocates space in the DRAM for executing the spulet by issuing a DMA command to the DMAC to set memory access keys for the necessary sandbox or sandboxes. In step 3814, the PU enables an interrupt request for the designated SPU to signal completion of the spulet. In step 3818, the PU issues a DMA command to the DMAC to load the spulet from the DRAM to the local storage of the SPU. In step 3820, the DMA command is executed, and the spulet is read from the DRAM to the SPU's local storage. In step 3822, the PU issues a DMA command to the DMAC to load the stack frame associated with the spulet from the DRAM to the SPU's local storage. In step 3823, the DMA command is executed, and the stack frame is read from the DRAM to the SPU's local storage. In step 3824, the PU issues a DMA command for the DMAC to assign a key to the SPU to allow the SPU to read and write data from and to the hardware sandbox or sandboxes designated in step 3812. In step 3826, the DMAC updates the key control table (KTAB) with the key assigned to the SPU. In step 3828, the PU issues a DMA command "kick" to the SPU to start processing of the program. Other DMA commands may be issued by the PU in the execution of a particular SRPC depending upon the particular spulet.

As indicated above, second portion 3804 of FIG. 38 illustrates the steps performed by the SPU in executing the spulet. In step 3830, the SPU begins to execute the spulet in response to the kick command issued at step 3828. In step 3832, the SPU, at the direction of the spulet, evaluates the spulet's associated stack frame. In step 3834, the SPU issues multiple DMA commands to the DMAC to load data designated as needed by the stack frame from the DRAM to the SPU's local storage. In step 3836, these DMA commands are executed, and the data are read from the DRAM to the SPU's local storage. In step 3838, the SPU executes the spulet and generates a result. In step 3840, the SPU issues a DMA command to the DMAC to store the result in the DRAM. In step 3842, the DMA command is executed and the result of the spulet is written from the SPU's local storage to the DRAM. In step 3844, the SPU issues an interrupt request to the PU to signal that the SRPC has been completed.

The ability of SPUs to perform tasks independently under the direction of a PU enables a PU to dedicate a group of SPUs, and the memory resources associated with a group of SPUs, to performing extended tasks. For example, a PU can dedicate one or more SPUs, and a group of memory sandboxes associated with these one or more SPUs, to receiving data transmitted over network 104 over an extended period and to directing the data received during this period to one or more other SPUs and their associated memory sandboxes for further processing. This ability is particularly advantageous to processing streaming data transmitted over network 104, e.g., streaming MPEG or streaming ATRAC audio or video data. A PU can dedicate one or more SPUs and their associated memory sandboxes to receiving these data and one or more other SPUs and their associated memory sandboxes to decompressing and further processing these data. In other words, the PU can establish a dedicated pipeline relationship among a group of SPUs and their associated memory sandboxes for processing such data.

In order for such processing to be performed efficiently, however, the pipeline's dedicated SPUs and memory sandboxes should remain dedicated to the pipeline during periods in which processing of spulets comprising the data stream does not occur. In other words, the dedicated SPUs and their associated sandboxes should be placed in a reserved state during these periods. The reservation of an SPU and its associated memory sandbox or sandboxes upon completion of processing of an spulet is called a "resident termination." A resident termination occurs in response to an instruction from a PU.

Figure 39:
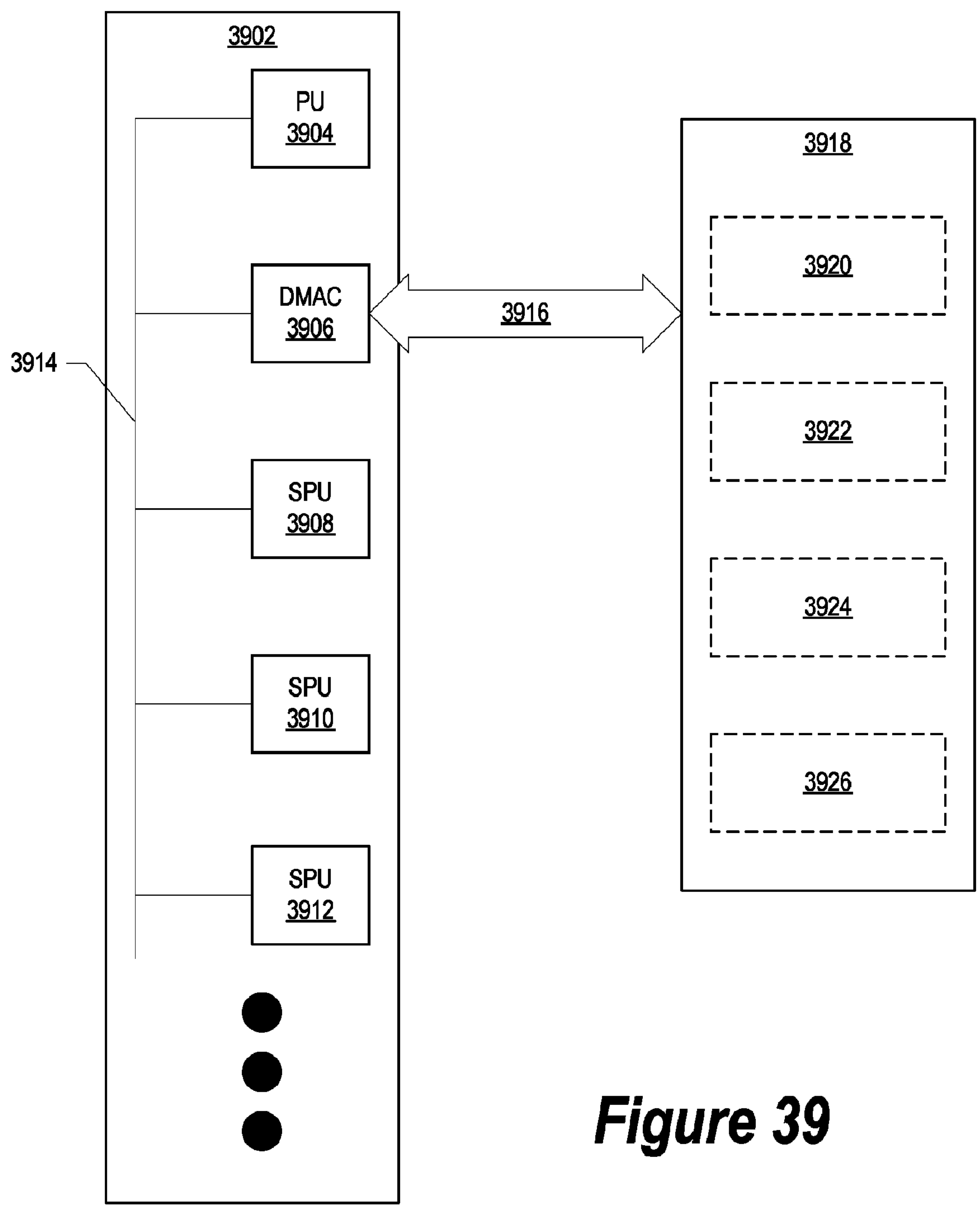
FIG. 39 illustrates the structure of a dedicated pipeline for processing streaming data in accordance with the present invention.
Figure 40A:
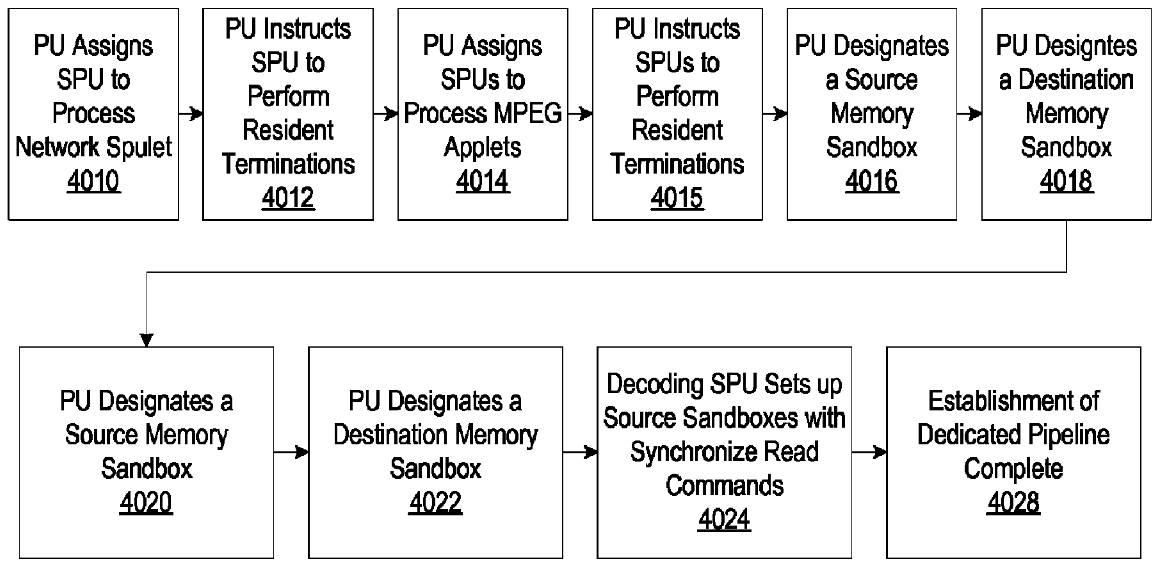
FIG. 40 is a flow diagram of the steps performed by the dedicated pipeline of FIG. 39 in the processing of streaming data in accordance with the present invention.
Figure 40B:
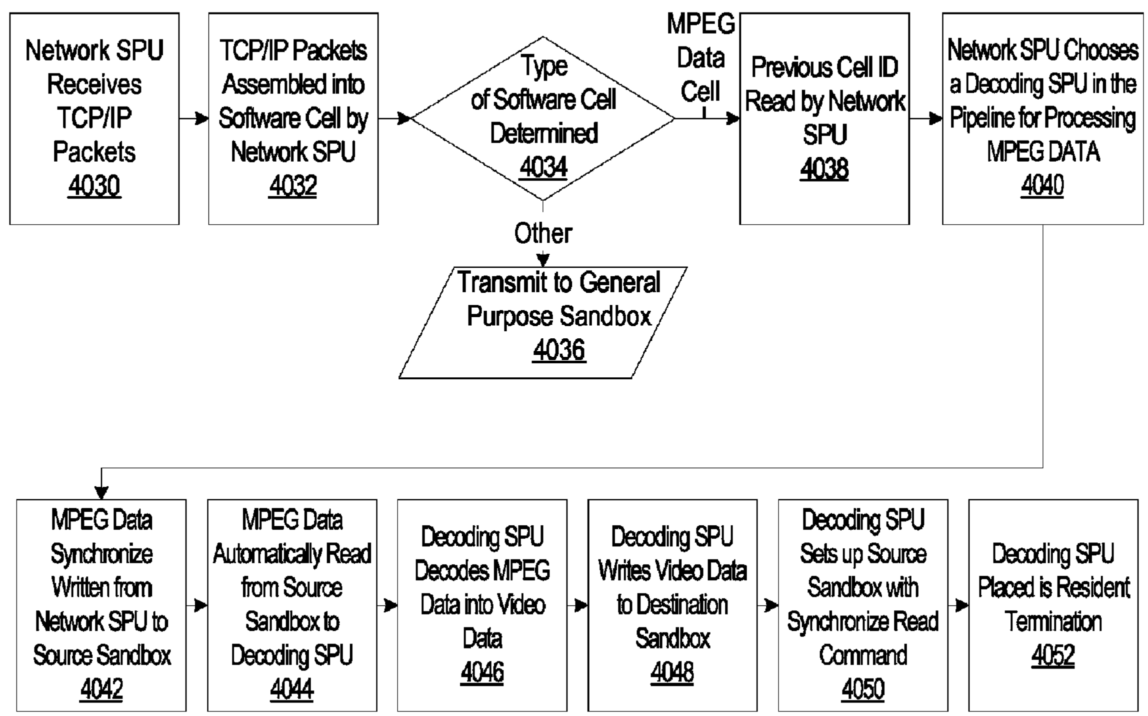

FIGS. 39, 40A and 40B illustrate the establishment of a dedicated pipeline structure comprising a group of SPUs and their associated sandboxes for the processing of streaming data, e.g., streaming MPEG data. As shown in FIG. 39, the components of this pipeline structure include PE 3902 and DRAM 3918. PE 3902 includes PU 3904, DMAC 3906 and a plurality of SPUs, including SPU 3908, SPU 3910 and SPU 3912. Communications among PU 3904, DMAC 3906 and these SPUs occur through PE bus 3914. Wide bandwidth bus 3916 connects DMAC 3906 to DRAM 3918. DRAM 3918 includes a plurality of sandboxes, e.g., sandbox 3920, sandbox 3922, sandbox 3924 and sandbox 3926.

FIG. 40A illustrates the steps for establishing the dedicated pipeline. In step 4010, PU 3904 assigns SPU 3908 to process a network spulet. A network spulet comprises a program for processing the network protocol of network 104. In this case, this protocol is the Transmission Control Protocol/Internet Protocol (TCP/IP). TCP/IP data packets conforming to this protocol are transmitted over network 104. Upon receipt, SPU 3908 processes these packets and assembles the data in the packets into software cells 102. In step 4012, PU 3904 instructs SPU 3908 to perform resident terminations upon the completion of the processing of the network spulet. In step 4014, PU 3904 assigns PUs 3910 and 3912 to process MPEG spulets. In step 4015, PU 3904 instructs SPUs 3910 and 3912 also to perform resident terminations upon the completion of the processing of the MPEG spulets. In step 4016, PU 3904 designates sandbox 3920 as a source sandbox for access by SPU 3908 and SPU 3910. In step 4018, PU 3904 designates sandbox 3922 as a destination sandbox for access by SPU 3910. In step 4020, PU 3904 designates sandbox 3924 as a source sandbox for access by SPU 3908 and SPU 3912. In step 4022, PU 3904 designates sandbox 3926 as a destination sandbox for access by SPU 3912. In step 4024, SPU 3910 and SPU 3912 send synchronize read commands to blocks of memory within, respectively, source sandbox 3920 and source sandbox 3924 to set these blocks of memory into the blocking state. The process finally moves to step 4028 where establishment of the dedicated pipeline is complete and the resources dedicated to the pipeline are reserved. SPUs 3908, 3910 and 3912 and their associated sandboxes 3920, 3922, 3924 and 3926, therefore, enter the reserved state.

FIG. 40B illustrates the steps for processing streaming MPEG data by this dedicated pipeline. In step 4030, SPU 3908, which processes the network spulet, receives in its local storage TCP/IP data packets from network 104. In step 4032, SPU 3908 processes these TCP/IP data packets and assembles the data within these packets into software cells 102. In step 4034, SPU 3908 examines header 3720 (FIG. 37) of the software cells to determine whether the cells contain MPEG data. If a cell does not contain MPEG data, then, in step 4036, SPU 3908 transmits the cell to a general purpose sandbox designated within DRAM 3918 for processing other data by other SPUs not included within the dedicated pipeline. SPU 3908 also notifies PU 3904 of this transmission.

On the other hand, if a software cell contains MPEG data, then, in step 4038, SPU 3908 examines previous cell ID 3730 (FIG. 37) of the cell to identify the MPEG data stream to which the cell belongs. In step 4040, SPU 3908 chooses an SPU of the dedicated pipeline for processing of the cell. In this case, SPU 3908 chooses SPU 3910 to process these data. This choice is based upon previous cell ID 3730 and load balancing factors. For example, if previous cell ID 3730 indicates that the previous software cell of the MPEG data stream to which the software cell belongs was sent to SPU 3910 for processing, then the present software cell normally also will be sent to SPU 3910 for processing. In step 4042, SPU 3908 issues a synchronize write command to write the MPEG data to sandbox 3920. Since this sandbox previously was set to the blocking state, the MPEG data, in step 4044, automatically is read from sandbox 3920 to the local storage of SPU 3910. In step 4046, SPU 3910 processes the MPEG data in its local storage to generate video data. In step 4048, SPU 3910 writes the video data to sandbox 3922. In step 4050, SPU 3910 issues a synchronize read command to sandbox 3920 to prepare this sandbox to receive additional MPEG data. In step 4052, SPU 3910 processes a resident termination. This processing causes this SPU to enter the reserved state during which the SPU waits to process additional MPEG data in the MPEG data stream.

Figure 41:
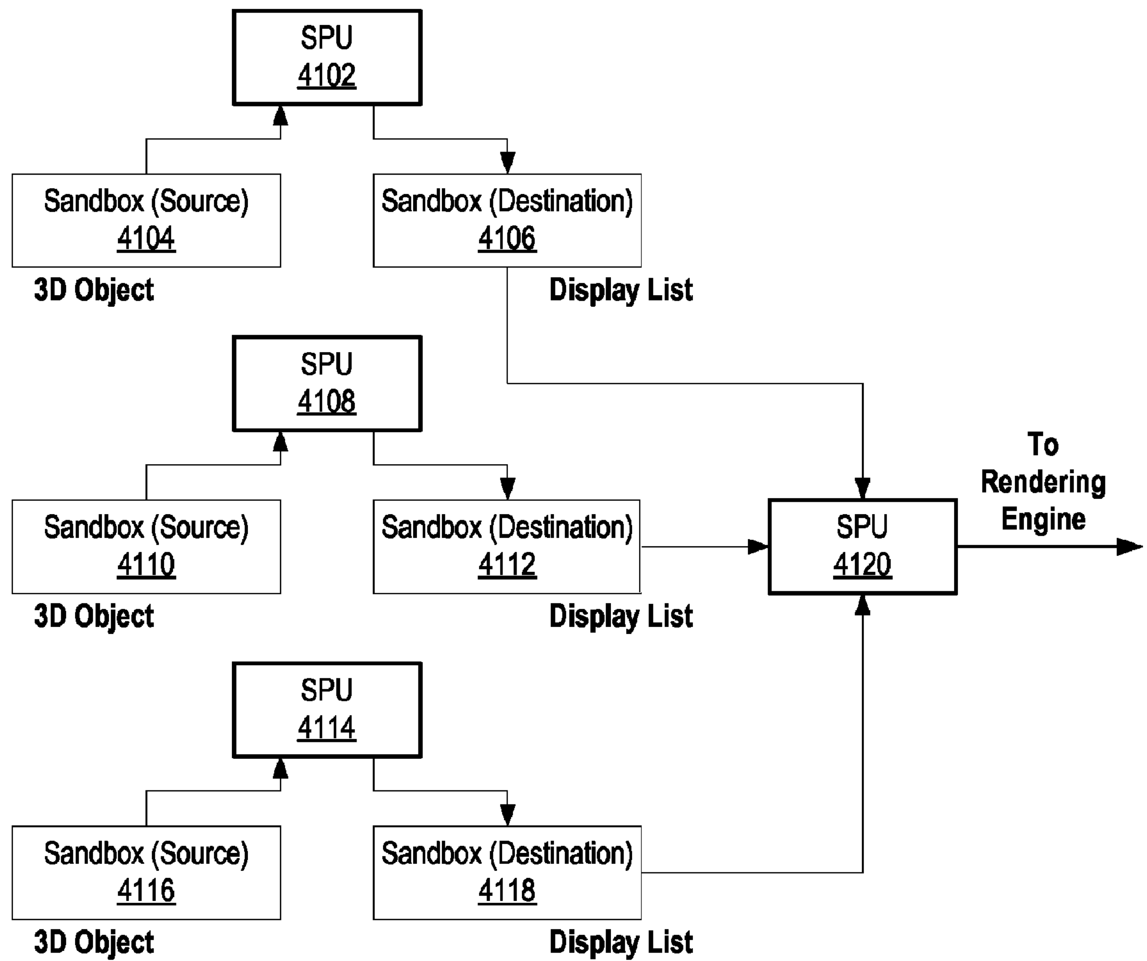
FIG. 41 illustrates an alternative structure for a dedicated pipeline for the processing of streaming data in accordance with the present invention.

Other dedicated structures can be established among a group of SPUs and their associated sandboxes for processing other types of data. For example, as shown in FIG. 41, a dedicated group of SPUs, e.g., SPUs 4102, 4108 and 4114, can be established for performing geometric transformations upon three dimensional objects to generate two dimensional display lists. These two dimensional display lists can be further processed (rendered) by other SPUs to generate pixel data. To perform this processing, sandboxes are dedicated to SPUs 4102, 4108 and 4114 for storing the three dimensional objects and the display lists resulting from the processing of these objects. For example, source sandboxes 4104, 4110 and 4116 are dedicated to storing the three dimensional objects processed by, respectively, SPU 4102, SPU 4108 and SPU 4114. In a similar manner, destination sandboxes 4106, 4112 and 4118 are dedicated to storing the display lists resulting from the processing of these three dimensional objects by, respectively, SPU 4102, SPU 4108 and SPU 4114.

Coordinating SPU 4120 is dedicated to receiving in its local storage the display lists from destination sandboxes 4106, 4112 and 4118. SPU 4120 arbitrates among these display lists and sends them to other SPUs for the rendering of pixel data.

Figure 42:
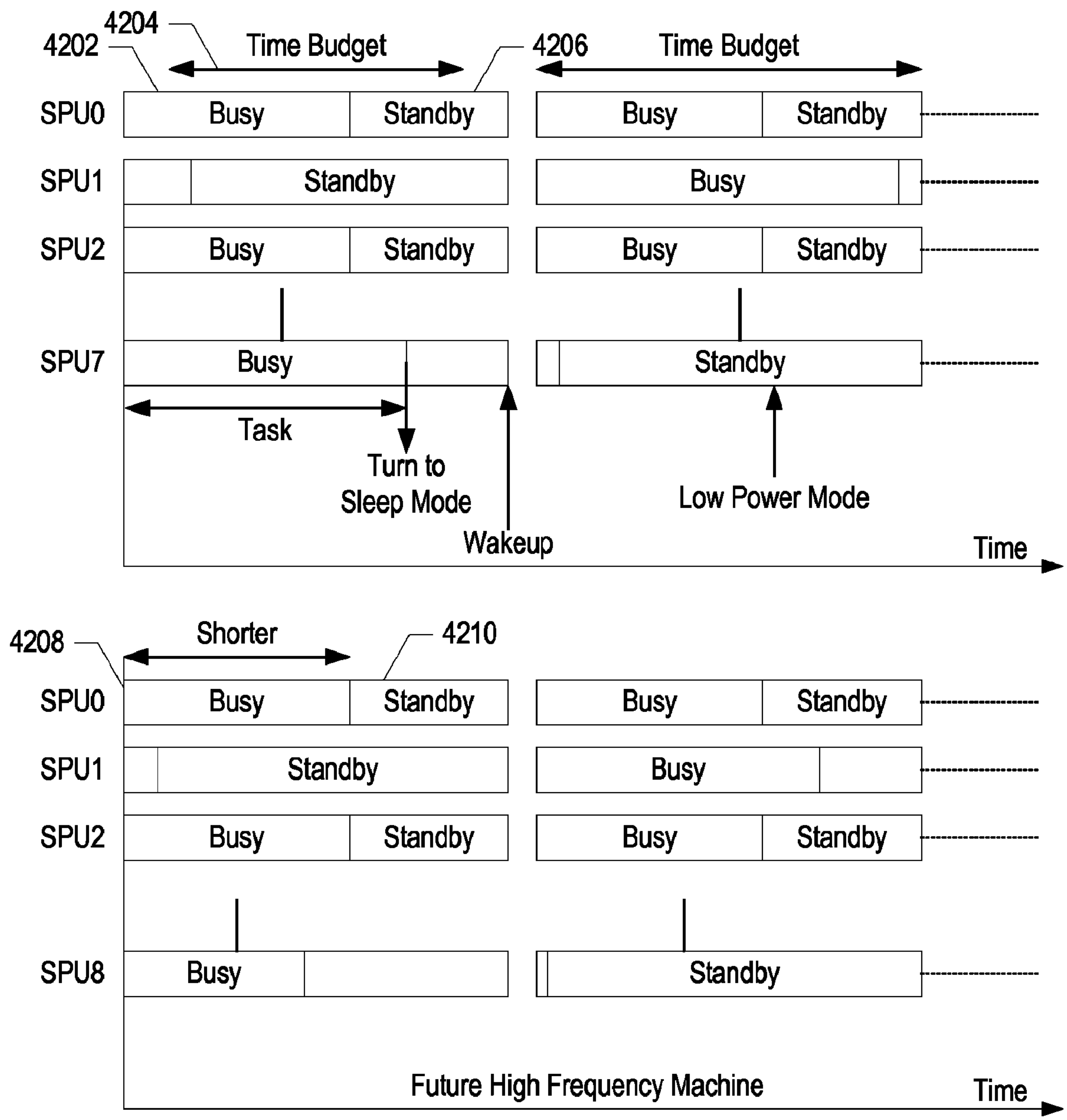
FIG. 42 illustrates a scheme for an absolute timer for coordinating the parallel processing of applications and data by SPUs in accordance with the present invention.

The processors of system 101 also employ an absolute timer. The absolute timer provides a clock signal to the SPUs and other elements of a PU which is both independent of, and faster than, the clock signal driving these elements. The use of this absolute timer is illustrated in FIG. 42.

As shown in this figure, the absolute timer establishes a time budget for the performance of tasks by the SPUs. This time budget provides a time for completing these tasks which is longer than that necessary for the SPUs' processing of the tasks. As a result, for each task, there is, within the time budget, a busy period and a standby period. All spulets are written for processing on the basis of this time budget regardless of the SPUs' actual processing time or speed.

For example, for a particular SPU of a PU, a particular task may be performed during busy period 4202 of time budget 4204. Since busy period 4202 is less than time budget 4204, a standby period 4206 occurs during the time budget. During this standby period, the SPU goes into a sleep mode during which less power is consumed by the SPU.

The results of processing a task are not expected by other SPUs, or other elements of a PU, until a time budget 4204 expires. Using the time budget established by the absolute timer, therefore, the results of the SPUs' processing always are coordinated regardless of the SPUs' actual processing speeds.

In the future, the speed of processing by the SPUs will become faster. The time budget established by the absolute timer, however, will remain the same. For example, as shown in FIG. 42, an SPU in the future will execute a task in a shorter period and, therefore, will have a longer standby period. Busy period 4208, therefore, is shorter than busy period 4202, and standby period 4210 is longer than standby period 4206. However, since programs are written for processing on the basis of the same time budget established by the absolute timer, coordination of the results of processing among the SPUs is maintained. As a result, faster SPUs can process programs written for slower SPUs without causing conflicts in the times at which the results of this processing are expected.

In lieu of an absolute timer to establish coordination among the SPUs, the PU, or one or more designated SPUs, can analyze the particular instructions or microcode being executed by an SPU in processing an spulet for problems in the coordination of the SPUs' parallel processing created by enhanced or different operating speeds. "No operation" ("NOOP") instructions can be inserted into the instructions and executed by some of the SPUs to maintain the proper sequential completion of processing by the SPUs expected by the spulet. By inserting these NOOPs into the instructions, the correct timing for the SPUs' execution of all instructions can be maintained.

Figure 43:
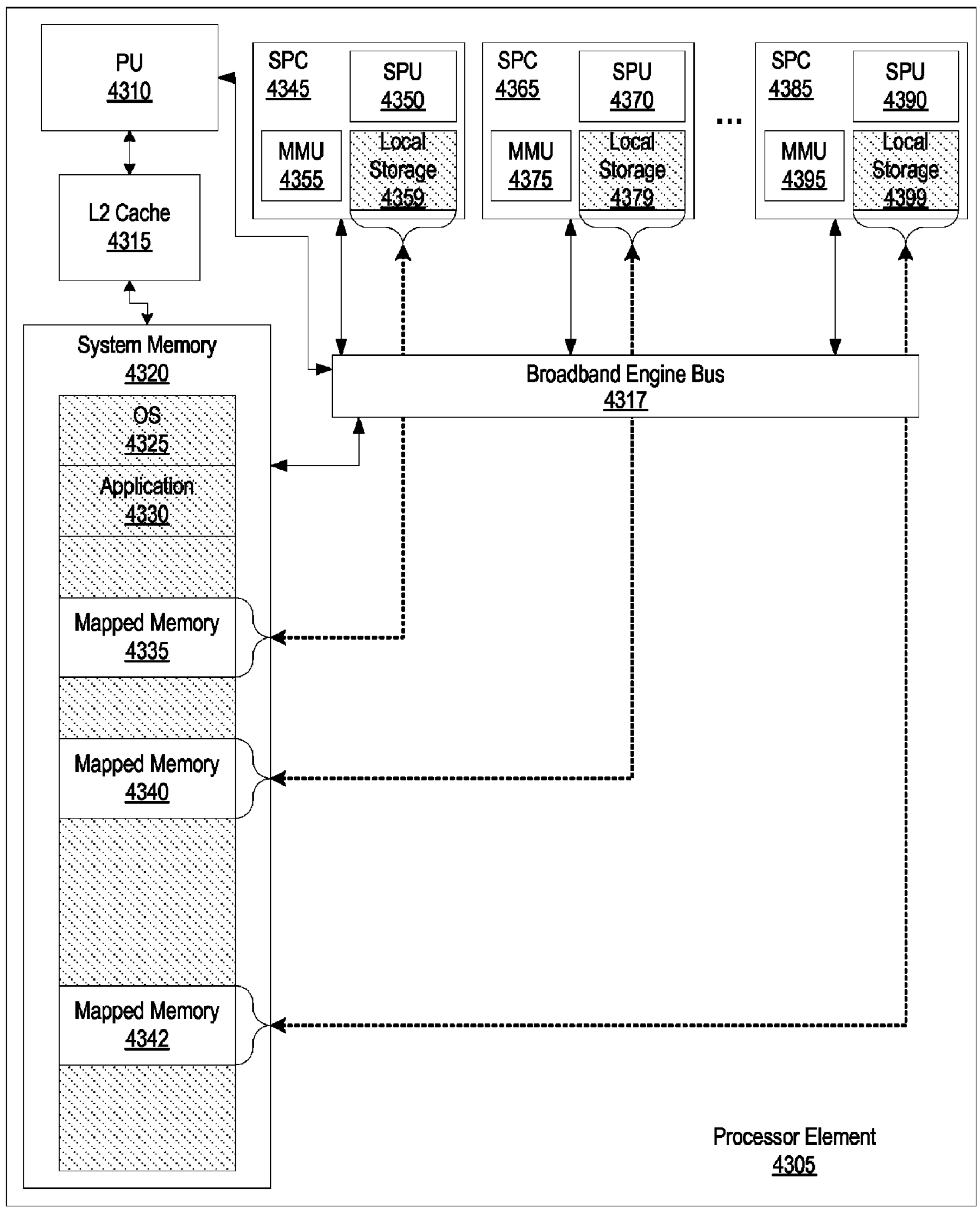
FIG. 43 is a block diagram illustrating a processing element having a main processor and a plurality of secondary processors sharing a system memory.

FIG. 43 is a block diagram illustrating a processing element having a main processor and a plurality of secondary processors sharing a system memory. Processor Element (PE) 4305 includes processing unit (PU) 4310, which, in one embodiment, acts as the main processor and runs an operating system. Processing unit 4310 may be, for example, a Power PC core executing a Linux operating system. PE 4305 also includes a plurality of synergistic processing complex's (SPCs) such as SPCs 4345, 4365, and 4385. The SPCs include synergistic processing units (SPUs) that act as secondary processing units to PU 4310, a memory storage unit, and local storage. For example, SPC 4345 includes SPU 4360, MMU 4355, and local storage 4359; SPC 4365 includes SPU 4370, MMU 4375, and local storage 4379; and SPC 4385 includes SPU 4390, MMU 4395, and local storage 4399.

Each SPC may be configured to perform a different task, and accordingly, in one embodiment, each SPC may be accessed using different instruction sets. If PE 4305 is being used in a wireless communications system, for example, each SPC may be responsible for separate processing tasks, such as modulation, chip rate processing, encoding, network interfacing, etc. In another embodiment, the SPCs may have identical instruction sets and may be used in parallel with each other to perform operations benefiting from parallel processing.

PE 4305 may also include level 2 cache, such as L2 cache 4315, for the use of PU 4310. In addition, PE 4305 includes system memory 4320, which is shared between PU 4310 and the SPUs. System memory 4320 may store, for example, an image of the running operating system (which may include the kernel), device drivers, I/O configuration, etc., executing applications, as well as other data. System memory 4320 includes the local storage units of one or more of the SPCs, which are mapped to a region of system memory 4320. For example, local storage 4359 may be mapped to mapped region 4335, local storage 4379 may be mapped to mapped region 4340, and local storage 4399 may be mapped to mapped region 4342. PU 4310 and the SPCs communicate with each other and system memory 4320 through bus 4317 that is configured to pass data between these devices.

The MMUs are responsible for transferring data between an SPU's local store and the system memory. In one embodiment, an MMU includes a direct memory access (DMA) controller configured to perform this function. PU 4310 may program the MMUs to control which memory regions are available to each of the MMUs. By changing the mapping available to each of the MMUs, the PU may control which SPU has access to which region of system memory 4320. In this manner, the PU may, for example, designate regions of the system memory as private for the exclusive use of a particular SPU. In one embodiment, the SPUs' local stores may be accessed by PU 4310 as well as by the other SPUs using the memory map. In one embodiment, PU 4310 manages the memory map for the common system memory 4320 for all the SPUs. The memory map table may include PU 4310's L2 Cache 4315, system memory 4320, as well as the SPUs' shared local stores.

In one embodiment, the SPUs process data under the control of PU 4310. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 4310 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

Figure 44:
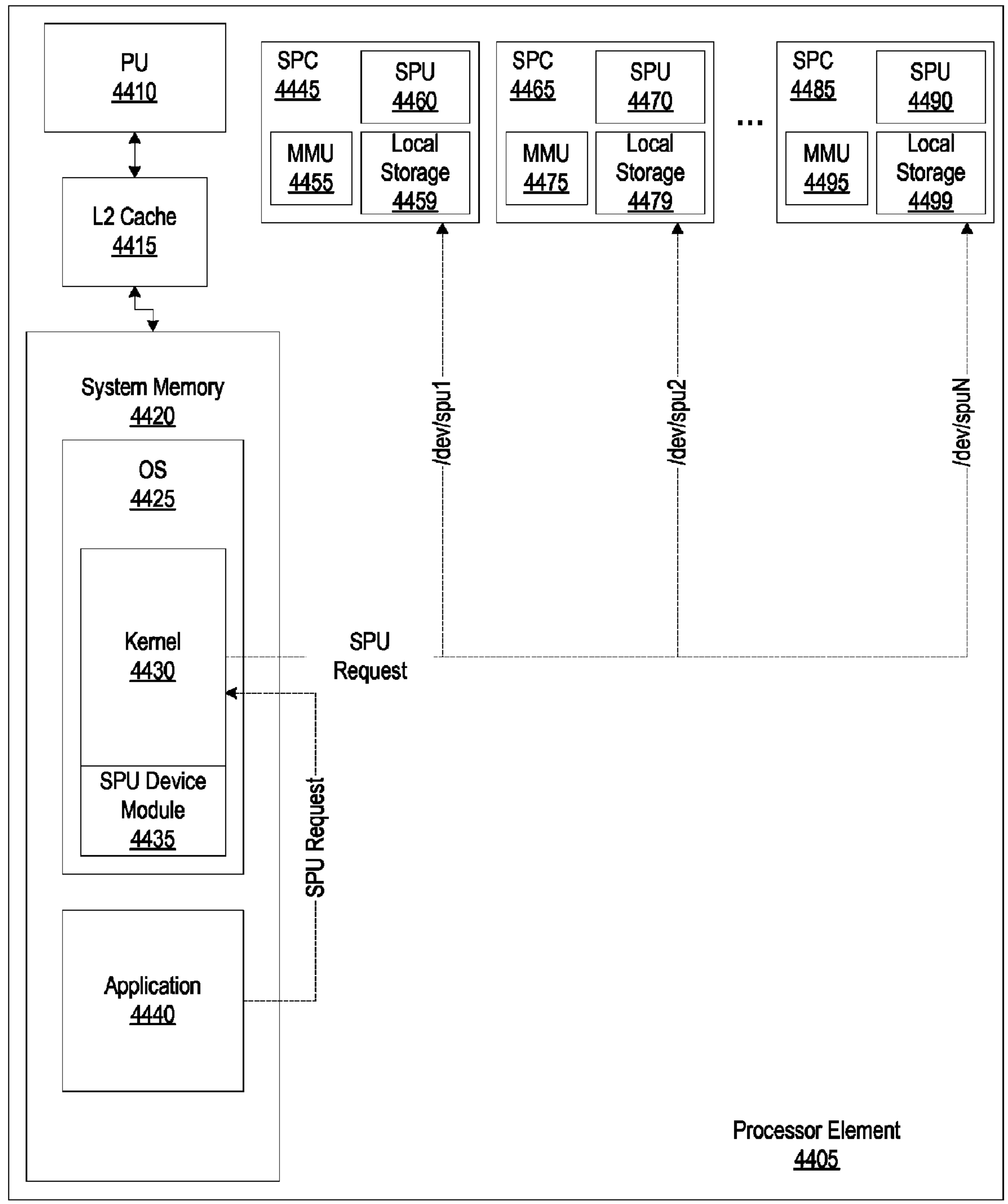
FIG. 44 is a block diagram illustrating a processor element having a main processor and a plurality of secondary processors sharing a common system memory.

FIG. 44 is a block diagram illustrating a processor element having a main processor and a plurality of secondary processors sharing a common system memory. Processor Element (PE) 4405 includes processing unit (PU) 4410, which, in one embodiment, runs the operating system. Processing unit 4410 may be, for example, a Power PC core executing a Linux operating system. PE 4405 also includes a plurality of synergistic processing complex's (SPCs) such as SPCs 4445 through 4485. Each SPC includes a synergistic processing unit (SPU), a memory storage unit, and local storage. For example, SPC 4445 includes SPU 4460, MMU 4455, and local storage 4459; SPC 4465 includes SPU 4470, MMU 4475, and local storage 4479; and SPC 4485 includes SPU 4490, MMU 4495, and local storage 4499.

In one embodiment, the SPUs process data under the control of PU 4410. The SPUs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 4410 and by the other SPUs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPC may be set up to perform a different task, and accordingly, in one embodiment, each SPC may be accessed using different instruction sets. If PE 4405 is being used in a wireless communications system, for example, each SPC may be responsible for separate processing tasks, such as modulation, chip rate processing, encoding, network interfacing, etc. In another embodiment, each SPC may have identical instruction sets and may be used in parallel to perform operations benefiting from parallel processes.

The shared portion of the SPUs' local stores may be accessed by PU 4410 as well as the other SPUs by mapping each shared region to system memory 4420. In one embodiment, PU 4410 manages the memory map for the common system memory 4420. The memory map table may include PU 4410's L2 Cache 4415, system memory 4420, as well as the SPUs' shared memory.

A portion of system memory 4420 as shown is occupied by the operating system (OS 4425), which includes kernel 4430 and loaded SPU device module 4435. SPU device module 4435 is loaded in order to facilitate device-like access to the SPUs by executing applications, such as application 4440. When an application such as application 4440 requests to send code and data to one of the SPUs, the kernel, using SPU device module 4435, forwards the request to the appropriate using the appropriate SPU instructions. In a Unix environment, SPU 4450 may be accessed using the device access path, "/dev/spu1", SPU 4470 may be accessed using the device access path, "/dev/spu2", SPU 4490 may be accessed using the device access path, "/dev/spuN", etc.

FIG. 45A is a table illustrating a device configuration file that contains device access paths and corresponding devices. In one embodiment, Table 4510 contains a first column with a list of device access paths and a second column with a list of the actual device that corresponds to each of the device paths. In a Unix environment, for example, the device access paths may be of the form, "/dev/xxx" where "xxx" is the name assigned to a device. "/dev/spu1", for example, may correspond to SPU 1, "/dev/sp2" may correspond to SPU 2, etc. In addition, the configuration file may contain device access paths for other devices attached to the computer system such as disk drives, printers, etc. The device configuration file may be stored on disk, in conventional RAM, in nonvolatile RAM, ROM, etc.

FIG. 45B is a table illustrating example application code for accessing a system's multiple processors. Table 4520 shows example instructions by which an application can "write" data to a specific processor, "read" data from a specific processor, request a specific processor to process data, etc. In a Unix environment, an application may "write" data to the SPU 2, for example, by issuing the command: "write(/dev/spu2/, . . . )". Similarly, a device may issue a read command (read(/dev/spu2/, . . . )) as well other ioctl-type commands (ioctl(/dev/spu2/, . . . )).

Figure 46:
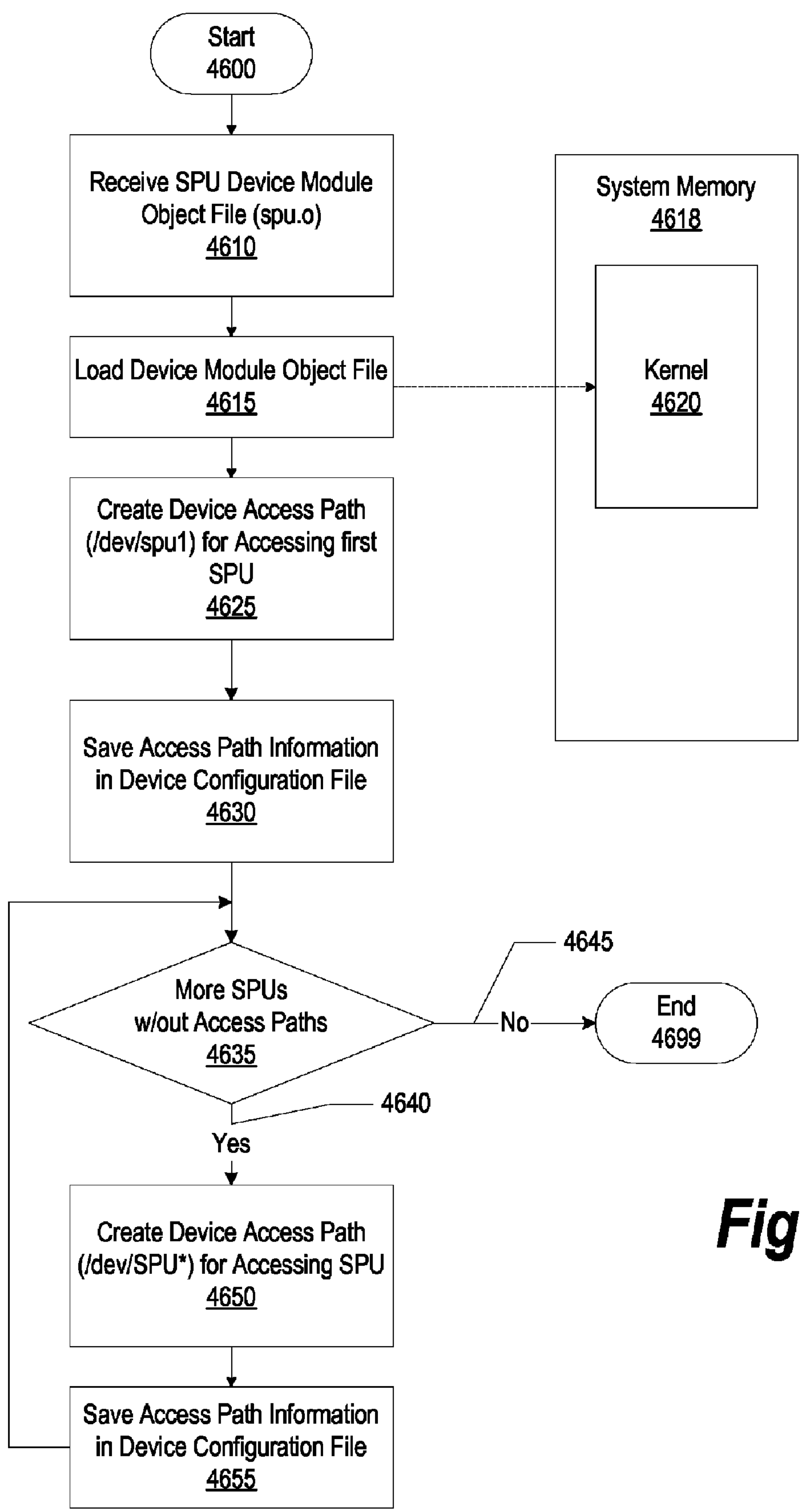
FIG. 46 is a flowchart illustrating a method for setting up device-like access to a system's multiple processors.

FIG. 46 is a flowchart illustrating a method for setting up device-like access to a system's multiple processors. Processing begins at 4600 whereupon, at step 4610, the SPU device module is received and then loaded into operating system kernel 4620 in system memory 4618 of the computer system at step 4615. The device module provides the kernel with the ability to communicate with the SPUs by providing the interface parameters between executing applications requesting access to SPUs and the SPUs.

At step 4625, a device access path is created for accessing the first SPU (SPU 1). In a Unix environment, for example, the device access path, "/dev/spu1/" may be created for accessing SPU 1. Information on the device access path and the SPU corresponding to the device access path are saved in the device configuration file at step 4630. A device configuration file is used for determining a correspondence between a device access path and the actual device for which the request is made.

A determination is then made as to whether more SPUs exist for which a device access path is required at decision 4635. If no more SPUs exist for which a device access path is required, decision 4635 branches to "no" branch 4645 whereupon processing ends at 4699.

If more SPUs exist for which a device access path is required, decision 4635 branches to "yes" branch 4640 whereupon, at step 4650, the next SPU requiring an access path is selected, and a device access path for that SPU is created. At step 4655, information on the access path and the corresponding SPU are added to the device configuration file. Processing then loops back to decision 4635 where a determination is again made as to whether more SPUs exist requiring a device access path.

Figure 47:
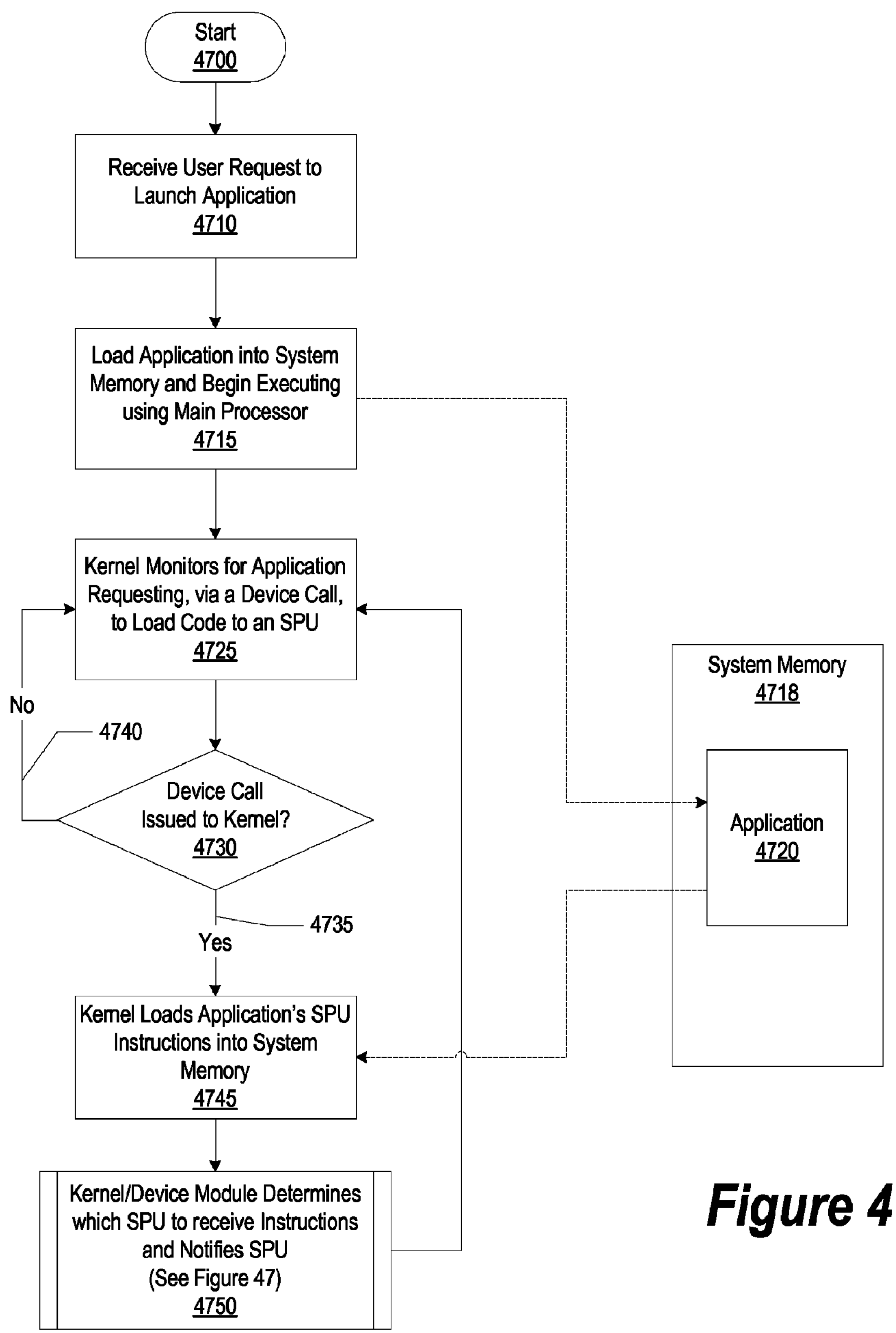
FIG. 47 is a flowchart illustrating a method by which an application requests device-like access to a processor in a multiprocessor system.

FIG. 47 is a flowchart illustrating a method by which an application requests device-like access to a processor in a multiprocessor system. Processing begins at step 4700 whereupon, at step 4710, the computer system receives a request from a user to launch an application. In one embodiment, the computer system includes one or more processors, and the application is a multimedia application designed to take advantage of the computer system's multiple processors.

At step 4715, the operating system kernel loads the application 4720 into system memory 4718 and initiates execution of the application. In one embodiment, the application executes on the main processor of the computer system. In another embodiment, the application may execute on one of the computer system's other processors.

At step 4725, the kernel monitors whether an application currently executing is requesting, via a device call, for code to execute and data to be processed on a particular SPU. Applications can request access to a particular SPU similarly to the way applications would request access to other devices attached to the computer system such as disk drives, printers, etc. A processor device module (similar to a printer's or a disk drive's device module or driver) facilitates the execution of the application's request.

A determination is then made as to whether an application has issued such a request for one of the SPUs at decision 4730. If an application has not issued a request for an SPU, decision 4730 branches to "no" branch 4740 whereupon processing returns to step 4725 where the kernel process continues to monitor for applications issuing a request for an SPU.

If an application has issued a request for an SPU, decision 4730 branches to "yes" branch 4735 whereupon, at step 4745, the application's SPU instructions and data are placed for the SPU in system memory.

At step 4750, the kernel, using the loaded SPU device module, determines which SPU is to receive the application's instructions and data and then communicates the instructions to the SPU. More details on the processing that takes place at step 4750 are provided in the flowchart of FIG. 48.

Figure 48:
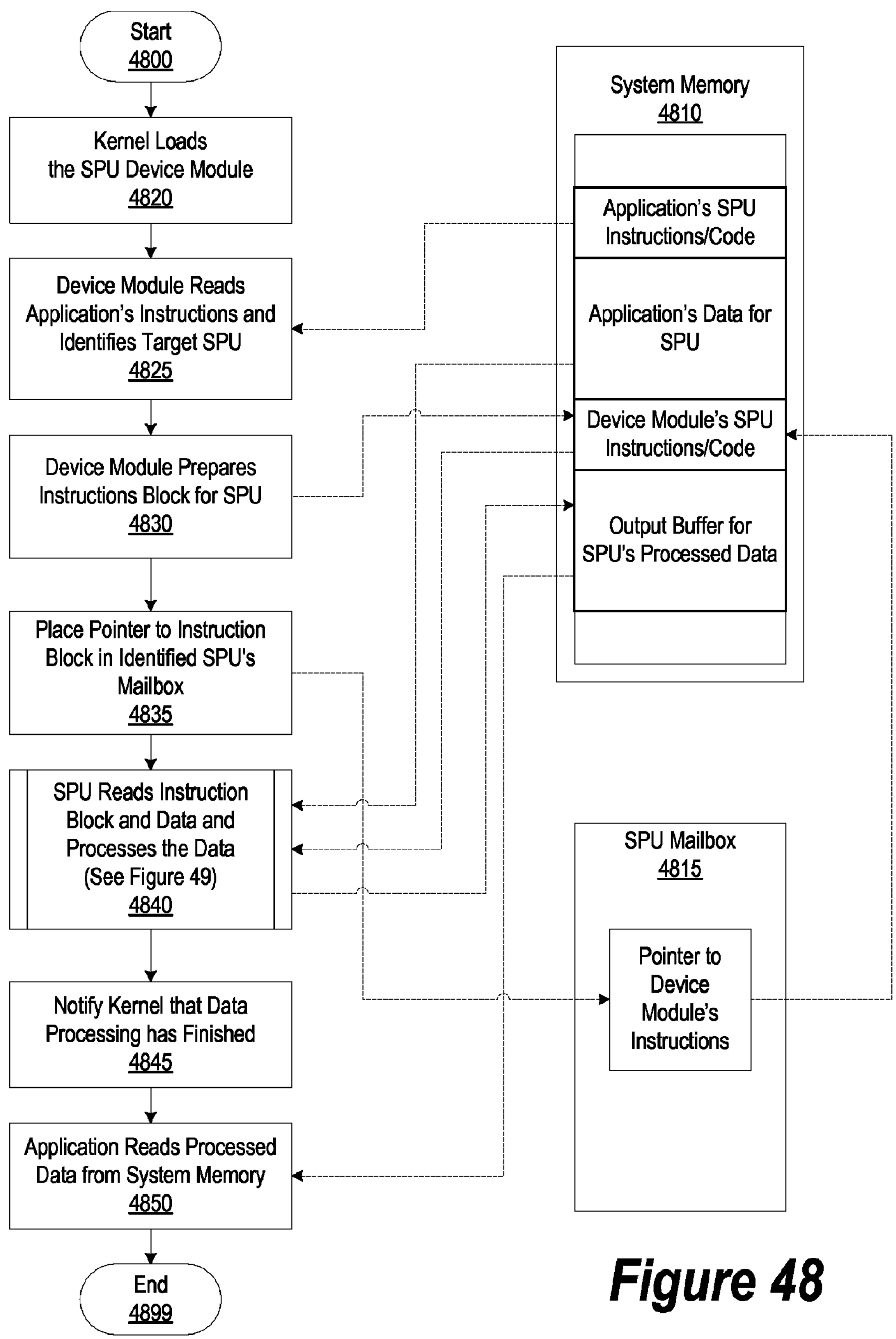
FIG. 48 is a flowchart illustrating a method by which an operating system kernel receives a request from an application to access a processor in a multi-processor system and facilitates access to the processor.

FIG. 48 is a flowchart illustrating a method by which an operating system kernel receives a request from an application to access a processor in a multi-processor system and facilitates access to the processor. Processing begins at 4800 whereupon, at step 4820, the kernel loads the SPU device module. The SPU device module facilitates a communication between the SPUs and an application requesting access to one of the SPUs. At step 4825, the kernel using the device module reads the application's instructions/code from a region of system memory 4810 and identifies the target SPU.

At step 4830, the kernel using the SPU device module and the instructions/code determines an instructions block for the identified SPU. The instructions block may include, for example, a pointer to the application's code, a pointer to the application's input data, and a pointer to an output buffer-a memory regions where the SPU is to place the processed data.

At step 4835, a pointer to the instructions block is placed in the identified SPU's mailbox, which, in one embodiment, is located by the SPU. Mailboxes (such as mailbox 4815) are memory spaces associated with each SPU used to facilitate handshaking between the SPUs and the PU/operating system. In one embodiment, each SPU periodically monitors its mailbox for pointers placed there by instructions placed there by the operating system kernel.

At step 4840, the SPU reads the instructions and data from system memory 4810 and processes the data. More details on the processing that takes place at step 4840 are provided in the flowchart of FIG. 49. At step 4845, the kernel is notified that the application's data have been processed by the SPU, and at step 4850, the application reads the processed data from system memory 4810. Processing ends at 4899.

Figure 49:
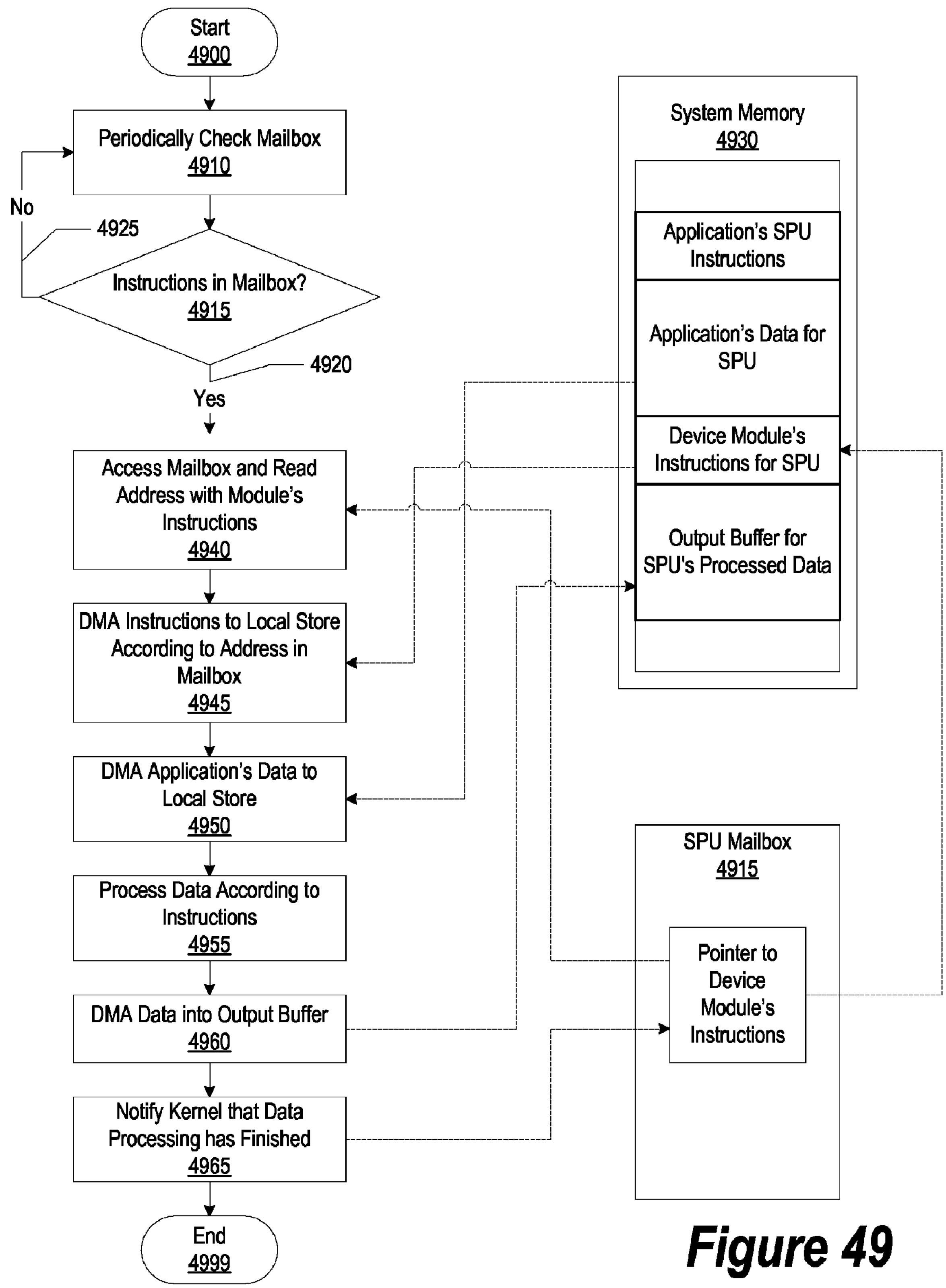
FIG. 49 is a flowchart illustrating a method with which a processor processes an application's request to access a processor.

FIG. 49 is a flowchart illustrating a method with which a processor processes an application's request to access a processor. Processing begins at 4900 whereupon, at step 4910, the SPU periodically monitors the SPU's mailbox to determine whether the operating system has requested the SPU's services. A determination is then made as to whether instructions for the SPU (or a pointer to such instructions) have been placed in the SPU's mailbox at decision 4915. If instructions have not yet been placed in the SPU's mailbox, decision 4915 branches to "no" branch 4925 whereupon processing returns to step 4910 where the SPU continues to periodically monitor the SPU's mailbox.

If instructions have been placed in the SPU's mailbox, decision 4915 branches to "yes" branch 4920 whereupon, at step 4940, the SPU accesses the SPU's mailbox and reads the instructions (or the pointer to the instructions placed in system memory). At step 4945, the SPU, using DMA, transfers the instructions (prepared using the SPU device module) to the SPU's local store, and at step 4950, the SPU, again using DMA, transfers the application data to be processed from system memory 4930 to the SPU's local store as well.

At step 4955, the SPU processes the data placed there by the application. In one embodiment, as the SPU processes the data, the SPU places the data back in the SPU's local store. At step 4960, the SPU transfers the processed data from the SPU's local store into the output buffer reserved for the SPU's processed data in system memory 4930. The SPU may transfer the data periodically as the SPU processes the data or the SPU may transfer the data after the SPU has finished processing all the data.

At step 4965, the SPU signals to the operating system the end of the data processing. The SPU may signal the kernel by placing an appropriate indicator in mailbox 4935 in an embodiment where the operating system is configured to periodically monitor the SPU mailboxes to determine whether one or more of the SPUs is attempting to communicate with the operating system. In another embodiment, the SPU may issue an appropriate interrupt, etc. Processing ends at 4999.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:

a plurality of heterogeneous processors, wherein the plurality of heterogeneous processors includes one or more first processors and one or more secondary processors, wherein the first processors are of a first processor type and the secondary processors are of a second processor type; and a common memory accessible by the plurality of heterogeneous processors, wherein:

the one or more first processors are adapted to:

execute an operating system by a selected first processor;

load a device module corresponding to a selected secondary processor;

load an application using the operating system, the application including device-oriented instructions adapted to control the selected secondary processor;

set up a device-like access path for the selected secondary processor, the device-like access path being used by the application to access the selected secondary processor;

execute the application on the selected first processor;

detect a device call from the application, wherein the device call is a request from the application to load device-oriented instructions to the selected secondary processor;

in response to the detecting, load the device-oriented instructions to the common memory;

perform the device-oriented instructions at the selected secondary processor;

in response to the performing, store processed data in an output buffer in the common memory;

notify the operating system that the device-oriented instructions have been performed; and read, by the application, the processed data from the output buffer.

2. The information handling system of claim 1, wherein the one or more first processors are further adapted to create a configuration file, the configuration file containing a list of one or more of the secondary processors and a corresponding device-like access set up for each of the one or more secondary processors.

3. The information handling system of claim 2, wherein the one or more first processors are further adapted to determine for which of the one or more of the secondary processors the application's device-oriented instructions are intended.

4. The information handling system of claim 3, wherein the determining is performed using information from the configuration file.

5. The information handling system of claim 1, wherein the one or more first processors are adapted to load the device module to facilitate a communication between the application and one or more of the secondary processors by extending the operating system.

6. The information handling system of claim 1, wherein the selected secondary processor is adapted to perform the device-oriented instructions by processing application-provided data according to the application's device-oriented instructions.

7. A computer program product stored on a computer operable media, the computer operable media containing instructions for execution by a computer, which, when executed by the computer, cause the computer to perform a method for processing software code, said method comprising:

executing an operating system by one or more first processors included in a group of heterogeneous processors;

loading a device module corresponding to one or more secondary processors included in the group of heterogeneous processors into the operating system, wherein the first processors are of a first processor type and the secondary processors are of a second processor type;

loading an application using the operating system, the application including device-oriented instructions adapted to control the one or more of the secondary processors;

setting up a device-like access path for a selected secondary processor, the device-like access path being used by the application to access the selected secondary processor;

executing the application on one of the first processors;

detecting a device call from the application, wherein the device call is a request from the application to load device-oriented instructions to the selected secondary processor;

in response to the detecting, loading the device-oriented instructions to a system memory accessible by the selected secondary processor;

performing the device-oriented instructions at the selected secondary processor;

in response to the performing, storing processed data in an output buffer in the system memory;

notifying the operating system that the device-oriented instructions have been performed; and reading, by the application, the processed data from the output buffer.

8. The computer program product of claim 7, further comprising creating a configuration file, the configuration file containing a list of one or more of the secondary processors and a corresponding device-like access set up for each of the one or more secondary processors.

9. The computer program product of claim 8, further comprising determining for which of the one or more of the secondary processor the application's device-oriented instructions are intended.

10. The computer program product of claim 9, wherein the determining is performed using information from the configuration file.

11. The computer program product of claim 7, wherein the loading the device module facilitates a communication between the application and one or more of the secondary processors by extending the operating system.

12. The computer program product of claim 7, wherein the performing the device-oriented instructions comprises the selected secondary processor processing application-provided data according to the application's device-oriented instructions.

* * * * *